(12) United States Patent
Hattori

(10) Patent No.: US 6,512,599 B1
(45) Date of Patent: Jan. 28, 2003

(54) FACSIMILE TRANSMISSION SYSTEM

(75) Inventor: Yuji Hattori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/232,464

(22) Filed: Jan. 19, 1999

(30) Foreign Application Priority Data

Jan. 19, 1998 (JP) ............................................ 10-021480
Mar. 27, 1998 (JP) ............................................ 10-080958

(51) Int. Cl.⁷ ................................................ H04N 1/00
(52) U.S. Cl. ...................................... 358/442; 358/400
(58) Field of Search ................................. 358/400, 401, 358/404, 442, 444, 1.1, 1.6, 1.13, 1.15

(56) References Cited

U.S. PATENT DOCUMENTS

| | | | |
|---|---|---|---|
| 5,663,805 A | | 9/1997 | Asai ............................ 358/404 |
| 5,872,901 A | * | 2/1999 | Konno et al. ............... 358/1.15 |
| 6,020,981 A | * | 2/2000 | Ogiyama .................... 358/404 |
| 6,031,637 A | * | 2/2000 | Shibata et al. .............. 358/468 |
| 6,049,597 A | * | 4/2000 | Satake et al. ............ 379/100.05 |
| 6,064,491 A | * | 5/2000 | Matsumoto ................ 358/1.15 |
| 6,147,774 A | * | 11/2000 | Hamadani et al. .......... 358/442 |

FOREIGN PATENT DOCUMENTS

JP     A-9-312743     12/1997

* cited by examiner

*Primary Examiner*—Kimberly A. Williams
(74) *Attorney, Agent, or Firm*—Oliff & Berridge, PLC

(57) ABSTRACT

The fax transmission routine is started in S410 when a fax entering command is transmitted from the personal computer. The fax transmission data is stored in S440 to S490. Once a data operation command, such as a print command, a send command, and a deletion command, are inputted, then corresponding operations are executed in S500 to S570. The print command is included in the data operation commands. Also the fax transmission data is deleted only after a deletion command is received. Therefore, whether or not the fax transmission data has been properly converted into a fax format can be confirmed before the fax transmission data is transmitted to a remote device. Also, a printed copy of the facsimile message can be obtained based on the fax transmission data. There is no need to retransmit the data in order to obtain the fax copy.

25 Claims, 33 Drawing Sheets

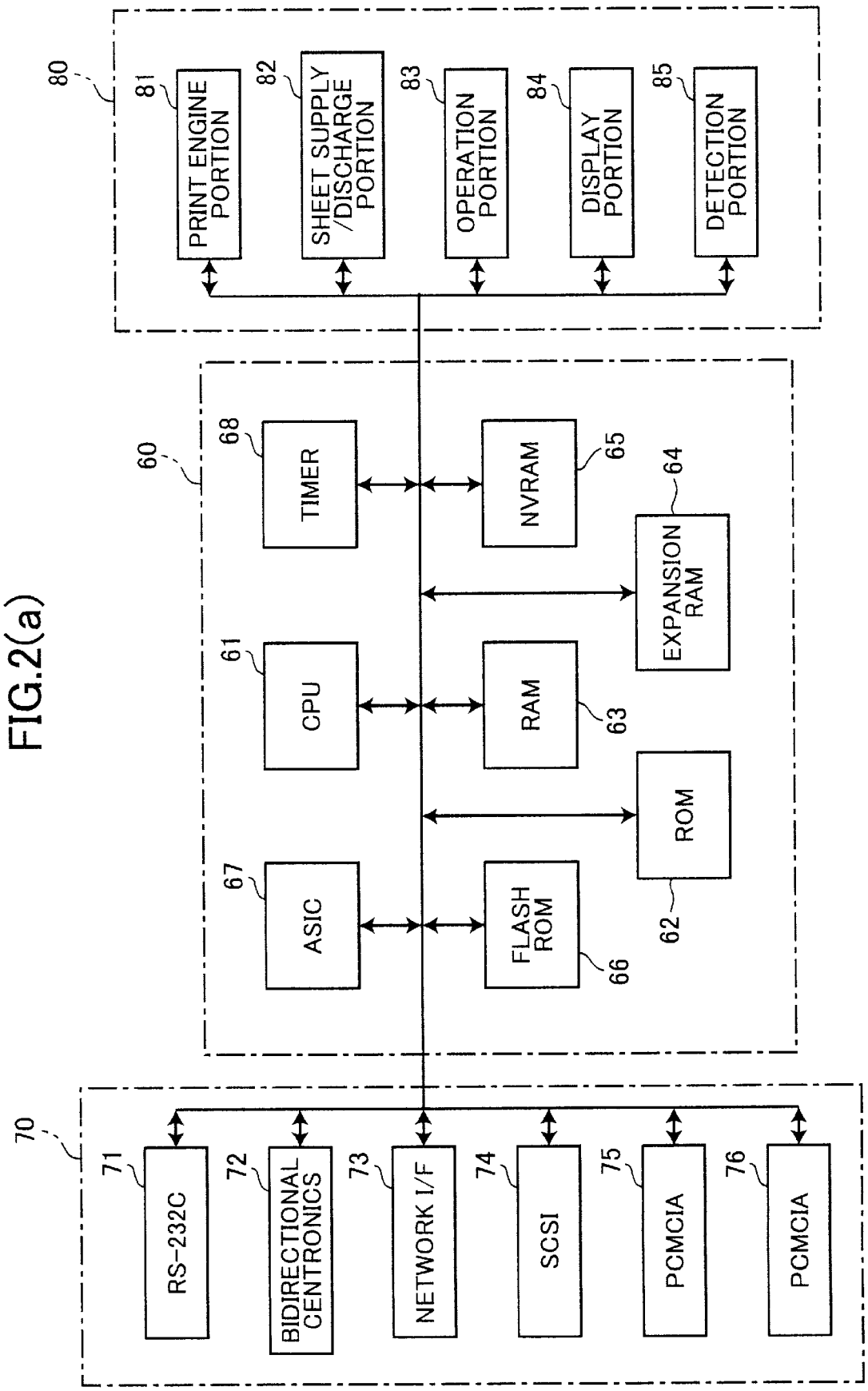

FACSIMILE TRANSMISSION SYSTEM

BACKGROUND OF THE INVENTION

1. Field of the Invention

The present invention relates to a facsimile transmission system including a personal computer and a facsimile transmission device.

2. Description of Related Art

Recently, a variety of application software has become commercially available for converting text data prepared by application software installed in a personal computer into facsimile transmission data and then transmitting the facsimile transmission data in a facsimile transmission. Two methods are known for performing a facsimile transmission using a fax transmission application and a command of a personal computer.

According to a first method, the personal computer is connected to a public circuit (telephone) network and is mounted with a fax modem card for performing fax transmission.

According to a second method, the personal computer is connected to a fax transmission device. The personal computer sends the fax data and such necessary information, where the fax data is to be transmitted to the fax transmission device, whereupon the fax transmission device performs the fax transmission.

SUMMARY OF THE INVENTION

However, during a facsimile transmission using the first method, other applications of the personal computer either can not be performed or else the operation speed of the other applications is reduced while the fax data is being transmitted over the public telephone network.

Also, a user wishes to print out the facsimile message on a sheet of paper. In this case, the user has to take the time and effort to send text data of the facsimile message from the personal computer to a printer connected to the personal computer. Also, in this case, the print out is printed based on text data, not fax data. When a bug exists in the fax transmission application, the data sent in the actual facsimile transmission may be meaningless. However, the user would never know this because the transmitted fax data is different from the text data used to print out the facsimile message.

On the other hand, during a facsimile transmission using the second method, the personal computer is freed up as soon as the personal computer sends the fax data to the fax transmission terminal. Therefore, operation speed of the personal computer is not reduced. However, when the user wishes to print out a copy of the facsimile message, the user has to perform operations to send the text data of the facsimile message and also a print command to the printer. Therefore, the same troublesome operations are required as described for the first method. Also, the fax data actually transmitted may not match the printed out text data.

It is an objective of the present invention to insure that contents of a print output of data prepared using an application software package installed in a personal computer be the same as fax data transmitted in a facsimile transmission, and that this can be accomplished using simple operations.

In order to attain the above and other objects, the present invention provides a facsimile transmission system, comprising: a personal computer including: means for converting text data into facsimile data; means for outputting the facsimile data as transmission data; means for outputting a send command to transmit the transmission data to a designated address; and means for outputting a print command to print out the transmission data; and a facsimile transmission terminal including: means for receiving the transmission data transferred from the personal computer and for storing the transmission data in a transmission data storage area; means, in response to the send command, for transmitting the transmission data to the designated address; and means, in response to the print command, for converting the transmission data into data for printing, and for printing out the data for printing.

For example, the facsimile transmission system may include a personal computer and a facsimile transmission terminal. The personal computer may be installed with an application software for preparing data and converting the data into fax data. The personal computer transmits the fax data to the facsimile transmission terminal, which then transmits the fax data to a remote device.

With the above-described structure, text data, for example, may be produced at the personal computer using an application program, for example, installed in the personal computer. The text data or the like is then converted into transmission data of a facsimile format. After transferring the transmission data to the facsimile transmission terminal, when the print command is outputted to the facsimile transmission terminal, the transmission data, maintained in the transmission data storage area, is converted into data for printing, and is printed out. It is therefore possible to retain a print output having a content the same as the data to be transmitted to the remote device. When viewing the print output and confirming that the text data or the like has been properly converted into the facsimile format, the personal computer may be simply controlled to output the send command. In response to the send command, the facsimile transmission terminal will transmit the transmission data to the designated address. Thus, it is unnecessary for the personal computer to retransmit the transmission data to the facsimile transmission terminal. It is sufficient that the transmission data be transmitted only once. Operability is enhanced.

The personal computer may include means for outputting a deletion command to delete the transmission data from the transmission data storage area. The facsimile transmission terminal may include means, in response to the deletion command, for deleting the transmission data from the transmission data storage area.

With this structure, the facsimile transmission terminal will retain the transmission data until receiving the deletion command even after transmitting the transmission data to the designated address. Accordingly, even after outputting the send command, if the print command is issued, the facsimile terminal will produce a print output.

The facsimile transmission terminal may further include means for receiving a user's inputted send command. The transmission means may transmit the transmission data to the designated address also in response to the user's inputted send command. After controlling the facsimile transmission terminal to produce the print output, the user can operate an operation portion of the facsimile transmission terminal to input the send command, thereby controlling the facsimile transmission terminal to transmit the transmission data to the designated address. It becomes unnecessary for the user to return to the personal computer.

The facsimile transmission terminal may further include means for receiving a user's inputted deletion command. The deleting means may delete the transmission data also in response to the user's inputted deletion command. The user can operate the operation portion of the facsimile transmission terminal to input the deletion command. Accordingly, if the user views the print output and knows errors in the print output, the user can immediately inputs his/her command to control the facsimile terminal to delete the transmission data. The user can also input his/her command to delete the data immediately after inputting his/her command to transmit the data. It becomes unnecessary for the user to return to the personal computer.

The personal computer may further include means for outputting a first command to print the transmission data and to transmit the transmission data to the designated address. The facsimile transmission terminal may further include first control means for controlling, in response to the first command, the print means to convert the transmission data into data for printing and then to print the data for printing and the transmission means to transmit the transmission data to the designated address.

With this structure, in response to the first command that is outputted from the personal computer only once, a print output of the transmission data can be produced and the transmission data can be transmitted to the designated address. The operability of the facsimile transmission is greatly enhanced.

The first control means may include means for deleting the transmission data from the transmission data storage area after the transmission data is transmitted to the designated address. After the transmission data is printed and transmitted, the transmission data is automatically deleted. The transmission data storage area will not be occupied by transmission data, that has already been transmitted to the designated address. The storage area can be effectively used.

The facsimile transmission terminal may further include means for receiving a user's inputted first command. The user can operate the operation portion of the facsimile transmission terminal to input his/her first command. When the user simply inputs the first command only once, the facsimile transmission terminal can print, transmit, and delete transmission data. Operability of the system is enhanced.

The personal computer may further include means for outputting a second command to print the transmission data, to display a message asking a user whether or not the transmission data is to be transmitted to the designated address, and to transmit the transmission data to the designated address when a transmission instruction is inputted in response to the message. The facsimile transmission terminal may further include: means for receiving an instruction inputted by the user; means for displaying the message; and second control means for controlling, in response to the second command, the print means to convert the transmission data into data for printing and then to print the data for printing, the display means to display the message, and the transmission means to transmit the transmission data to the designated address when the transmission instruction is received by the instruction receiving means.

With this structure, in response to the second command outputted from the personal computer only once, a print output of the transmission data can be produced, and if the user confirms that the print output is acceptable and inputs his/her transmission instruction, the transmission data will be immediately transmitted to the designated address. The operability of the facsimile transmission is greatly enhanced. It is sufficient that the user inputs his/her instruction based on his/her observed print output.

The second control means may include means for deleting the transmission data from the transmission data storage area after the transmission data is transmitted to the designated address or after the instruction receiving means receives another instruction not to transmit the transmission data to the designated address.

After the transmission data is printed out and transmitted or after the transmission data is printed out and not transmitted, the transmission data is automatically deleted. The transmission data will not occupy the transmission storage area in vain.

The second control means may further include means for deleting the transmission data when the instruction indicating whether the transmission data is to be transmitted or not is not inputted to the instruction inputting means within a predetermined period of time.

Accordingly, in the case where no instruction is inputted, the time period when the storage area is occupied with the transmission data can be limited to the predetermined time period.

The facsimile transmission terminal may further include means for receiving a user's inputted second command. The user can operate the operation portion of the facsimile transmission terminal to input his/her second command. When the user inputs the second command only once, the facsimile transmission terminal can print, transmit or cancel transmitting, and delete transmission data. Operability of the system is enhanced.

BRIEF DESCRIPTION OF THE DRAWINGS

The above and other objects, features and advantages of the invention will become more apparent from reading the following description of the preferred embodiment taken in connection with the accompanying drawings in which:

FIG. 2(a) is a block diagram showing a control portion in a color laser printer provided in the system of the first embodiment;

FIG. 19(b) is a schematic view showing a state of a memory region when the page protect mode is being ON;

DETAILED DESCRIPTION OF THE PREFERRED EMBODIMENTS

Figure 1:
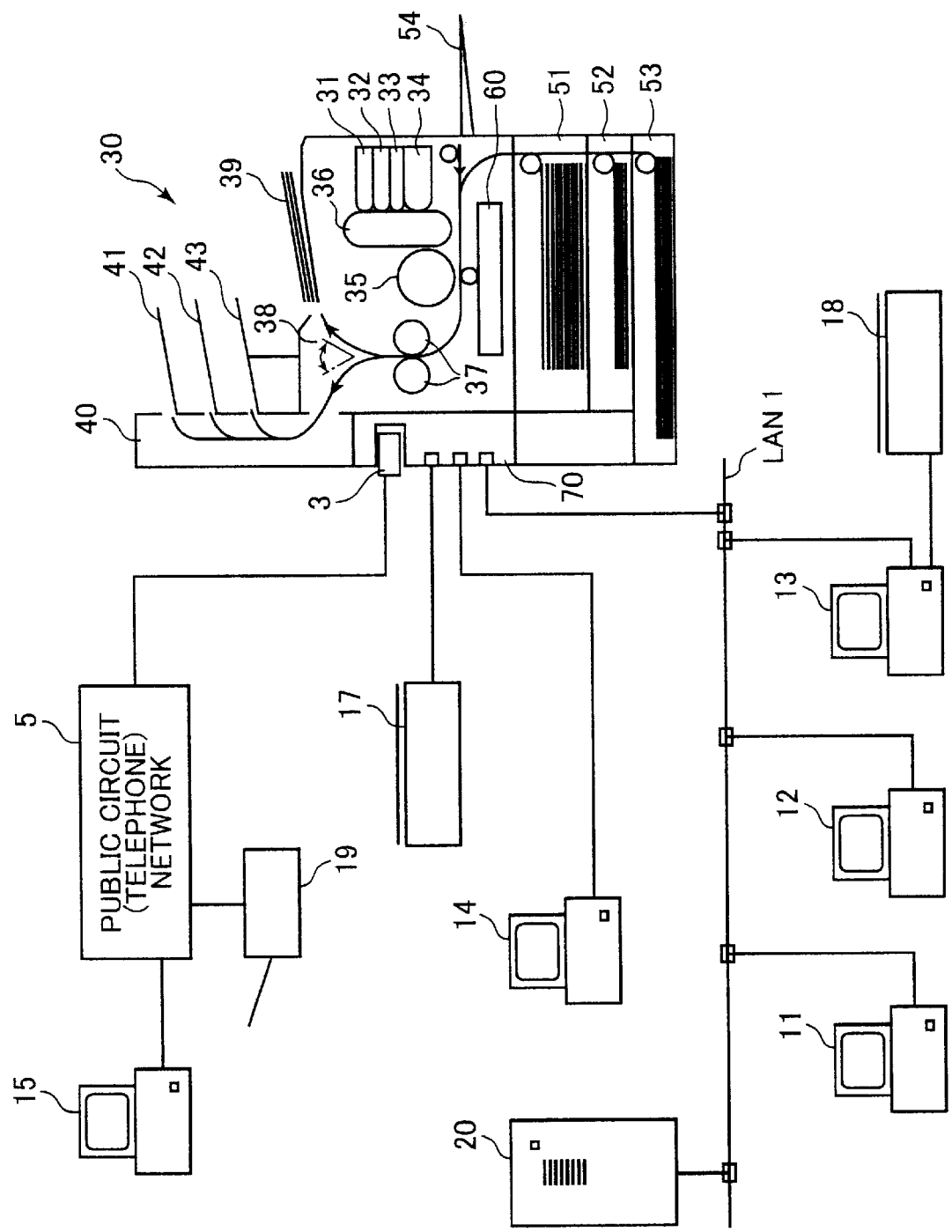
FIG. 1 is a schematic view of an entire system according to a first preferred embodiment of the present invention.

A facsimile transmission system according to preferred embodiments of the present invention will be described while referring to the accompanying drawings wherein like parts and components are designated by the same reference numerals to avoid duplicating description.

First Embodiment

A local area network (facsimile transmission system) according to a first embodiment of the present invention will be described below with reference to FIGS. 1–23.

First, an explanation will be provided for overall configuration of the local area network system according to the first embodiment of the present invention.

As shown in FIG. 1, the system according to the first embodiment includes a color laser printer 30, a plurality of personal computers 11 to 14, a server 20, image scanners 17, 18, and a local area network (LAN) 1. The color laser printer 30, the personal computers 11 to 13, and the server 20 are connected to the local area network (LAN) 1. The personal computer 14 and the image scanner 17 are directly connected to the color laser printer 30 without passing through the LAN 1.

The color laser printer 30 is mounted with a fax modem card 3, which is connected to a public network 5, such as a telephone network. The printer 30 is capable of transmitting facsimile messages to a remote personal computer 15 or a remote facsimile machine 19 over the public telephone network 5 using the fax modem card 3. The facsimile machine 19 and the personal computer 15 include internal modems connected to the public telephone network 5. At least one of the personal computers 11 to 13 (13, in this example) that are connected to the LAN 1 is connected to an image scanner 18.

In order to perform color printing, the color laser printer 30 is provided with a Y station 31 storing a yellow toner, an M station 32 storing magenta toner, a C station 33 storing cyan toner, and a K station 34 storing black toner. Also, the color laser printer 30 includes an intermediate transfer belt 36, a transfer drum 35, a pair of fixing rollers 37, a sheet discharge switching mechanism 38. The intermediate transfer belt 36 is for transferring toner from the stations 31 to 34 to the transfer drum 35. The sheet discharge switching mechanism 38 is for switching discharge of printed sheets to either a normal sheet discharge stacker 39 on the stop of the main body or to sheet discharge stackers 41 to 43 of a sorter portion 40. Although not shown in the drawings, the sorter portion 40 includes a stacker switching mechanism and a sheet discharge sensor. The stacker switching mechanism is for discharging sheets onto one of the sheet discharge stackers 41 to 43 during sorter output. The sheet discharge sensor is provided near the output port of each stacker 41 to 43.

The color laser printer 30 is provided with No. 1 to No. 2 trays 51 to 52. A No. 3 tray 53 may be additionally provided as shown in FIG. 1. A manual feed tray 54 is provided at the front surface of the main body. The trays 51 to 53 and the manual feed tray 54 serve as sheet supply mechanisms. Normally, the No. 1 tray 51 is fitted with A4 size normal sheets of paper, the No. 2 tray 52 is filled with overhead projector (OHP) sheets for printing documents used in an overhead projector, and the No. 3 tray 53 is filled with A3 size normal sheets of paper.

Figure 2B:
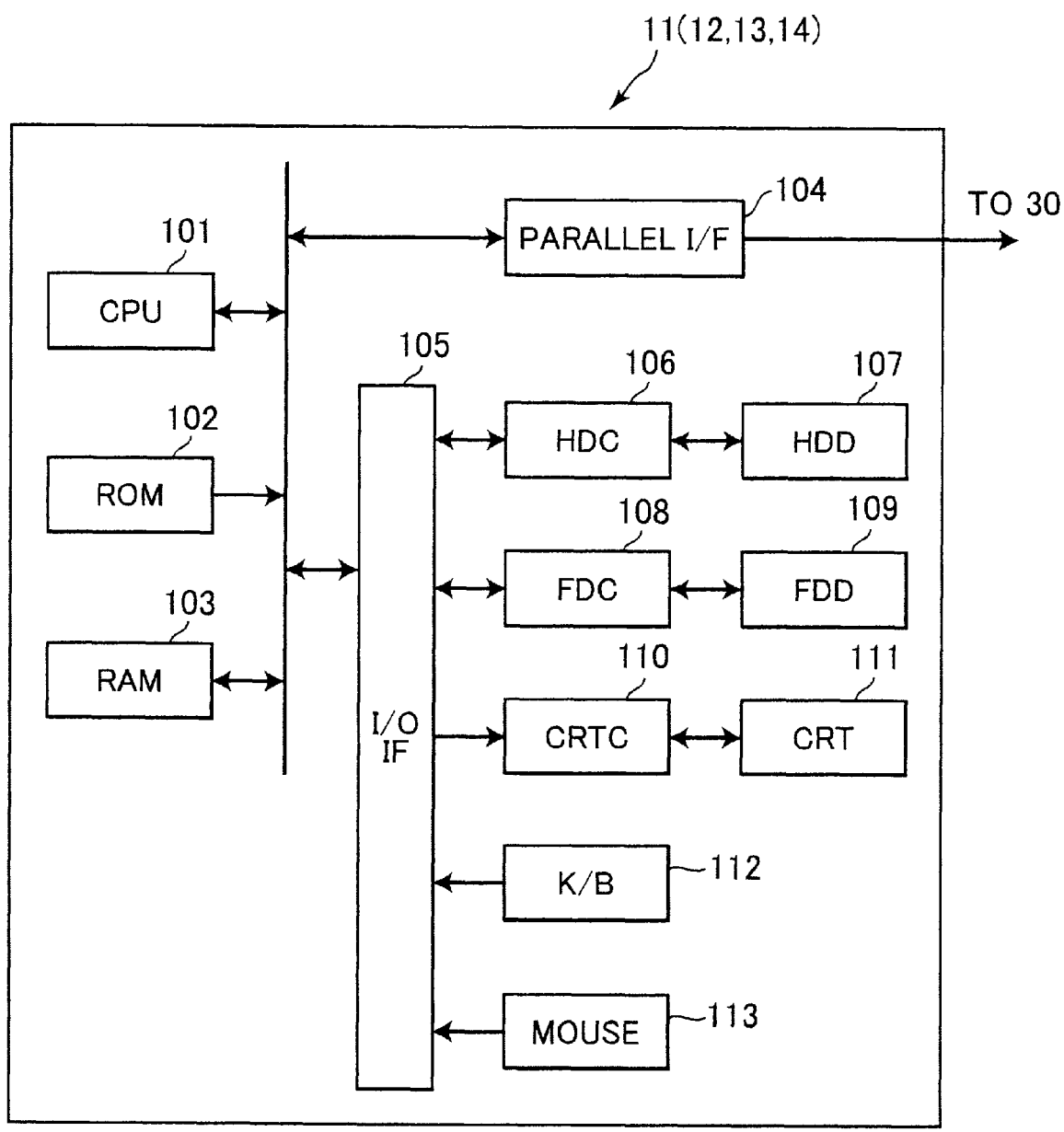
FIG. 2(b) is a block diagram showing a control portion in each personal computer provided in the system of the first embodiment.

FIG. 2(a) is a block diagram showing electrical configuration of the color laser printer 30. As shown in FIG. 2, the color image printer 30 is configured mainly from a control portion 60, an interface portion 70, and a mechanism portion 80. As shown in FIG. 1, the control portion 60 for controlling drive of the color laser printer 30 is provided in the center of the printer's main body. The interface portion 70 for mounting the fax modem card 3 and the like is provided to the rear surface of the main body.

Returning to FIG. 2, the control portion 60 includes a CPU 61, a ROM 62, a RAM 63, an expansion RAM 64, a NVRAM 65, a flash ROM 66, an ASIC 67, and a timer 68. The CPU 61 is the core of the control portion 60 and executes computation processes for realizing a variety of functions of the color laser printer 30. The ROM 62 is prestored with data, such as font data and a variety of programs executed by the CPU 61. The RAM 63 and the expansion RAM 64 are used as data storage regions and work memory used by the CPU 61 when executing a variety of computation processes. The NVRAM 65 is a non-volatile RAM for storing a variety of independent settings which are optionally set by the user.

The flash ROM 66 can be used to store data, such as form and font data and a variety of programs. For example, programs and the like added, for example, when upgrading the version of a program, can be written in the flash ROM 66 while the flash ROM 66 is mounted in the main body. In this way, the data in the flash ROM 66 can be maintained even after the main body power is turned off. The ASIC 67 is an application specified IC and executes processes using hardware logic, without relying on the CPU 61. The timer 68 is used for setting interrupt timing of a variety of computation processes to be described later.

Figure 3:
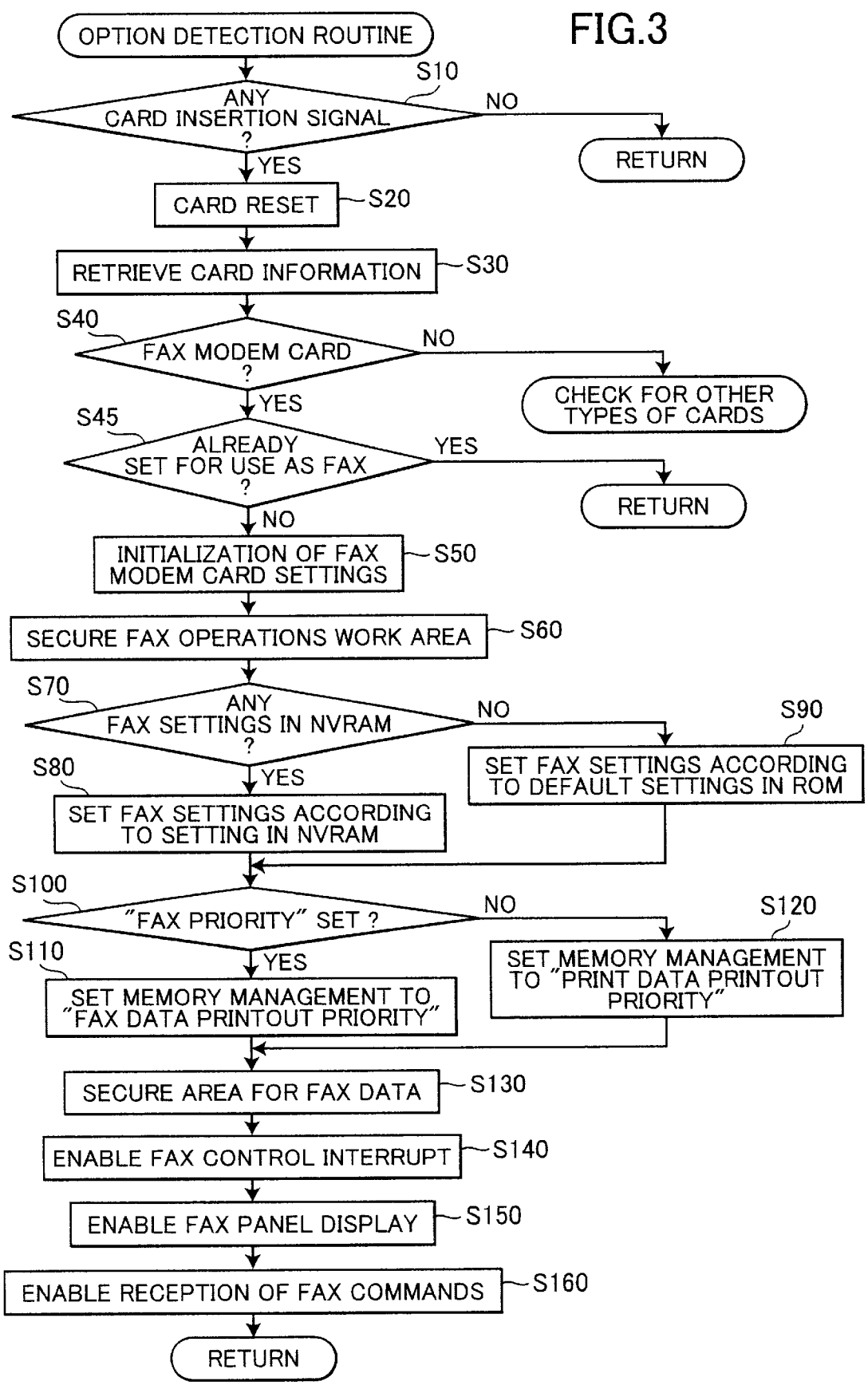
FIG. 3 is a flowchart showing an option detection routine executed by the printer.
Figure 4:
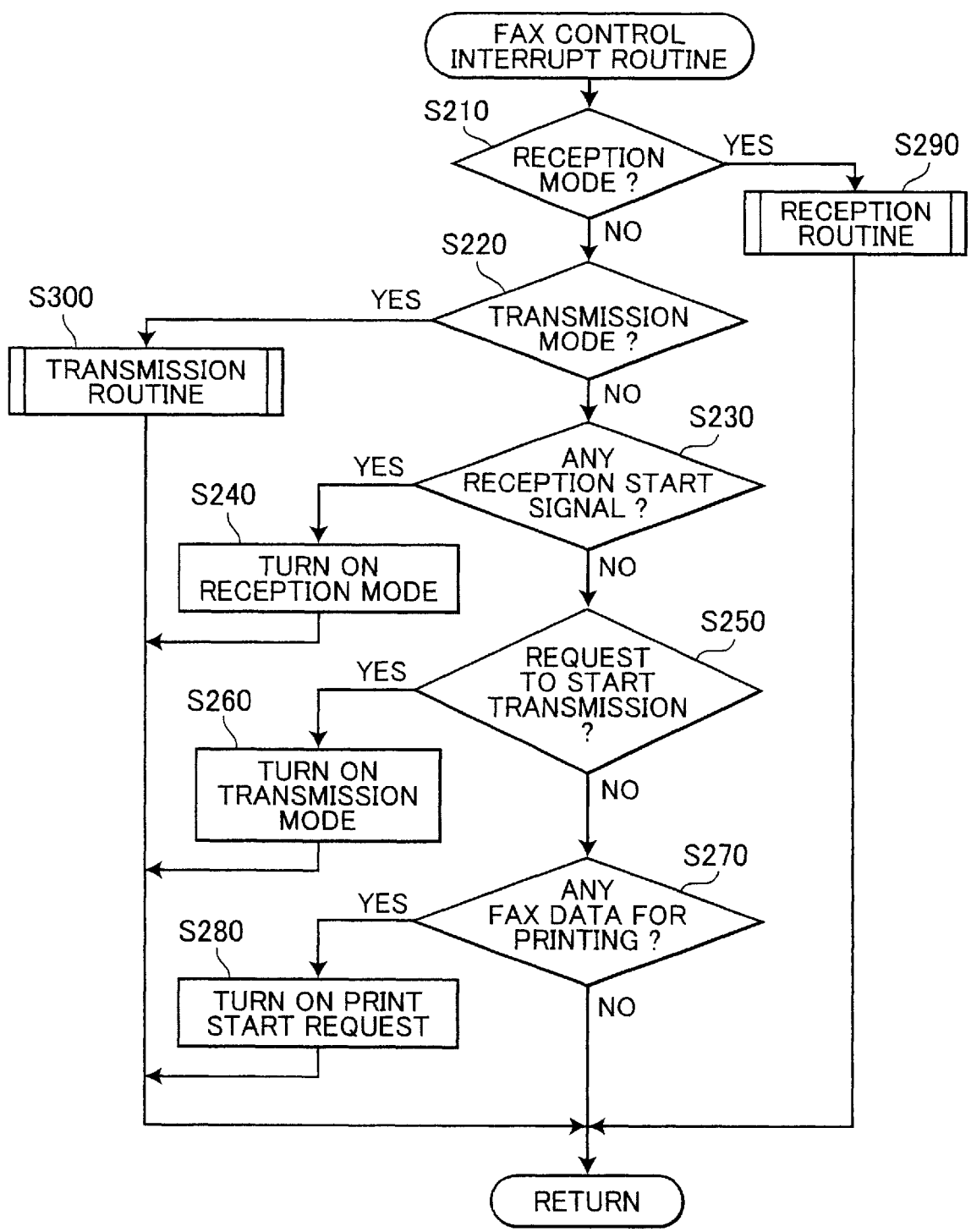
FIG. 4 is a flowchart showing a fax control interruption routine executed by the printer.

Programs stored in the ROM 62 and the flash ROM 66 include; a program for realizing a printer function for printing based on print data transferred from the computers 11 to 14 and a program of FIGS. 3–5(*c*), 6(*b*), and 7–23 for realizing a fax function for processing received fax data. It should be noted that the printer 30 can receive print data from any nearby sources, such as the computers 11–14, and perform its printer function. The printer 30 can also receive fax data either from nearby sources, such as the computers 11 to 14, or from remote sources over the public telephone network 5, for example, from the computer 15 or the facsimile machine 19, and perform its fax (facsimile) communication function. For example, the program for realizing the fax function includes a program for converting G3 compressed facsimile data into compressed data for printing and a program for executing band processes for developing the compressed data into bit map data for actual printing.

The program for realizing the fax function can be prestored in the ROM 62, or can be added when installing an upgraded version of a program in the flash ROM 66. Alternatively, the program can be added using a ROM card installed in one of two PCMCIA 75, 76 slots to be described later. The program can be transferred to the printer 30 from the personal computers 11–14.

The interface portion 70 includes an RS-232C interface 71 and a bi-directional Centronics interface 72 for connecting the printer 30 with the personal computer 14, a network interface 73 for connecting the printer 30 with the LAN 1, an SCS1 interface 74 for connecting the printer 30 with the image scanner 17, and the two PCMCIA slots 75, 76. The two PCMCIA slots 75, 76 conform to PCMCIA standards (Personal Computer Memory Card International Association Standards) and serve as option interfaces for mounting memory cards, such as the FAX modem card 3, ROM cards, hard disk cards, and RAM cards. The color laser printer 30 of the first embodiment can be used as a facsimile communication machine in addition to being used as a printer by mounting the fax modem card 3 into one of the PCMCIA slots 75, 76.

The mechanism portion 80 includes a printing engine portion 81, a sheet supply/discharge portion 82, an operation portion 83, a display portion 84, and a detection portion 85. The printing engine portion 81 is for printing on recording sheets, and includes the Y, M, C, and K toner stations 31 to 34, the transfer drum 35, the intermediate belt 36, and motors (not shown) for driving these components. The sheet supply/discharge portion 82 includes the sheet discharge switching mechanism 38, the discharge trays 39, 41 to 42, the sorter portion 40, and the sheet supply trays 51 to 53. The sheet supply/discharge portion 82 performs a well-known auto-sheet feeding operation to automatically feed sheets from the sheet trays 51 to 53 to the transfer drum 35, and feed the sheets between the fixing rollers 37 and 37 toward the sheet discharge switching mechanism 38. The operation portion 83 includes a control panel, for example, with switches for inputting a variety of settings and a power switch. The display portion 84 is configured from an LCD, an LED, and the like and is provided for displaying operation conditions of the printer. The detection portion 85 is configured from a sheet size detection sensor, a sheet type detection sensor, the sheet discharge sensor, and the like. The detection portion 85 detects sizes and types of sheets stored in the various sheet supply trays 51–53 and also detects paper jams. The sheet size detection sensor is for detecting a size of sheets stored in each sheet supply tray 51–53. The sheet type detection sensor is for detecting a type or kind of sheets stored in each sheet supply tray 51–53. For example, the size detection sensor is constructed to detect a position of a sheet guide which is provided in each sheet supply tray for guiding sheet stored therein and whose position is changed according to the size of the sheets stored in the sheet supply tray. Or, the user can previously manipulate the operation panel 83 to input information of size of sheets he or she has placed in each tray. The sheet type detection sensor may be of a light reflection type for detecting light reflected from each sheet stored in each tray to determine the type or kind of the sheets. Alternatively, the sheet type detection sensor may be of a light transmission type for detecting light that has transmitted through each sheet stored in each tray to determine the type or kind of the sheets. Or, the user can previously manipulate the operation panel 83 to input information of kind or type of sheets he or she has placed in each tray.

FIG. 2(*b*) shows a block diagram showing electrical configuration of each personal computer 11–14. As shown in FIG. 2(*b*), the personal computer 11 (12, 13, or 14) includes: a CPU 101, a ROM 102, a RAM 103, a parallel interface 104, and an input/output interface 105, all of which are interconnected with one another via a bus. The parallel interface 104 is connected to the printer 30. The input/output interface 105 is connected to: a hard disk drive 107 via a hard disk controller 106, a floppy disk drive 109 via a floppy disk controller 108, a CRT 111 via CRT controller 110, a keyboard 112, and a mouse 113.

The CPU 101 controls the entire portion of the personal computer 11 (12, 13, or 14.) The ROM 12 stores therein programs executed by the CPU 101. Representative examples of the programs include: an application software program for preparing text data; a fax application program for converting text data into fax data, and a program shown in FIG. 6(*a*) as will be described below to control the printer 30 both in the printer function and in the facsimile function.

The CRT 111 is for displaying various screens, such as an input screen for enabling a user to input information of a remote party where fax data is desired to be transmitted. The keyboard 112 and mouse 113 are for enabling the user to input his/her desired instructions, such as instructions to control the printer 30 to print fax data, to send fax data to his/her desired remote party, and to delete fax data.

With the above-described structure, the CPU 101 can executed application processes using the application software, such as word processing software, installed in the ROM 102. During the application processes, the CPU 101 can prepare text data. After preparing text data, the user can input a print command through the keyboard 112 or mouse 113. When inputting the print command, the user selects the printer 30 as a normal printer or as a fax function-added printer.

Although not shown in the drawings, each computer 11–14 is installed with two printer drivers so that the single printer 30 can be used as both a normal printer and a fax function-added printer. The ROM 102 is installed with a fax application program for performing processes on fax transmission data. The fax application program is executed in response to the print command that designates the printer 30 as a fax function-added printer. The fax program serves to convert text data into fax transmission data, that is, a G3 compressed type FAX data and to transmit the fax transmission data to the printer 30. It is noted that when the print command designates the printer 30 as a normal printer, the application software that has prepared the text data will perform its normal printing operation to prepare print data based on the text data and to transmit the print data to the printer 30.

According to the present embodiment, the printer 30 is set into a condition capable of performing facsimile communication function in addition to its original printing function when the FAX modem card 3 is properly mounted to the PCMCIA slot 75 or 76.

More specifically, the CPU 61 of the printer 30 performs an option detection routine of FIG. 3 when the power of the printer 30 is first turned on. The CPU 61 also executes the option detection routine repeatedly and periodically while the power of the printer 30 is being on. The option detection routine enables the printer 30 to function as a facsimile communication machine when the fax modem card 3 is mounted in one of the PCMCIA slots 75 and 76.

The option detection routine will be described below.

As shown in FIG. 3, the CPU 61 first judges in S10 whether a card insertion signal is outputted from one of the PCMCIA slots 75, 76 to thereby determine whether some type of card is inserted in one of the PCMCIA slots 75 and 76. If no card insertion signal is detected from the PCMCIA slot 75 or 76 (S10:NO), then this routine is ended.

If a card is inserted into one of the slots 75, 76 (S10:YES), then in S20, the CPU 61 resets the card according to a card reset signal (not shown in the drawings). Afterward, in S30, the CPU 71 retrieves card information from the inserted card. In S40, the CPU 61 judges, based on the card information read in S30, whether or not the card presently inserted in the PCMCIA slots 75 or 76 is a fax modem card 3.

If the CPU 61 determines that the mounted card is not the fax modem card 3 (S40:NO), then the program proceeds to another routine for checking other types of cards. Examples of the other cards that can be inserted into the slots 75 and 76 include expansion memory cards, font cards, and LAN cards.

When the CPU 61 determines that the inserted card is a fax mode card 3 (S40:YES), then in S45, the CPU 61 judges whether or not the printer 30 has already been set up for use as a facsimile machine. It is noted that the process of S45 is performed to ensure that a fax modem card 3 can be mounted in only one of the two slots 75, 76 at a time. This will prevent problems that could occur when a plurality of fax modem cards mounted at the same time, such as two fax transmissions being attempted at the same time. When fax settings have already been set (S45:YES), then this routine is ended.

On the other hand, when the printer 30 has not yet been set up for use as a facsimile machine (S45:NO), initialization processes are performed on the fax modem card 3. Next in S60, a work area for fax operations is secured in the RAM 63 and the expansion RAM 64 as shown in FIGS. 19(*b*) and 19(*c*).

Next in S70, the CPU 61 judges whether or not there are any fax settings in the NVRAM 65. The printer 30 is configured so that when a user sets new values, which differ from default values prestored in the ROM 62, with respect to a variety of fax condition settings, the new settings are stored in the NVRAM 65. The new settings are maintained in the NVRAM 65 even when the power of the printer 30 is turned OFF. Therefore, there is not need to again set the fax setting conditions each time the power source is turned on.

When it is judged that fax settings exist in the NVRAM 65 (S70:YES), then in S80, the fax condition settings for the fax communication function are set according to the fax setting values stored in the NVRAM 65. On the other hand, when no fax settings are found in the NVRAM 65 (S70:NO), then in S90, fax condition settings are set according to the default values preferred in the ROM 62.

The fax condition settings set in S80 or S90 include: 1)RAM size of data area, 2)ring delay, 3)receive ON/OFF, 4)fax priority ON/OFF, 5) reduction recording, and 6)log recording interval. The setting for 1)RAM size of data area is for setting how many megabytes or how many percents of the RAMs 62, 64 are to be used as storage area for fax images as shown in FIGS. 19(*b*) and 19(*c*).

The setting of 2) ring delay is for setting low how many ringing signals have to be received before reception response processes are performed during reception of a facsimile message from remote sources.

The setting of 3)receive ON/OFF is for setting the printer 30 either to function exclusively for transmitting faxes or to also function for receiving facsimile messages. When this setting is set to ON, the printer 30 will be capable of sending and receiving facsimile messages. On the other hand, when the setting is set to OFF, the printer 30 will function exclusively for transmitting facsimile messages.

The setting of 4) fax priority ON/OFF is for setting whether printing based on fax data or printing based on print data is to be given priority when a command for printing based on fax data and a command for printing based on print data are received at the same time. Printing based on fax data is given priority when fax priority is set to ON and printing based on print data is given priority when the fax priority is turned OFF. When the setting is set to OFF, for example, the fax printing routine for printing fax reception data will be executed as shown in FIG. 17(*a*) or 18(*a*) as will be described later.

The setting of 5) reduction recording enables reducing received fax images in the lengthwise direction before printing them out. The reduction recording setting can be set to either automatic, OFF, or 90 percent. When the reduction recording setting is set to automatic, then each page of received data is automatically recorded at a reduction rate that fits the corresponding single page's worth of image into a single sheet of paper. In this case, the received image data for each single page is divided between two separate pages if the required reduction rate becomes smaller than 50 percent.

When the reduction recording setting is set to OFF received images are not reduced in the lengthwise direction before being printed out. In this case, long fax images will be printed out divided between two or more separate sheets.

When the reduction recording setting is set to 90 percent, then all received fax images are printed out at a fixed reduction rate of 90 percent in the lengthwise direction. This setting is beneficial when the sheets stored in the trays of the color laser printer 30 are slightly smaller than the sheet size of received fax data. For example, this setting is beneficial if the sheet supply trays of the printer color laser printer 30 are filled with letter size (with a length of about 279 mm) recording sheets, but the printer 30 receives fax data for an A4 size document (with a length of 297 mm).

The setting of 6) log recording interval is for setting the time interval between the log information of fax communication is printed out on a sheet. The log recording interval can be set to OFF. 6 hours, 12 hours, 24 hours, 2 days, 4 days, or 7 days. Log information includes information on when a fax has been transmitted or received, whether the fax communication is reception or transmission, the name of the person who has sent or received the facsimile transmission, transmission or reception period of time, the number of pages in the fax, and the transmission reception results.

It is noted that the fax setting conditions further include 7) compulsory print mode. The setting for 7) compulsory print mode is for setting whether the printer 30 should be set to a compulsory print mode. When the printer 30 is set in the compulsory print mode, if only an insufficient memory area is available for fax data, fax data will be printed on sheets if the sheets have a sufficient size for printing the fax data even when the sheets are not normal type of papers as will be described later.

After fax settings are set in S80 or S90, then in S100, it is judged whether or not fax priority is set based on processes performed in S80 or S90. If fax priority is set (S100:YES), then fax priority memory management is set in S110 as a method for managing memories. When fax priority memory management is set, print data received from the personal computers 11 to 14 during reception of facsimile will be stored in a printer buffer without printing being performed according to the print data. On the other hand, when fax priority is not set (S100:NO), then a printer priority memory management is set in S120. When printer priority memory management is set, then in contrast to fax priority memory management setting, fax data received during reception of print data will be merely stored in a fax buffer region without printing being performed on a recording sheet based on the fax data.

In S130, a fax data area is secured in the RAMs 63, 64 as shown in FIGS. 19(*b*) and 19(*c*) according to the setting of RAM size for data area set in the processes of S80 or S90. Accordingly, as shown in FIG. 19(*b*) or 19(*c*), the fax data area and the fax work area are secured in S60 and in S130 in the RAM 63 or 64. The fax data area and the fax work area will be used during the fax function process. A free area initially formed in the RAM as shown in FIG. 19(*b*) or 19(*c*) will be used during both the fax function process and the printer function process. A printer work area and an image region, also initially formed in the RAM, will be used during the printer function process.

Then, in S140, fax control interrupt routines of FIGS. 4–5(*c*), 9, 10–16, 17–20 are enabled, whereupon the variety of interrupt routines for controlling fax operations can be executed. Each of the interrupt routine will be started being executed at a corresponding predetermined timing.

Further in S150, display of a screen for allowing a user to change fax settings, that is, of the fax RAM size and the like, is enabled. As a result, the display 84 is controlled to show a screen (not shown) enabling a user to set or change the present fax settings. Viewing the screen, the user can manipulate the operation panel 83 to input his/her desired values of fax settings. The changed fax settings are stored in the NVRAM 65 as described above. When the option detection process of FIG. 3 is executed again, the changed fax settings will be set in S80. Thus, display of this fax setting screen is enabled at this stage, but not enabled at the initial stage. This is because it is unnecessary for the user to perform settings relating to fax functions or to change the settings relating to fax functions unless the user inserts the fax modem card 3 in one of the PCMCIA slots 75 and 76 to set the printer 30 as a fax function-added printer. Thus, in S150, the display 84 is started being controlled to display not only a screen (message) for the printer function but also another screen (message) for the fax function. The display 84 can also display the screens both for the fax function and the printer function according to the interrupt routine of FIG. 9 as will be described later.

Next in S160, fax command reception is enabled so that fax commands can be received from the personal computers 11 to 14. That is, the interface portion 70 (interfaces 71, 72, and 73) is controlled so as to be capable of receiving commands relating to the fax functions from the personal computers 11–14. As a result, the printer 30 is brought into a condition capable of receiving various commands relating to the fax communication function, such as a fax entering command, various data operation commands (print command, send command, and delete command), and complete command, as will be described later with reference to FIG. 6(*b*). For example, the printer 30 can receive, from the personal computers 11 to 14, a send command to send fax data.

When the above-described option detection routine is executed to perform settings to the printer 30, the printer 30 is brought into a condition that is capable of functioning also as a facsimile machine according to settings set during this option detection routine. As will be described later, the printer 30 is brought into a condition that can receive fax reception data from remote devices and can print the received fax data according to processes of FIGS. 4, 5(*a*), 5(*c*), and 17(*a*) or 18(*a*) and that can receive fax transmission data from computers 11–14 and can print, transmit, and delete the received fax transmission data according to processes of FIGS. 4 5(*b*) 5(*c*), and 6. In other words, the program of the option detection routine of FIG. 3 can add fax communication function to the printer 30. Because the option detection routine is executed automatically when the printer 30 is turned ON and is automatically executed repeatedly while the printer 30 is being ON, the printer 30 can be automatically brought into the fax function-added printer.

It is noted that the option detection routine of FIG. 3 can be designed so that the printer 30 can function as a facsimile machine also when the fax modem 3 is connected to the RS-232C interface 71. In this case, the processes of S10 to S40 may be modified so that the CPU 61 judge whether or not the fax modem 3 is connected to the RS-232C interface 71 by detecting presence or absence of a response to an AT command, that is outputted from the printer 30 to the RS-232C interface 71. In this case, however, when the fax modem 3 is not connected to the RS-232C interface 71 but some personal computer is connected to the RS-232C interface 71, the AT command will be accumulated in the personal computer and the personal computer will be in error. Accordingly, in this case, it is preferable that the processes of S10 to S40, that is, the option detection routine of FIG. 3 be designed to be started only when the user inputs a command to detect the FAX modem card 3 that the user has mounted to the RS-232C interface 71.

Next, an explanation will be provided for a fax control interrupt routine represented by the flowchart shown in FIG. 4. This routine is enabled by the process of S140 in the option detection routine of FIG. 3. The FAX control interrupt routine is executed as an interrupt routine each time a predetermined duration of time elapses.

When the fax interrupt control routine is started, the CPU 61 first judges in S210 whether or not a reception mode is set to ON. When the reception mode is not set to ON (S210:NO), then in S220, it is determined whether or not a transmission mode is set to ON. If not (S220:NO), then in S230, it is judged whether or not a reception start signal has been received. Whether or not a reception start signal has been received is determined by presence or absence of ringing signals from a remote fax transmission source. It is judged that a reception start signal has been received only when ringing signals are received in the number set, as the ring delay setting, during S80 or S90 in the option detection routine of FIG. 3.

When it is judged that a reception start signal has been received (S230:YES), then in S240, the reception mode is set to ON and this interrupt routine ends. On the other hand, when it is judged that no reception start signal has been received (S230:NO), then in S250 it is judged whether or not a transmission start request from any personal computer 11 to 14 has been received. If a transmission start request has been received (S250:YES), then in S260 the transmission mode is set to ON and the program leaves this interrupt routine.

When no transmission start request has been received (S250:NO), then in S270 it is judged whether or not there is any fax data that needs to be printed out. When such fax data exists (S270:YES), then in S280, a print start request is turned ON and this interrupt routine ends.

If during the fax control interrupt routine the reception mode is turned ON in S240, then the next time this interrupt routine is performed, S210 will result in a positive judgment so that reception processes are executed in S290. Alternatively, if the transmission mode is turned ON in S260, then the next time this interrupt routine is performed, S220 will result in a positive determination so that transmission processes are executed in S300. In other words, none the processes from S230 on are performed in the fax control interrupt routine when either the reception mode is turned ON (S210:YES) or the transmission mode is turned ON (S220:YES). Therefore, the reception mode and the transmission mode will never be simultaneously turned on. It should be noted, however, that if the print start request is turned ON in S280, either the reception mode or the transmission mode could be turned ON when the fax control interrupt routine is executed next.

It should be noted that if the 3)receive ON/OFF setting is set to OFF in S80 or S90 during the option detection routine of FIG. 3, then S230 will always result in a negative determination, that is, a start signal will never be judged as being received. As a result, S230 will always result in a negative determination so that the printer 30 will not enter the fax reception mode.

Figure 5A:
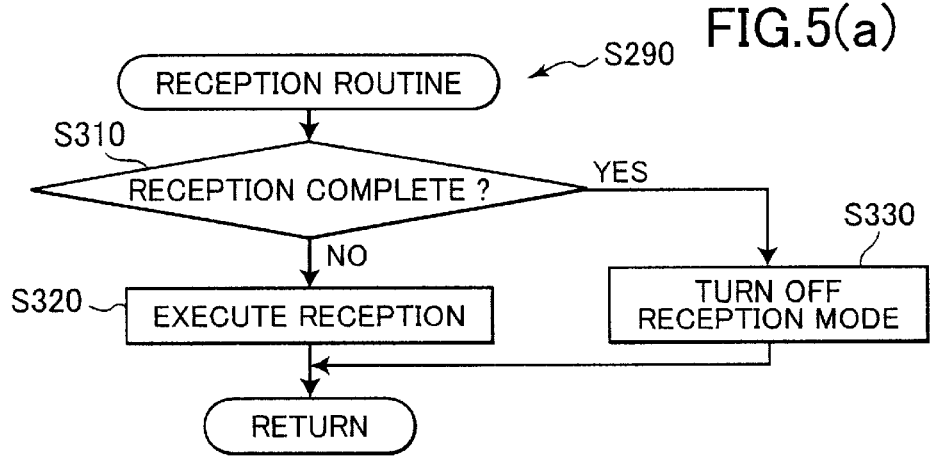
FIG. 5(a) is a flowchart showing a fax reception routine executed by the printer.

Next, an explanation will be provided for the reception process of S290 represented by the flowchart shown in FIG. 5(a). The reception routine is repeatedly executed when the reception mode is being ON, and performs reception of fax data in S310 and S320 until reception is completed from a remote device. Once reception is completed (S310:YES), then the reception mode is turned OFF in S330 and the reception routine is ended. It is noted that in S330, the received fax data is designated to be printed. That is, a print designation (P) is set for the fax reception data. Accordingly, the judgment of S270 (FIG. 4) will become affirmative, and a print start request will be turned ON in S280.

Figure 5B:
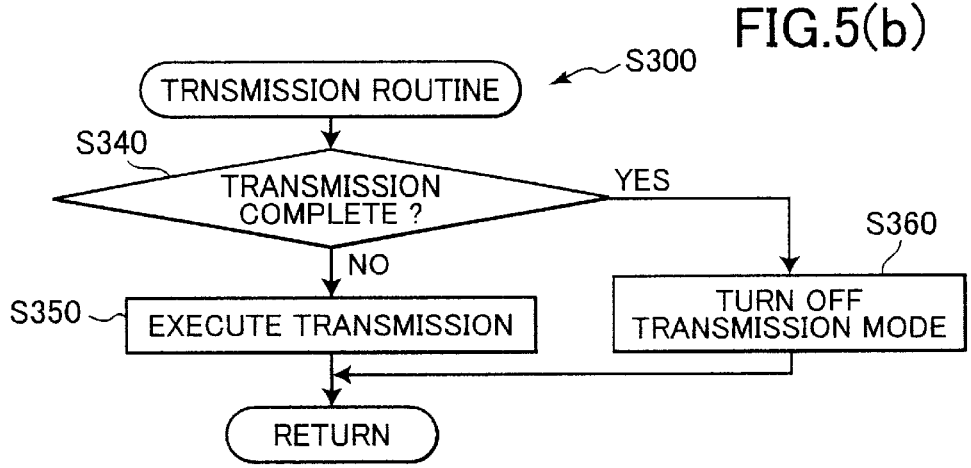
FIG. 5(b) is a flowchart showing a fax transmission routine executed by the printer.

Next, an explanation will be provided for the transmission process of S300 represented by the flowchart in FIG. 5(b). The transmission routine is repeatedly executed when the transmission mode is being turned ON. Transmission of fax data to a remote device is executed in S340 and S350 until transmission is completed. Once transmission is completed (S340:YES), then in S360, the transmission mode is turned OFF, and the transmission mode is ended.

Figure 5C:
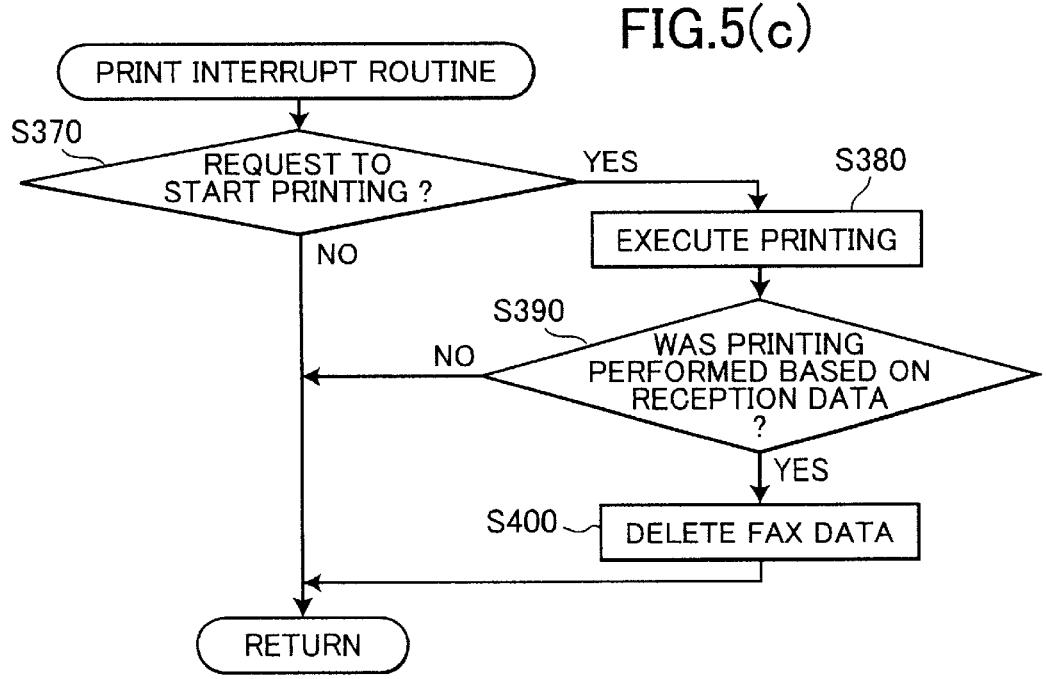
FIG. 5(c) is a flowchart showing a fax print interrupt routine executed by the printer.

Next, an explanation will be provided for a print interrupt routine represented by the flowchart in FIG. 5(c). The print interrupt routine is executed as an interrupt routine with a lower level than the fax control interrupt routine of FIG. 4. That is, when both the interrupt routines of FIGS. 4 and 5(c) are started simultaneously, the interrupt routine of FIG. 4 is given priority. In the print interrupt routine, it is first judged in S370 whether or not the print start request is turned ON. If the print start request is not turned ON, then this interrupt routine is ended. If the print start request is turned ON (S370:YES), then printing is executed in S380. For example, when fax reception is completed and fax reception data is designated to be printed in S330 (FIG. 5(a)), the print start request is turned ON in S280, and therefore the printing is executed in S380 in a manner as will be described below with reference to FIGS. 17(a) and 18(a). In S390, it is judged whether or not printing just performed in S380 has been based on fax reception data received over the public telephone network 5. If so (S390:YES), then in S400, the fax reception data is deleted because it has already been printed out. On the other hand, if printing performed in S380 has not been based on fax reception data (S390:NO), then the routine is ended without deleting the fax data.

As a result of the above-described print interrupt routine of FIG. 5(c), fax data is immediately deleted once printed out if the printed fax data has been received over the public telephone network 5. However, when the printed fax data has been received, for example, from one of the personal computers 11 to 14 for the purpose of transmission to a remote device, such as the personal computer 15 or the facsimile machine 19 over the public telephone network 5, then the data is not deleted immediately after printing is completed.

As will be described later, the system of the present embodiment is provided with a function for producing a test print based on fax data before the flux data is transmitted as a facsimile message to a remote device. The test print is produced to enable the user to confirm whether text data, prepared using a word processor software package and the like installed as an application in the personal computer 11 12, 13, or 14, has been correctly converted to fax data. After the test printing has been performed in S380, the fax data is retained in the memory of the color laser printer 30 so that the personal computer 11, 12, 13, or 14 need not again output the fax data to the color laser printer 30. With this configuration, only operations that need to be performed for fax data is to output commands instructing that the fax data should be transmitted as a facsimile message.

Figure 6A:
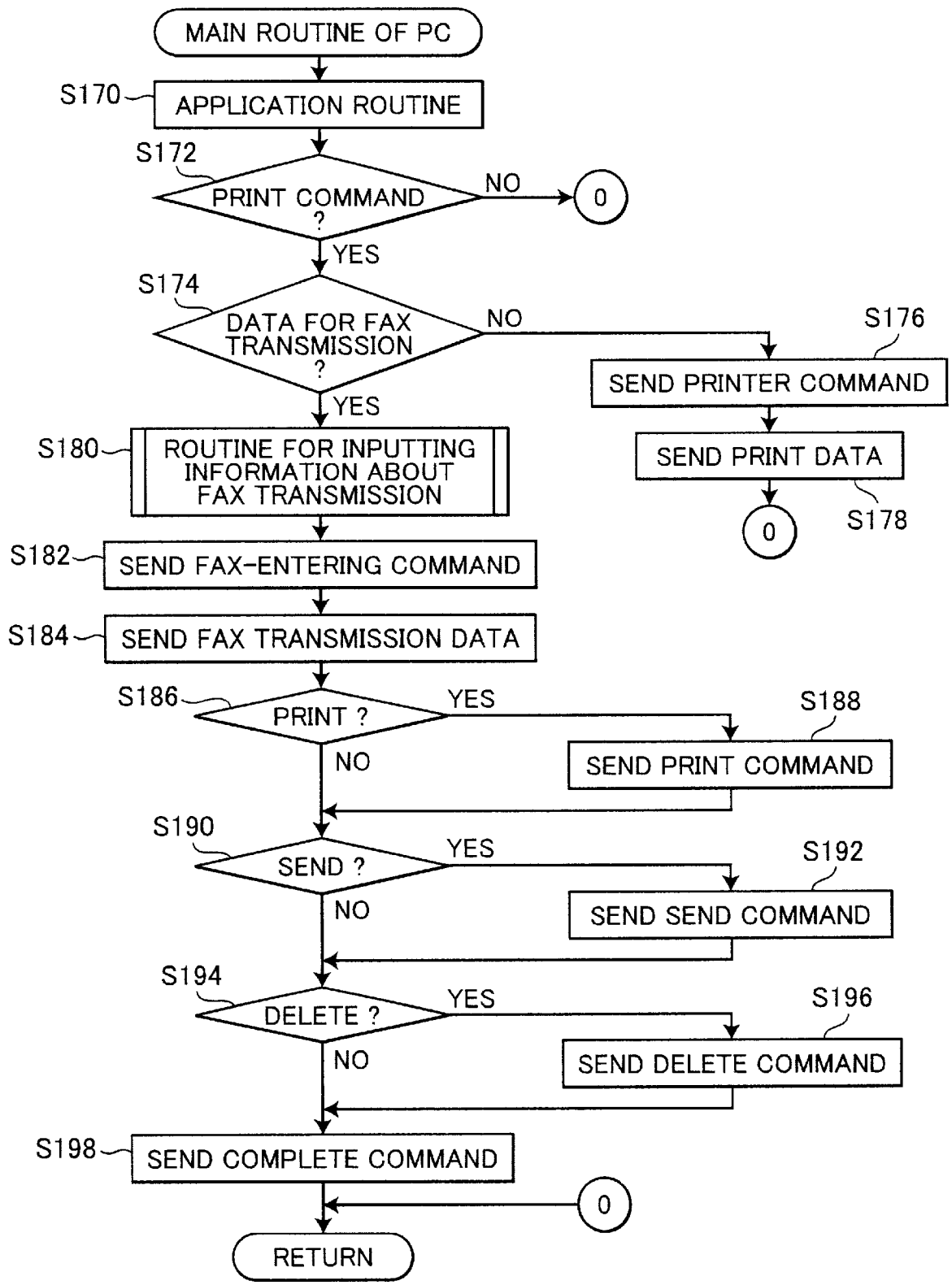
FIG. 6(a) is a flowchart showing a main routine executed by each computer.

Each of the computers 11–14 executes processes of FIG. 6(a) for controlling the printer 30 both as a normal printer and as a facsimile communication device as described below.

First, the CPU 101 executes in S170 application processing using an application software, such as a word processing software, installed in the ROM 102. During the application processes, text and the like is prepared. The application processes are repeatedly executed until a print command is inputted by an operator through the keyboard 112 or mouse 113 (no in S172). It is noted that the user inputs his/her print command while selecting the printer 30, mounted with the fax modem card 3, as a normal printer or as a fax function-added printer.

When a print command is inputted during application processes (S172:YES), then the CPU 101 judges in S174 whether or not the inputted print command is for fax transmission. That is, the CPU 101 determines whether or not data is fax transmission data based on whether or not the printer 30 is selected as a fax function-added printer. When the inputted print command selects the printer 30 as a normal printer and therefore the subject of the print command is determined as not being for fax transmission (S174:NO), then a normal print data transmission routine is executed according to the presently-used application software. That is, a printer command is transmitted in S176 to the printer 30, and then in S178, print data is prepared based on text data and is transmitted to the printer 30.

When the print command designates the printer 30 as a fax function-added printer, on the other hand, the presently-prepared text data is judged as data for fax transmission (S174:YES). Accordingly, a fax transmission information input routine is performed in S180. The fax transmission information input routine is performed by starting up the facsimile data program preinstalled is the ROM 102. That is, the CRT 111 is controlled to display an input screen for enabling the user to input, through the keyboard 112 and the mouse 113, a telephone number of a remote party where the fax transmission is to be transmitted, indication of the user (transmission source), and the like. After inputting information necessary for fax transmission during the routine of S180, the user finally inputs an OK command. In response to the OK command, following processes are executed.

First, in S182, the CPU 101 transmits a fax mode entering command to the printer 30. Then, in S184, the CPU 101 converts text data into fax transmission data (G3 type FAX data), and transmits the fax transmission data to the printer 30. It is noted that the fax transmission data (file) is formed from the G3 type FAX image data, and is added with distinction data for enabling distinction of the image data. The CPU 101 also transmits, in S184, to the printer 30 data of the telephone number of the remote party, to which the subject fax transmission data is to be sent, and data (transmission source information) of the sender who is to send the subject fax transmission data. Each of the telephone number data and the transmission source information is appended with the same distinction data as the corresponding set of fax transmission data.

After inputting the OK command in the fax transmission information input routine of S180, the user can input a print instruction when he/she desires to let the printer 30 print the subject fax transmission data. The user can input a send instruction when he/she desires to let the printer 30 send the subject fax transmission data to his/her designated remote party. The user can input a delete instruction when he/she desires to let the printer 30 delete the subject fax transmission data. When the print instruction is inputted (yes in S186), the CPU 101 sends a print command to the printer 30. When the send instruction is inputted (yes in S190), the CPU 101 sends a send or transmission command to the printer 30. When the delete instruction is inputted (yes in S194), the CPU 101 sends a delete command to the printer 30. It is noted that the print command, the send command, and the delete command will be referred to collectively as data operation command, hereinafter. Each of the data operation command is also appended with the same distinction data as the corresponding set of fax transmission data. The CPU 101 finally sends a complete command to the printer 30, and this routine ends.

Figure 6B:
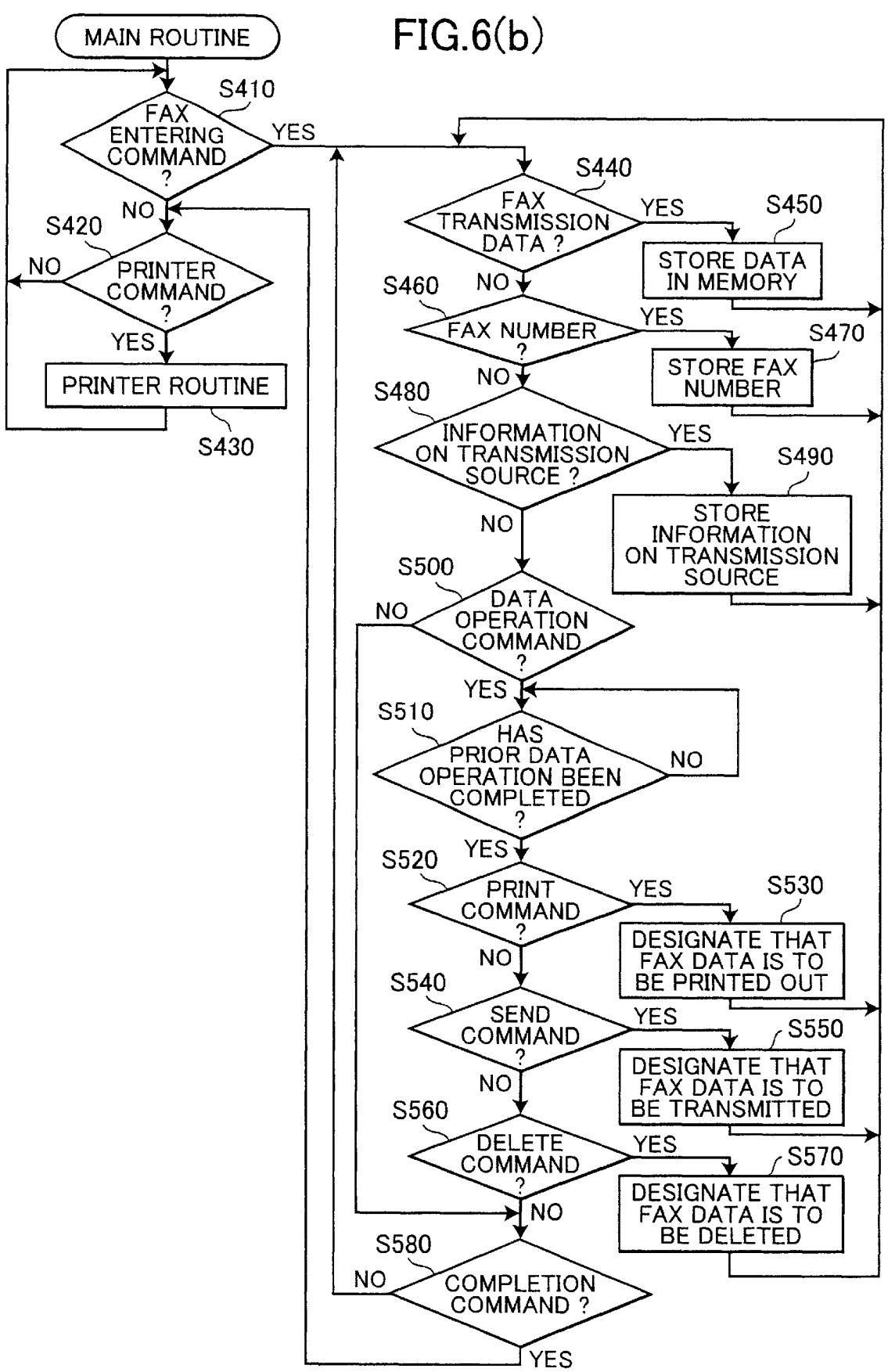
FIG. 6(b) is a flowchart showing a main routine executed by the printer.

In response to the above-described operation of the personal computer 11–14, the color laser printer 30 executes a main routine as shown in FIG. 6(b).

The main routine is executed to achieve both the fax transmission function and the printer function of the printer 30.

First, the CPU 61 judges in S410 whether or not a fax entering command has been transmitted from any personal computer 11 to 14. If a fax entering command has not been received (S410:NO), then in S420 it is determined whether a printer command has been received. When neither a fax entering command or a printer command has been received, then the routines of S410 to S420 are repeatedly performed for interrupting contents of commands received from any personal computer 11 to 14.

Figure 17A:
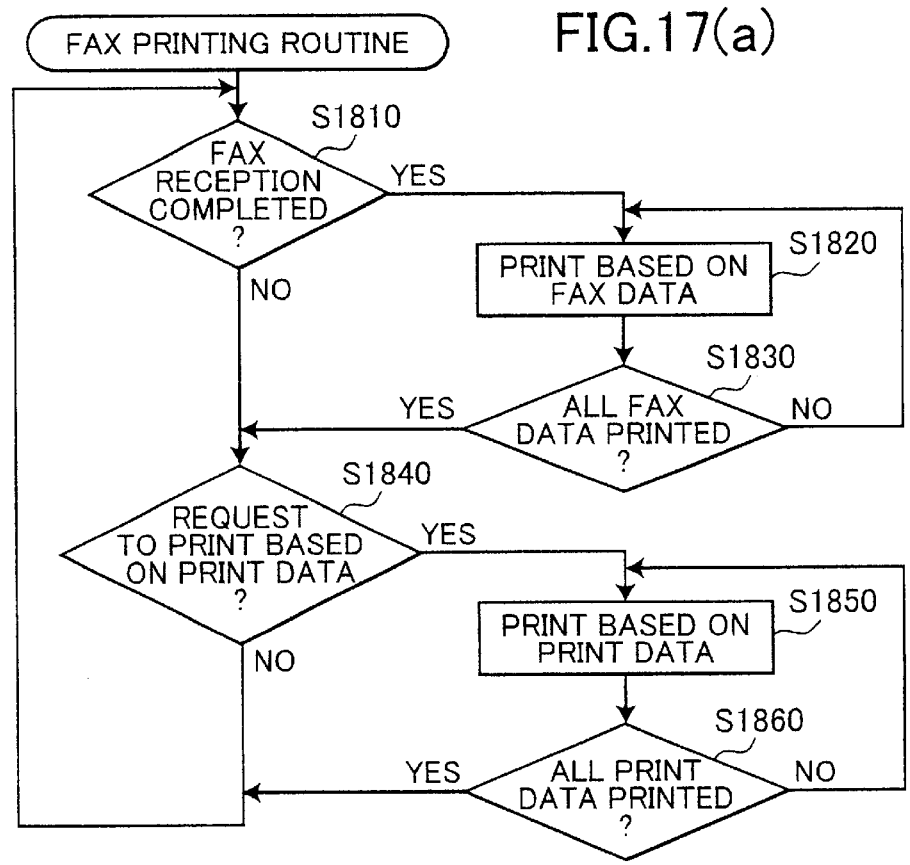
FIG. 17(a) is a flowchart showing a fax printing routine executed by the printer for printing fax reception data.
Figure 18A:
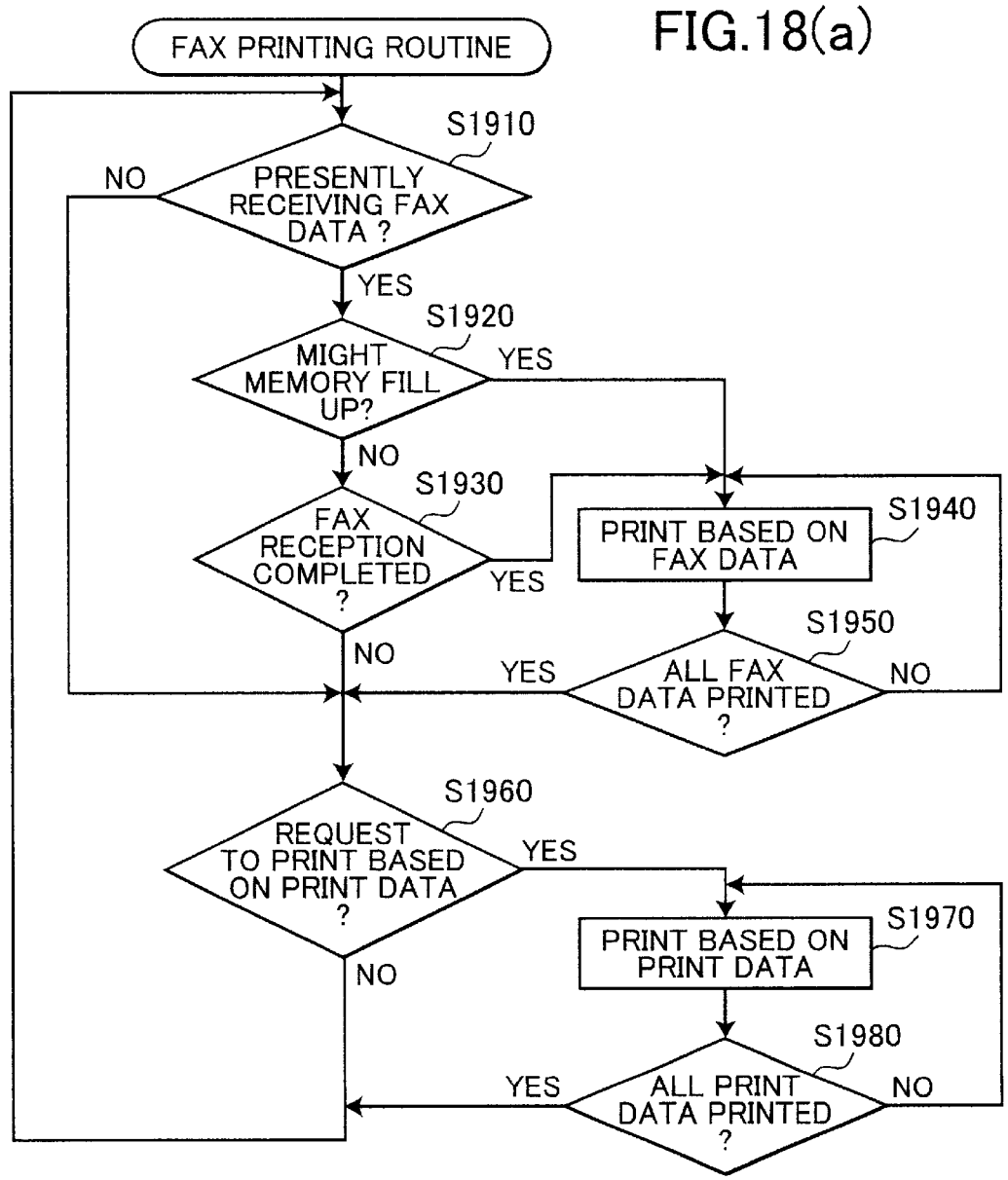
FIG. 18(a) is a flowchart showing a modification of the fax printing routine of FIG. 17(a) for printing fax reception data.

When a printed command is received (S420:YES), then print operations of the printer functions are performed in S430. In more detail, in S430, print data received from the personal computer 11 to 14 via the printer cable or over the LAN 1 is stored in a printer buffer. Once a single page's worth of data is stored, it is converted into printer output data, and printed as shown in FIG. 17(a) or 18(a).

On the other hand, when it is determined that a fax entering command has been received from some personal computer 11 to 14 (S410:YES), then the program proceeds to S440. In S440 and on, fax function is attained. Thus, in S410–S420, commands received from the personal computers 11–14 are interpreted, and based on the interpreted result, the printer 30 will perform the printer function (S430) or the fax function (S440–S580). More specifically, in S440, it is judged whether or not data subsequently received is fax transmission data. As described above, fax transmission data is data desired to be fax-transmitted to a remote device over the network 5, and is formed from image data (i.e., fax data) and distinction data for enabling distinction of the image data when the image data is stored in a memory region. Each set of fax transmission data will alternatively be referred to as a file, hereinafter. When the received data is fax transmission data (S440:YES), then in S450, a process is executed for storing the fax transmission data in a memory region, that has been allotted for fax data in the RAM 63 or 64 as shown in FIG. 19(a) or 19(b) during the process of S130 (FIG. 3).

If the data is not fax transmission data (S440:NO), then in S460, it is judged whether or not the received data is data designating a fax telephone number. If the received data is data designating a fax telephone number (S460:YES), then in S470, the received data is stored as a transmission fax telephone number in an area provided in the RAM 63 or 64 for storing fax telephone numbers.

It should be noted that as described already, the fax telephone number data, as well as the data operation command and the transmission source information, is appended with the same distinction data as the corresponding set of fax transmission data (file) so that correspondence between the fax transmission data (file) and the fax telephone number data, the data operation command, and the transmission source information can be made.

If the received data is not fax telephone number data (S460:NO), then in S480, it is judged whether the received data is transmission source information or not. If the received data is transmission source information (S480:YES), then in S490, the received data is stored in an area provided in the RAMs 63 or 64 allotted for transmission source information. It is noted that the transmission source information will be appended to fax data and will be transmitted with the fax data to a remote device. The transmission source information will also be used for outputting a fax transmission management report.

When the received data is not transmission source information (S480:NO), then in S500, it is judged whether or not the received data is a data operation command. As described above, there are three types of data operation commands: print command, send command, and delete command. When the received data is a data operation command (S500:YES), then in S510, it is judged whether or not operations are presently being performed based on some data operation command. The process of S510 can ensure that fax data has been completely operated by another data operation command that was received prior to the data operation command that is being presently received in S500. For example, the process of S510 can prevent fax data from being deleted based on a deletion command that is now being received, before it has been completely transmitted to a remote device according to a send command that was received before the deletion command.

When data operations are completed according to the prior data operation command (S510:YES), then in S520, it is judged whether or not the present data operation command is a print command. If the data operation command is a print command (S520:YES), then in S530, the corresponding fax data now being stored in the fax data storage region is designated for print (P) processes. That is, print designation data (P) is stored in correspondence with the fax data. When the fax is thus designated for print (P) processes in this manner, then S270 in the fax control interrupt routine (FIG. 4) will result in a positive determination and the print start request will be turned ON in S280. The fax data will be printed in S380 of FIG. 5(c).

When the received data operation command is not a print command (S520:NO), then in S540, it is determined whether or not the data operation command is a send command. If the command is a send command (S540:YES), then in S550, the corresponding fax data stored in the fax data storage region is designated to undergo send (S) processes. That is, send designation data (s) is stored in correspondence with the fax data. In this case, S250 in the fax control interrupt routine (FIG. 4) results in a positive determination so that the transmission mode is turned ON in S260. The fax data will be transmitted to the designated remote device in S350 of FIG. 5(b).

When the data operation command is not a send command (S540:NO), then in S560, it is judged whether the data operation command is a deletion command. If the data operation command is a delete command (S560:YES), then in S570, the corresponding fax data stored in the fax data storage region is designated to undergo deletion (D) operations. That is, delete designation data (D) is stored in correspondence with the fax data. In this case, the fax data will be deleted from the fax storage region during an interrupt routine (not shown in the drawings).

In this way, according to the present embodiment, fax transmission data inputted from some personal computer 11 to 14 is not immediately deleted from the RAMs 63, 64 even after printing or transmission has been performed according to the fax transmission data. The fax data is only deleted after a deletion command has been received. That is to say, according to the present embodiment, text, that has been prepared using a word processor software application package or the like installed in the personal computer 11 to 14, can be transmitted to a remote device in a facsimile message in the same manner as sending print data to the printer 30. In order to allow the user to obtain a test print based on the fax transmission data before transmitting the fax transmission data or to print out a copy of the facsimile message after the corresponding fax transmission data has been transmitted, the fax data is retained in the memory until a deletion command is received, whereupon the fax data is finally deleted.

By using this configuration, there is no need to resend fax transmission data from the personal computer 11 to 14 to the printer 30 after the test printing has been performed. There is also no need to transmit fax transmission data again from the personal computer 11 to 14 to the printer 30 in order to print out a copy of the transmitted facsimile message to retain a printed copy. This achieves the maximum advantages of both the printer function and the fax function while fulfilling a variety of user needs by simplifying corresponding operations.

When the fax entering command is inputted from some personal computer 11 to 14, processes are executed for storing fax data and for performing other processes for the fax data. That is, a variety of processes in the fax mode, such as transmitting facsimile messages and printing out test copies before the transmission, can be performed as designated by the data operation commands. A variety of processes performed in the fax mode are continued being executed until a completion command is received in S580. Accordingly, during a fax mode, the following series of fax operations are executed. First, a fax entering command is inputted from some personal computer 11 to 14, and fax data is transmitted to the color laser printer 30. After the fax data is stored in the memory 63 or 64, a print command for performing test printing is inputted and test print is executed. Afterward, a send command is inputted and the fax data is actually transmitted to the remote device.

It is noted that the printer 30 may be designated so that the data operation commands (print command, send command, and delete command) and the completion command can be inputted by a user's operation of the operation portion 83 that is provided to the printer 30, rather than inputted from the personal computer 11 to 14. When the user manipulates the operation portion 83 is input his/her print command, the fax transmission data is designated as print (P) in S530, and will be printed in S380. When the user manipulates the operation portion 83 to input his/her send command, the fax transmission data is designated as send (S) in S550, and will be transmitted to the designated address in S350. When the user manipulates the operation portion 83 to input his/her delete command, the fax transmission data is designated as delete (D) in S570, and will be deleted. This configuration is convenient because the person who wishes to transmit a facsimile message has to go to the printer 30 to confirm the result of the test print. The user can input the commands via the printer 30, so the user need not return to the personal computer 11–14 and so can input a send command and the like immediately.

As described above according to the main routine represented by the flowchart in FIG. 6(b), the color laser printer 30 is entered into a fax operation mode according to a fax entering command that is appended to the fax transmission data. Therefore, a fax server need not be provided separately along the LAN 1. It is sufficient that the single serve 20, capable of coping with both fax transmission data and print data, be provided. That is, the printer 30 can perform a fax transmission function in addition to the printer function. Processes can be switched between processes for performing the printer function and processes for performing the fax transmission function based on the command interpretation process executed in the main routine of FIG. 6(b). The server 20 is capable of coping with both print data and the fax transmission data.

Figure 7:
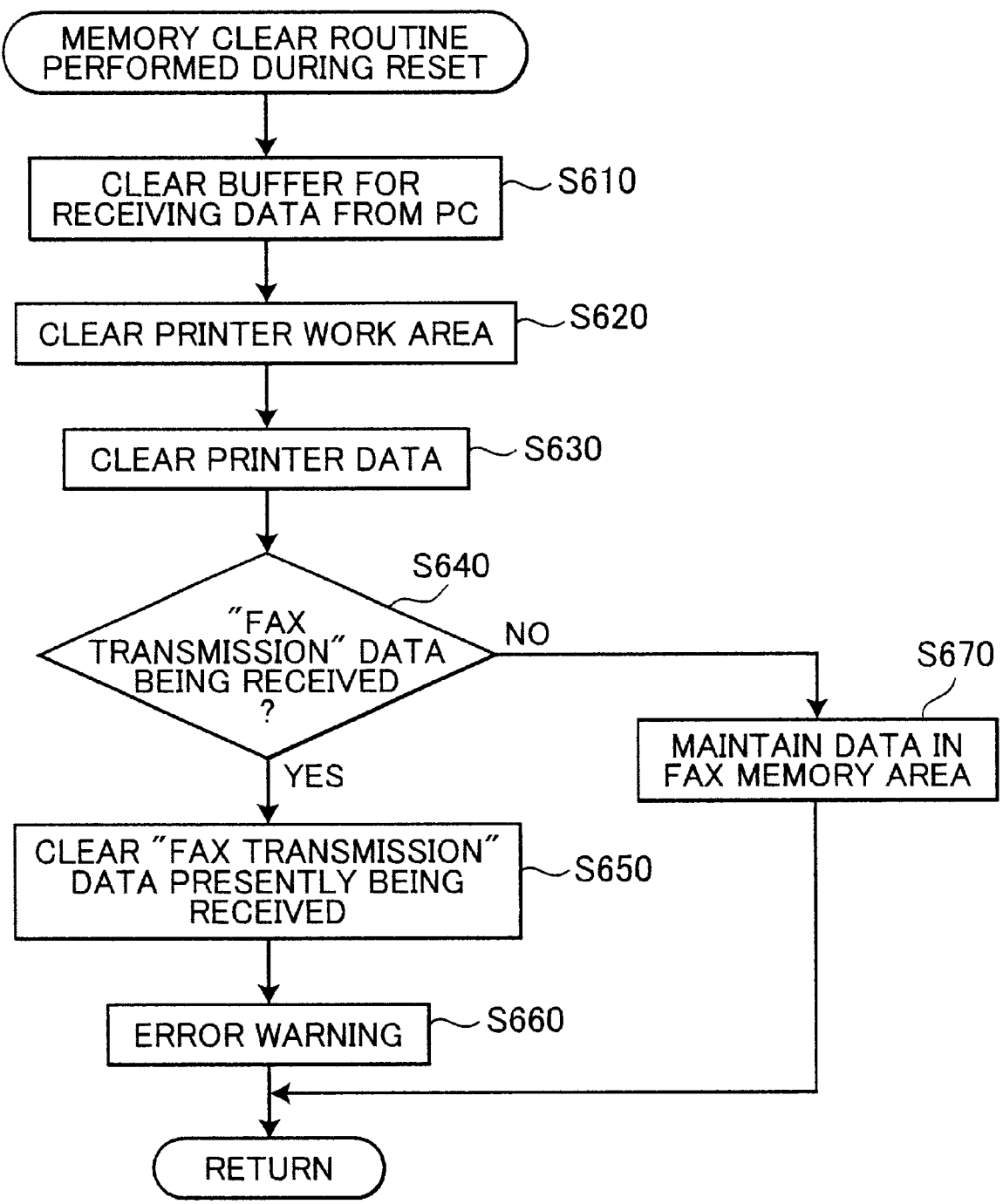
FIG. 7 is a flowchart showing a memory clear routine executed by the printer when the printer is reset.

The printer 30 executes a memory clear routine shown in FIG. 7 when the color laser printer 30 is reset by a rest command that is transmitted from some computer 11 to 14 or that is inputted from the control panel 83 of the color laser printer 30.

The memory clear routine will be described below with reference to FIG. 7.

First in S610, the reception buffer for receiving data from the personal computers 11 to 14 is cleared. In S620, the printer work area (shown in FIG. 19(b) or 19(c)) is cleared. Next, in S630, print data for being used for printer function is cleared. Afterward, it is judged in S640 whether or not facsimile transmission data is being presently received.

When it is judged that reception is being performed (S640:YES), then in S650, the fax transmission data presently being received is cleared, and in S660 a message is informed to a transmitter (computer 11, 12, 13, or 14) that has transmitted the fax data that is presently being received during S640. The message indicates that the fax data has been cleared during the middle of reception. This message can be in a form of an error report. On the other hand, when it is judged that fax transmission data is not being received (S640:NO), then in S670, data already stored in the fax memory area (shown in FIG. 19b or 19c) is maintained as is.

The printer 30 sometimes becomes in error in the middle of printer function operations for printing based on print data and prints meaningless characters. In these cases, even if reset operations are performed, fax transmission data already stored in the fax memory area is not reset, thereby preventing the user from again transmitting the fax transmission data to the printer 30. In other words, with respect to reset operations, by performing processes different for print memory area and fax memory area, even if the reset operations are performed, the printer 30 does not clear fax data already stored as normal data. Accordingly, the user can be prevented from again operating his/her own computer to retransmit his/her fax data. Operability of the color laser printer 30 can be enhanced.

Figure 8:
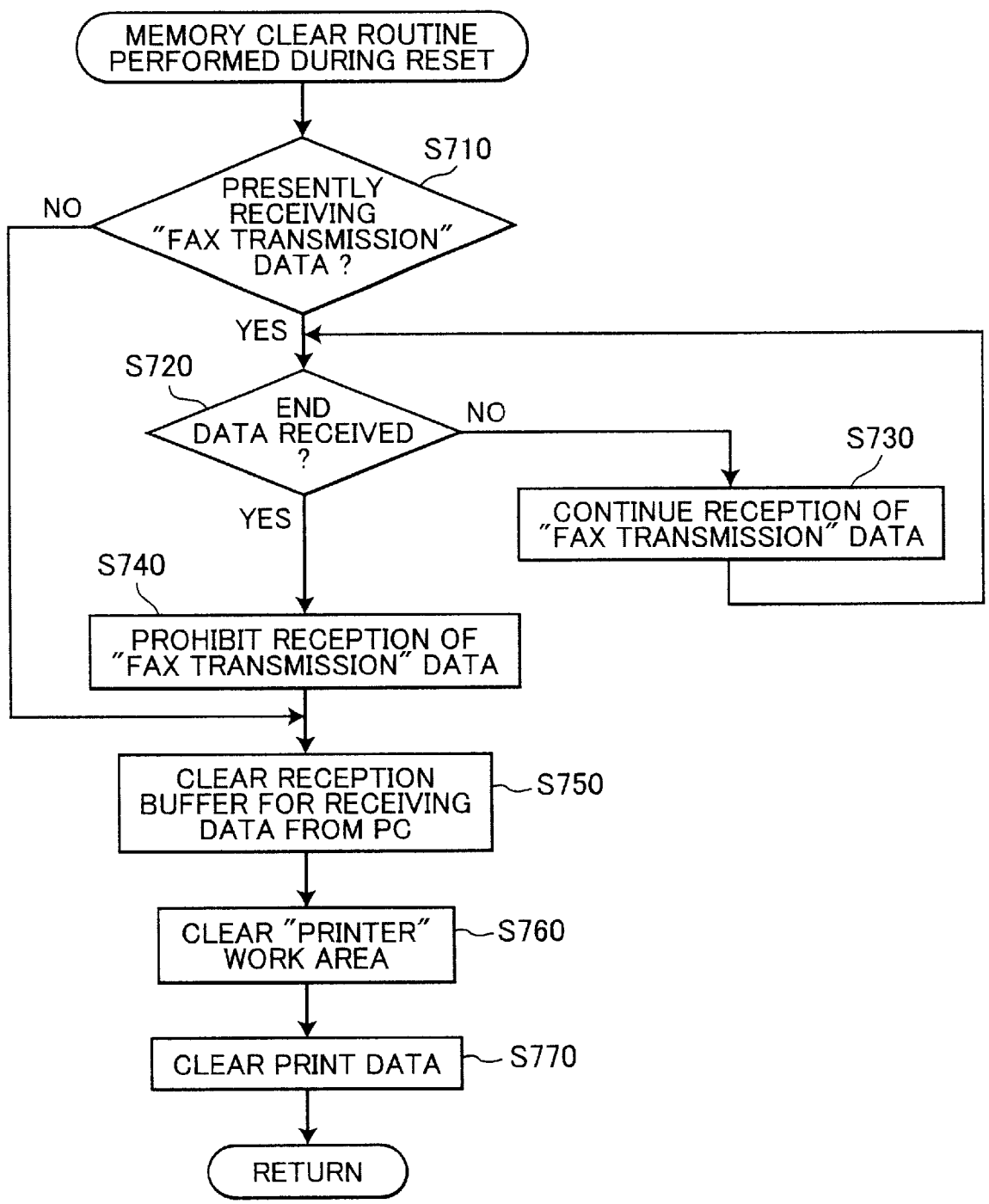
FIG. 8 is a flowchart showing a modification of the memory clear routine.

FIG. 8 is a flowchart representing another example of the memory clear operations of FIG. 7, to be performed in response to the reset command, wherein the printer memory and the fax memory are treated separately. During the memory clear operations of FIG. 8, in S710, it is judged whether or not fax transmission data is being presently received. If it is judged that fax transmission data is not being received (S710:NO), then in S750, the reception buffer for receiving data from the personal computer 11 to 14 is cleared, in S760, the printer work area is cleared, and in S770, the print data for printer function is cleared.

On the other hand, when it is judged that fax transmission data is being received (S710:YES), then in S720, it is judged whether or not reception of the fax transmission data has been completed until END data. If reception has not yet been proceeded to END data (S720:NO), in S730, reception of the fax transmission data is continued. When the fax transmission data is completely received until the END data (S720:YES), then the data in the fax memory area is maintained as is, and reception of other fax transmission data is refused any more by setting a busy condition to the interface 70 (71, 72, and 73) in S740. As a result, subsequent fax transmission data will not be received.

With this configuration, even if the reset processes are performed, in association with a print error of the color laser printer 30, reception of fax transmission data that has already been started at that point is continued. As a result, the complicated processes for informing an error message to the transmitter of the fax transmission data need not be performed. Once the single set of fax transmission data is completely received, afterward reception of further fax transmission data is refused by setting a busy condition. Therefore, even if a new fax entering command is inputted to the color laser printer 30 while the color laser printer 30 is performing the reset operations, the color laser printer 30 will not respond to the fax entering command. As a result, the reset operations can be rapidly completed while maintaining the already-received fax transmission data.

Figure 9:
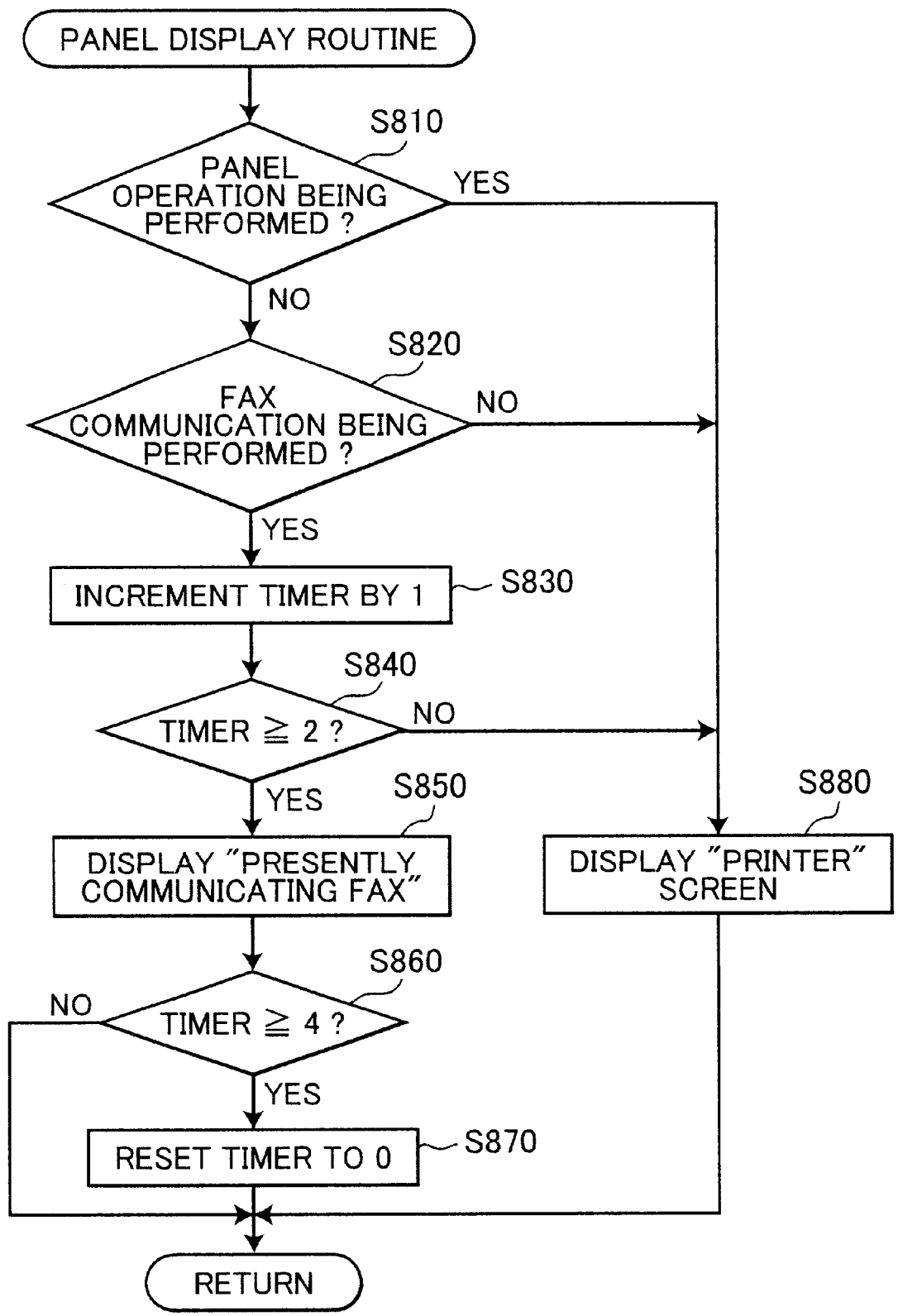
FIG. 9 is a flowchart showing a panel display routine executed by the printer.

The printer 30 executes a panel display operation shown in FIG. 9 to warn a user from erroneously turning off a power source of the printer 30 while fax communication is performed. The panel display operation routine is enabled by the process of S150 (FIG. 3), and is repeatedly executed by an interrupt function that is executed every second.

The panel display operation will be described below with reference to FIG. 9.

First in S810, the CPU 61 judges whether or not the panel 83 is being operated by a user. When the operation panel 83 is not being operated (S810:NO), then it is judged in S820 whether or not a facsimile message is being transmitted or received. If a facsimile message is being transmitted or received (S820:YES), then the timer 68 is incremented by one (1) in S830. Next, it is judged in S840 whether or not the value of the timer 68 is two or greater. If the value of the timer is greater than or equal to two (S840:YES), then a message is displayed on the display portion (LCD) 84 in S850 to indicate that a facsimile message is being transmitted or received. For example, "Fax sending" can be displayed when a facsimile message is being transmitted and "Fax receiving" can be displayed when a fax message is being received.

Next in S860, it is judged whether or not the value of the time 68 is four or greater. If the timer 68 has the value of greater than or equal to four (S860:YES), then the timer is reset to zero (0) in S870.

When the operation panel 83 is being operated by the user (S810:YES), when no facsimile message is being transmitted or received (S820:NO), or when the timer value is less than two (S840:NO), the program proceeds to S880, whereupon a printer panel is displayed on the display 84 indicating information on a printer status.

Accordingly, when the operation panel 83 is not being operated by the user during transmission or reception of a facsimile message, then the panel display is performed to switchingly display, every two seconds, the condition of the printer and the fax communication condition in alternation. For example, a message indicating condition of the printer, such as "ready" or "paper jam", and a message indicating fax communication condition, such as "fax receiving" or "fax sending", are displayed alternately every two seconds on the display panel. With this configuration, the operator can be informed that a facsimile message is being transmitted or received so that the user will not erroneously cut off the power source during transmission or reception of a facsimile message.

While the operation panel 83 is being operated by the user, even when fax communication is being performed, only the printer display is performed, and the alternate display between the printer display and the fax display (warning screen) is not performed. This is because before the operator starts operating the operation panel, the user has watched the alternate display (warning screen) on the display and so will probably not erroneously turn off the power source. Also, if the alternate panel display is being performed while the operator attempts to operate the operation panel, then the operation will be difficult to perform. It is noted that normally, when the operation panel 83 is operated, an online key (not shown in the drawings), provided to the operation panel 83, is operated, thereby setting the off line condition, wherein print data can not be received. After panel operations are completed, the online key is again manipulated to bring the printer back online, that is, into a condition wherein print data can be received. Accordingly, whether or not panel operation is being performed can be judged by whether or not the printer 30 has been placed into the offline condition by panel operation.

In the above description, the panel display is alternately performed while fax communication is attained. Instead, the same objectives can be achieved by flashing an LED, provided to the display portion 84, during reception or transmission of facsimile messages. Also, instead of flashing the LED, processes for repeatedly displaying and deleting a message, that indicates fax communication condition such as "sending" or "receiving", can be executed on the display 84 to warn the user.

Figure 10:
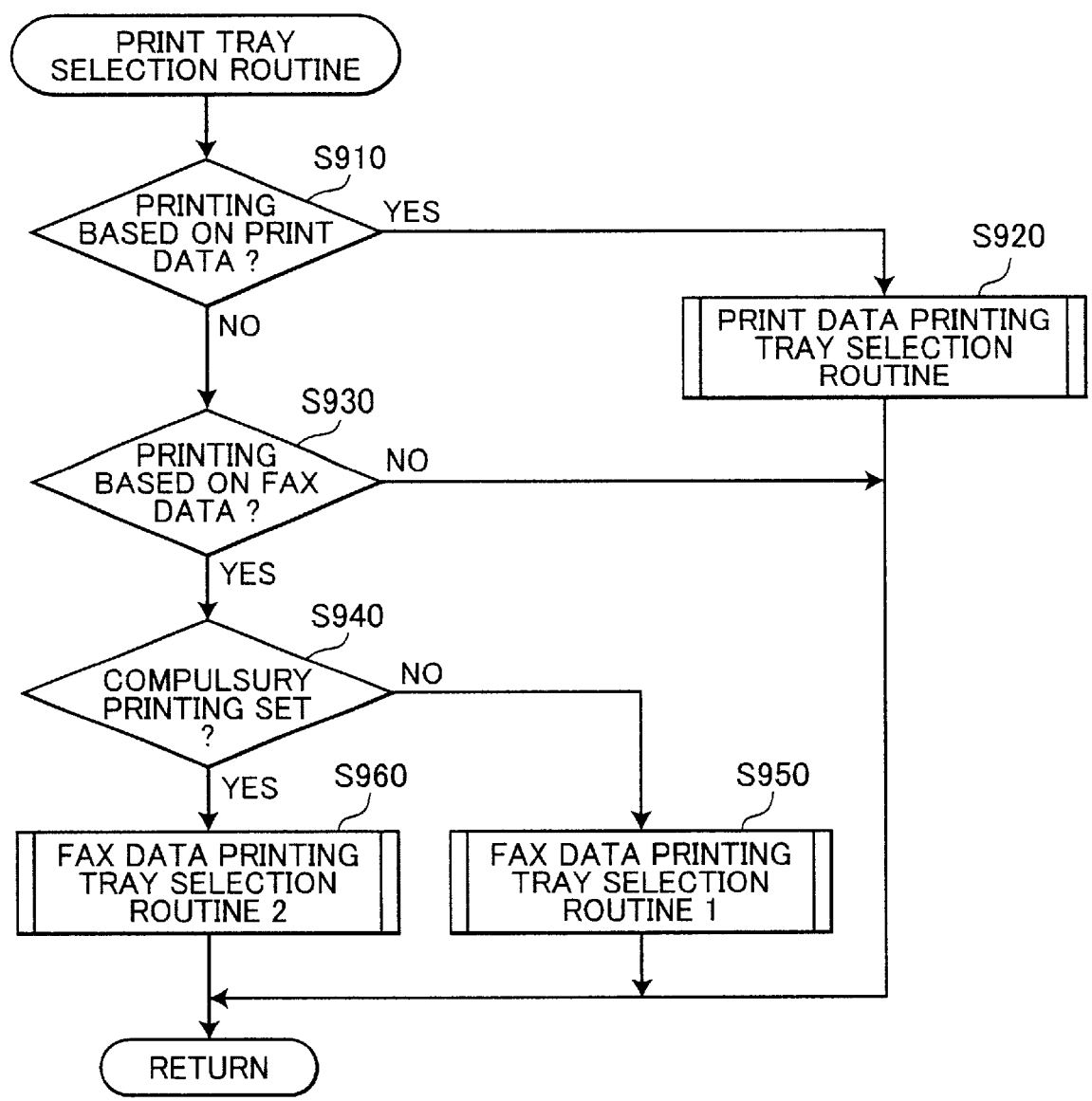
FIG. 10 is a flowchart showing a routine, for selecting a sheet tray to be used for printing, executed by the printer.

The printer 30 repeatedly executes a print tray selection process of FIG. 10. This print tray selection process is repeatedly executed as an interrupt routine at a predetermined timing. The print tray selection process is for selecting a sheet feed tray to be used for printing print data in S430 (S1850 or S1970), for printing fax transmission data in S380, and for printing fax reception data in S380 (S1820 or S1940).

The print tray selection operation will be described below with reference to FIG. 10.

First in S910, it is judged whether or not the printer print mode is being set according to the printer function. It is noted the printer 30 can be entered into the printer print mode by the affirmative judgement in S420 (FIG. 6(*b*)). The printer 30 can be entered into the fax print mode when some fax data (fax reception data received from remote devices or fax transmission data received from nearby computers 11–14) presently being stored in the printer 30 is designated to be printed (P) and therefore an affirmative judgement is attained in S270 and the print start request is turned ON in S280.

Figure 11:
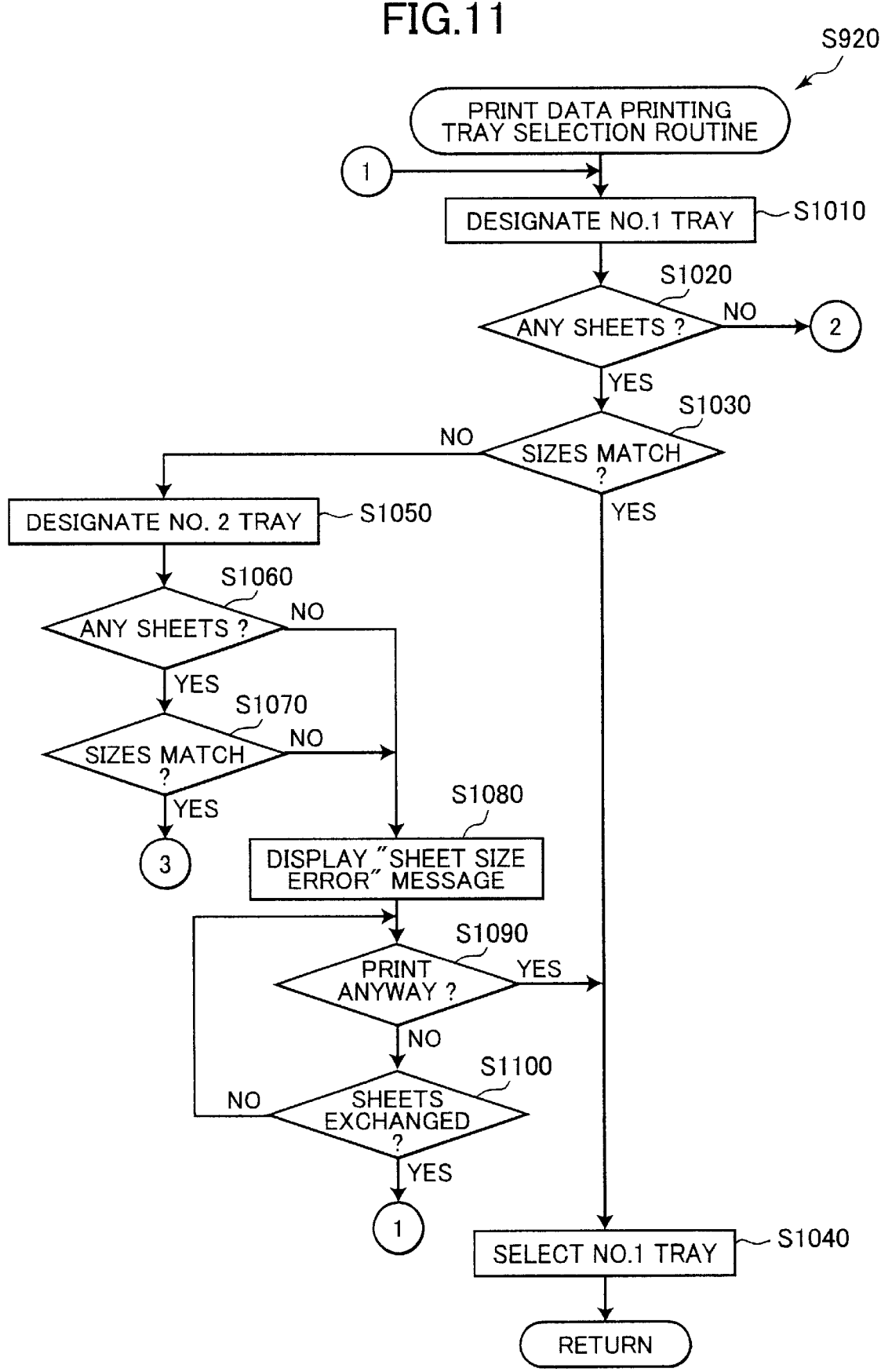
FIG. 11 is a flowchart showing a part of a process of S920, for selecting a sheet tray to be used for printing in a printer mode, during the routine of FIG. 10.
Figure 12:
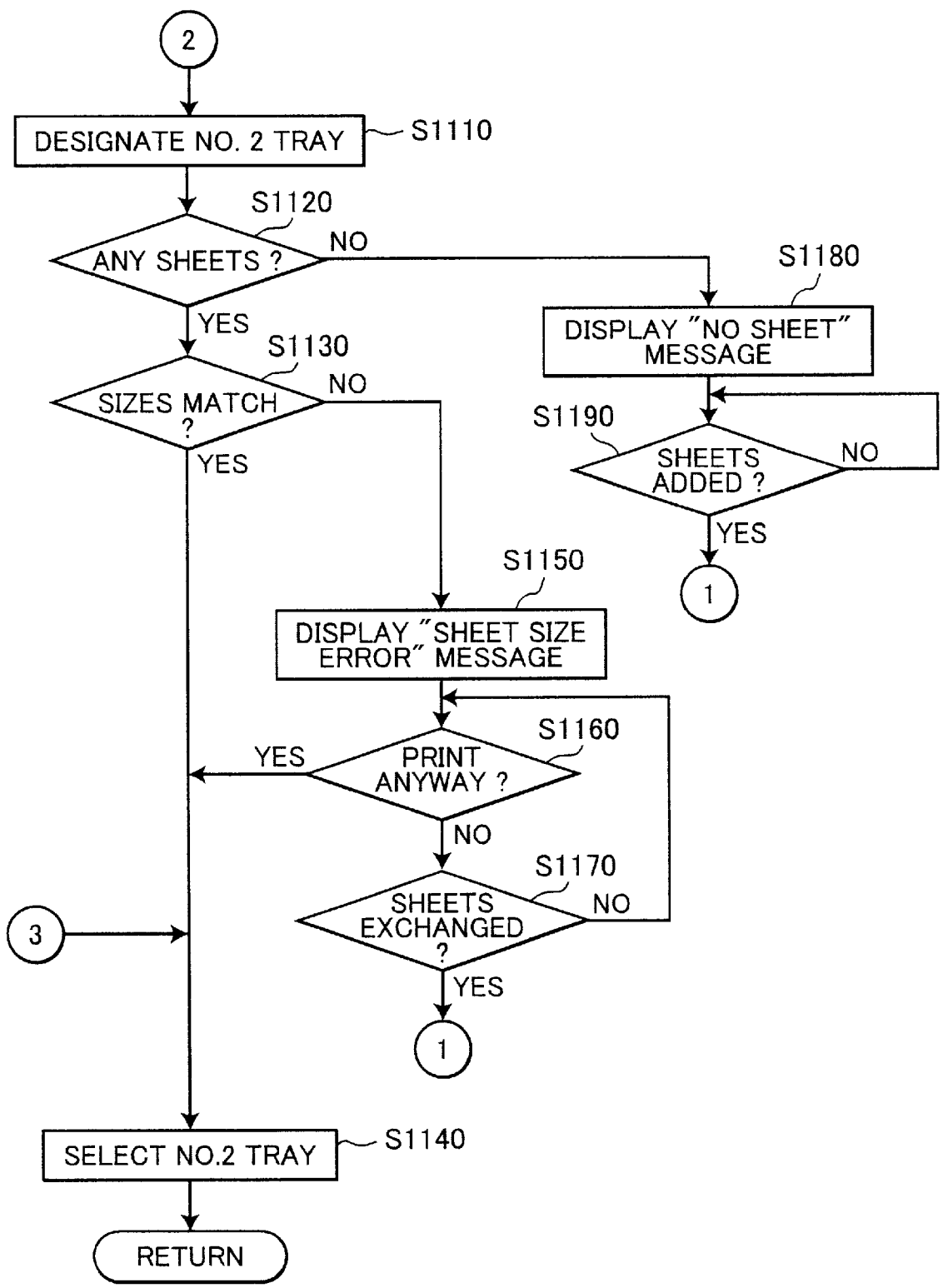
FIG. 12 is a flowchart showing a remaining part of the process of S920.

If the printer print mode is being set according to the printer function (S910:YES), then in S920, a printer print tray selection process of FIGS. 11–12 is executed. On the other hand, if the present mode is not the print mode for the printer function (S910:NO), then it is judged in S930 whether or not the present mode is a print mode for the fax function. If the present mode is not the print mode for the fax function (S930:NO), then this print tray selection operation is ended.

If it is determined that the present mode is being set as the print mode for the fax function (S930:YES), then in S940, it is judged whether or not a compulsory print mode has been set during the process of S80 or S90. If the compulsory print mode is not being set (S940:NO), then in S950, the program proceeds to a fax print tray selection routine 1 of FIGS. 13–14. When the compulsory print mode is being set (S940:YES), on the other hand, then in S960, the program proceeds to a fax print tray selection routine 2 of FIGS. 15–16. During the compulsory print mode, the amount of an empty area in the fax reception data storage memory region (shown in FIG. 19(*b*) or 19(*c*)) is confirmed. When there is a possibility that the memory area will be insufficient, then the received fax data will be immediately printed out, in order to prevent a reception error from occurring because of the insufficient memory.

The printer print tray selection routine of S920 will be described while referring to the flowcharts shown in FIGS. 11 and 12. It is noted that the flowcharts represent the situation wherein only two trays, that is, the No. 1 tray 51 and the No. 2 tray 52, are provided to the printer 30 and the No. 1 tray 51 is set with priority as a tray for printer printing. It should be noted that as described already, the printer 30 can be additionally provided with the No. 3 tray 53 for storing A3 size normal sheets as shown in FIG. 1. However, to facilitate the explanation, the printer print tray selection routine will be explained as no No. 3 tray 53 is provided.

First in S1010, the No. 1 tray 51 is first designated as a print supply tray. In S1020, it is judged whether or not the No. 1 tray 51 has any sheets or not. When there is some sheets on the No. 1 tray 51 (S1020:YES), then in S1030 it is judged whether or not the size of the sheets in the No. 1 tray 51 matches a size required for printing print data. If the sizes match (S1030:YES), then in S1040, the No. 1 tray 51 is selected as the sheet supply tray. Printing will be executed in S430 (FIG. 6(*b*): S1850 or S1970) through performing the well-known sheet auto-feed printing operation with using the sheet tray 51.

On the other hand, when the size of sheets in the No. 1 tray 51 does not match the required size (S1020:YES, S1030:NO), then the No. 2 tray 52 is designated as the sheet supply tray in S1050. Next, it is judged in S1060 whether or not any sheets are in the No. 2 tray 52. When there are some sheets in the No. 2 tray 52 (S1060:YES), then it is judged in S1070 whether or not the size of sheets in the No. 2 tray 52 matches the size required for printing. It the sizes match (S1070:YES), then the program proceeds to S1140 whereupon the No. 2 tray 52 is selected as the supply sheet tray. Printing will be executed in S430 through the well-known sheet auto-feed printing operation with the tray 52.

On the other hand, when no sheets are present in the No. 2 tray 52 (S1060:NO), or even if there are sheets in the No. 2 tray 52 but the size of the sheets does not match the required size (S1070:NO), then in S1080, a size error message is displayed on the display 84 to urge the user to replace the sheets in the trays. However, when the user operates the operation panel 83 to designate a forced printing so that printing will be executed onto sheets of a mismatched size (S1090:YES), then in S1040, the No. 1 tray 51, which is set with priority, is selected as the sheet supply tray in S1040 and forced printing will be performed in S430 (S1850 or S1970) on the mismatch size sheet. When no command for forced printing is received (S1090:NO), but instead print sheets are replaced (S1100:YES), then the routine returns to S1010 and the present routine is performed again.

When no sheets are in the No. 1 tray 51 (S1020:NO), then as shown in FIG. 12, in S1110, the No. 2 tray 52 is designated as a sheet supply tray to be used. Next in S1120, it is judged whether or not any sheets are in the No. 2 tray 52. If there are some sheets in the No. 2 tray 52 (S1120:YES), it is judged in S1130 whether the size of the sheets in the No. 2 tray 52 matches the size of sheet required for printing. If the sizes match (S1130:YES), in S1140, the No. 2 tray 52 is selected as the sheet supply tray and printing will be executed with using the tray 52.

On the other hand, if there are some sheets in the No. 2 tray 52, but the size of the sheets in the No. 2 tray 52 does not match the required size (S1120:YES, S1130:NO), then in S1150, a size error message is displayed to urge the operator to exchange the sheets in the trays in S1150. In this case also, when a command is received for performing the forced printing with the mismatched size sheet (S1160:YES), then in S1140, the No. 2 tray 52 is selected as the sheet supply tray. As a result, forced printing will be performed on the sheets with the mismatched size. When no forced printing command is received (S1160:NO), but print sheets are exchanged (S1170:YES), then the program returns to S1010 and this routine is repeated.

Also, when no sheets are in the No. 1 tray 51 (S1020:NO) or the No. 2 tray 52 (S1120:NO), then in S1180, a no sheet error message is displayed on the display 84 to urge the operator to add sheets to the No. 1 tray 51 and No. 2 tray 52. Once sheets have been added (S1190:YES), then the program returns to S1010 and this routine is repeated.

Figure 13:
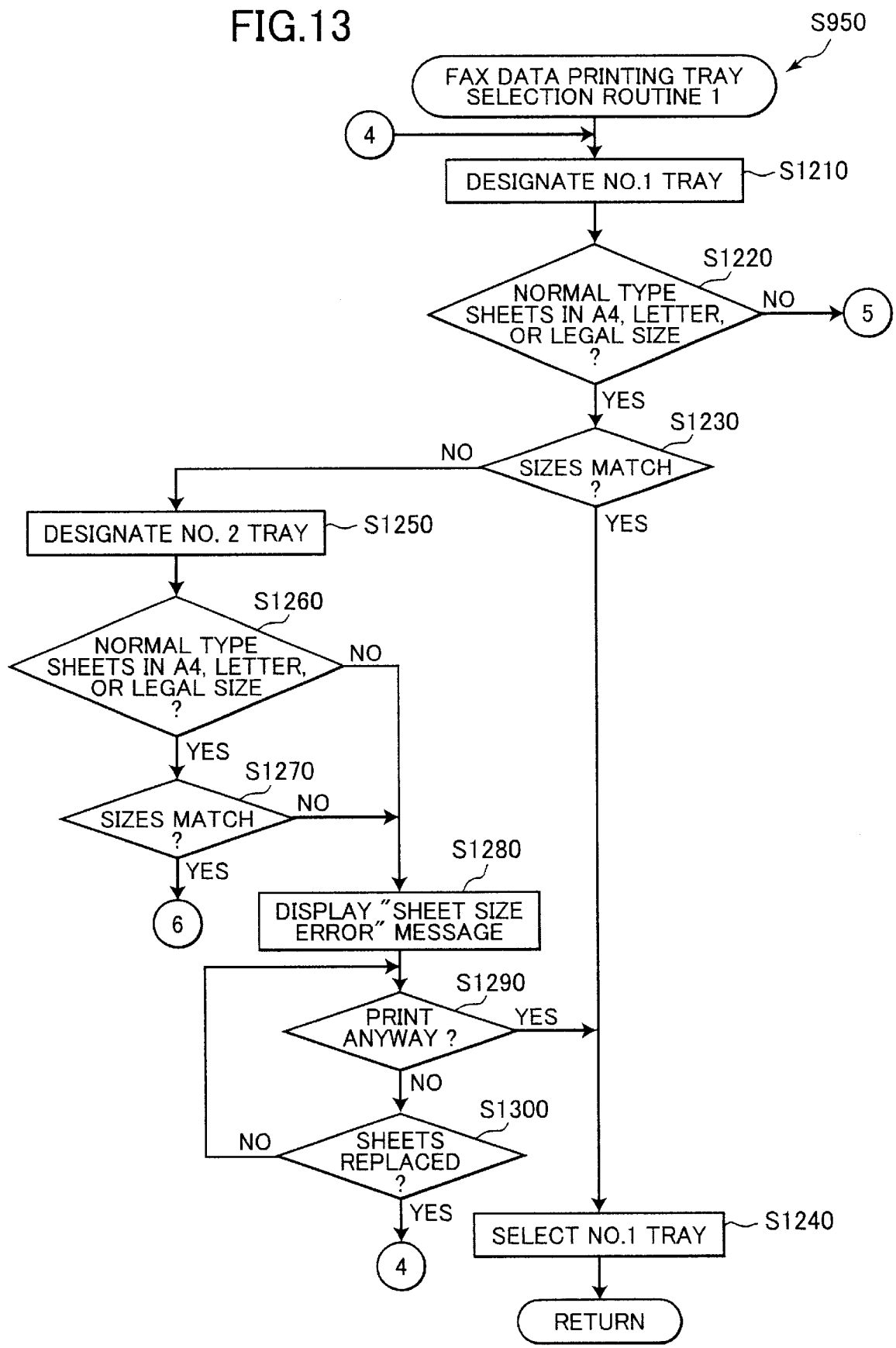
FIG. 13 is a flowchart showing a part of a process of S950, for selecting a sheet tray to be used for printing in a facsimile mode, during the routine of FIG. 10.

Next, the fax print tray selection routine 1 of S950 will be explained while referring to the flowcharts shown in FIGS. 13 and 14. The flowcharts shown in FIGS. 13, 14 also indicate the situation wherein only the two trays, that is, the No. 1 tray 51 and the No. 2 tray 52, are provided and the No. 1 tray 51 is set with priority as a print sheet supply tray for fax printing.

First in S1210, the No. 1 tray 51 is designated as the print sheet supply tray. In S1220, it is determined whether some normal type sheets (normal white thin papers) with a normal size, that is, either A4 size, letter size, or legal size, are present in the No. 1 tray 51. Even if the sheets have A4 size, but are not normal sheets of papers, such as overhead projector sheets, thick sheets, or colored sheets, than S1220 will result in a negative judgement. In other words, determination in S1220 does determine not only the size of the sheets but also the type of the sheets. As described already, the sheet size detection sensor and the sheet type detection sensor (detection portion 84) are provided to determine the size and type of sheets in each of the No. 1 tray 51 and the No. 2 tray 52. Alternatively, the user can previously manipulate the operation panel 83 to input type and size of sheets he or she has placed in the No. 1 tray 51 and the No. 2 tray 52. The determination of S1220 can be made based on this information set by the user.

When it is judged that normal white papers with a normal size, such as A4, letter, or legal size, are disposed in the No. 1 tray 51 (S1220:YES), then it is determined in S1230 whether or not the size of the sheets in the No. 1 tray 51 matches the size required for printing. If the sizes match (S1230:YES), then the No. 1 tray 51 is selected in S1240 as the sheet supply tray, and the fax printing will be executed in the fax data printing process of S380 (FIG. 5(c)).

On the other hand, when the sheets in the No. 1 tray 51 are A4, letter, or legal sized normal papers, but do not have an appropriate size required for printing fax reception data (S1220:YES, S1230:NO), then in S1250, the No. 2 tray 52 is designated as the sheet supply tray. Next in S1260, it is judged whether or not some normal type papers with the normal size, such as A4, letter, or legal size, are disposed in the No. 2 tray 52. When some normal papers with normal size are disposed in the No. 2 tray 52 (S1260:YES), then in S1270, it is judged whether or not the size of the sheets in the No. 2 tray 52 matches the size required for printing. If the sizes match (S1270:YES), the program proceeds to S1340 whereupon the No. 2 tray 52 is selected as a sheet supply tray, and printing will be executed using the tray 52.

On the other hand, when any normal sheets with normal size, such as A4, letter, or legal size, are not disposed in the No. 2 tray 52 (S1260:NO), or when the size of sheets in the No. 2 tray 52 does not match the required size (S1270:NO), then in S1280, a size error message is displayed to urge the user to change the sheets in the tray. However, if the user operates the operation panel 83 to command a forced printing with the mismatched size sheets (S1290:YES), then in S1240, the No. 1 tray 51, which is designated as the priority tray, is selected as the sheet supply tray and forced printing will be performed on the mismatched sized sheet. Even though forced printing is performed on the mismatched size sheets in this manner, because the normal type sheets with normal sizes, that is, either A4, letter, or legal size, are disposed in the No. 1 tray 51, the entire image corresponding to data received in fax transmission can be printed out without losing any information from the body of the fax data.

When no forced printing command is received (S1290:NO), but the user replaces sheets in some tray (S1300:YES), then the program returns to S1220 and the present routine is started over again.

Figure 14:
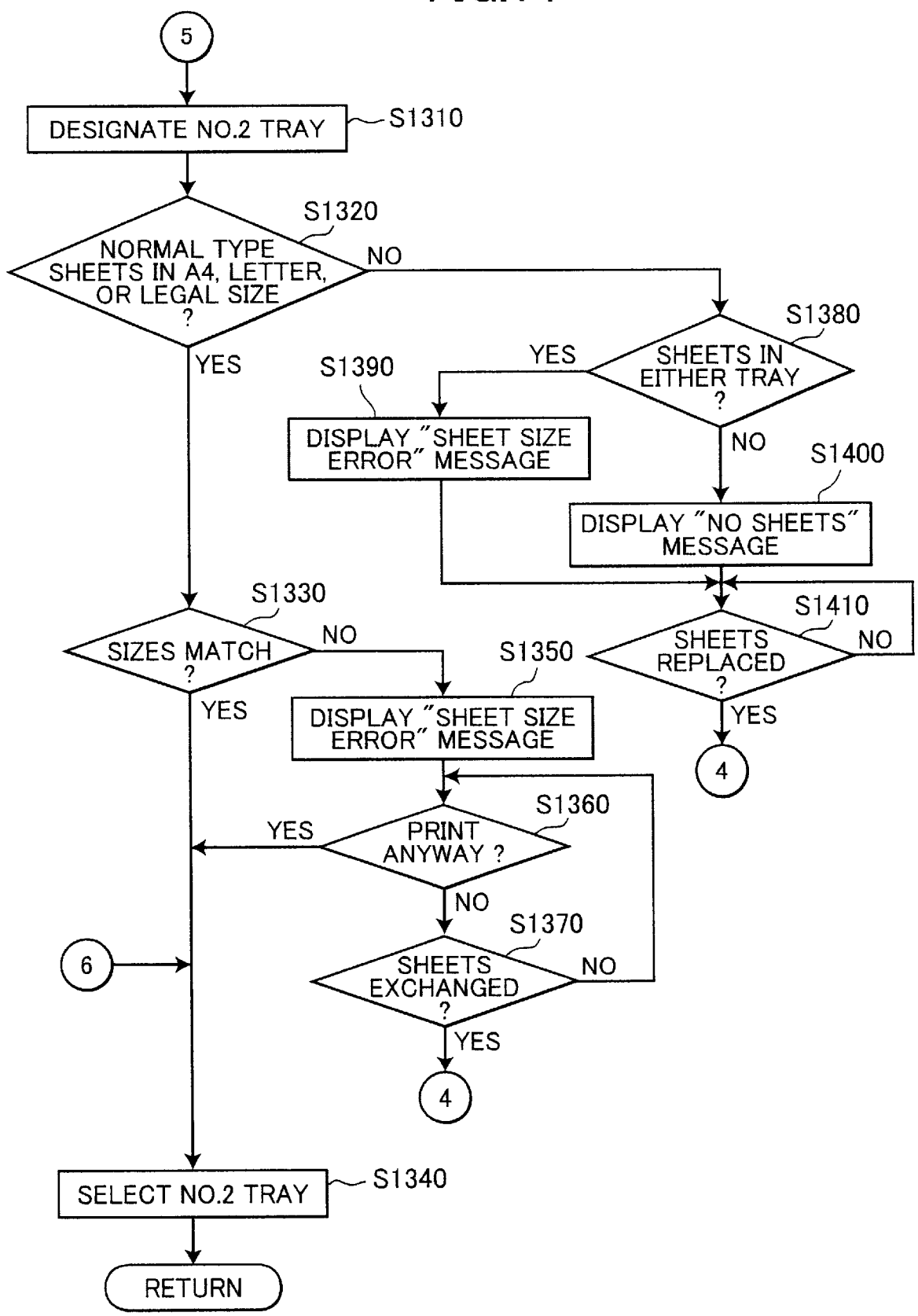
FIG. 14 is a flowchart showing a remaining part of the process of S950.

When normal sheets with normal size such as A4, letter, or legal size, are not present in the No. 1 tray 51 (S1220:NO), then as shown in FIG. 14, S1310 is performed to designate the No. 2 tray 52 as the print sheet supply tray. Next, it is determined in S1320 whether or not any normal sheets with normal size such as A4, letter, or legal size, are disposed in the No. 2 tray 52. When some normal sheets with the normal size are disposed in the No. 2 tray 52 (S1320:YES), then in S1330 it is judged whether the size of the sheets in the No. 2 tray 52 matches the size appropriate for print size of the received fax data. If the sizes match (S1330:YES), then in S1340, the No. 2 tray 52 is selected as the sheet supply tray, and printing will be executed with the tray 52.

On the other hand, when the No. 2 tray 52 contains some normal type sheets with the normal size, but the size of the sheets in the No. 2 tray 52 does not match the required size (S1320:YES, S1330:NO), then in S1350, a size error message is displayed to urge the user to replace the sheets in the No. 2 tray 52. When a forced printing command is received to instruct that a forced printing be performed with the mismatched size sheets (S1360:YES), then in S1340, the No. 2 tray 52, which has sheets disposed therein, is selected as the sheet supply tray in S1340 and forced printing will be performed on sheets with the mismatched size. Since forced printing will be performed on the normal sheets with normal sizes, even if the size of sheets is not appropriate for fax printing, all of the information, represented by the fax data, can be printed out without losing information from the body of the fax data.

When no forced printing command is received (S1360:NO), but the user exchanges sheets in some tray (S1370:YES), then the program returns to S1210 and this routine is started over again.

When neither No. 1 tray 51 or the No. 2 tray 52 has normal sheets with normal size (S1220:NO, S1320:NO), then in S1380 it is judged whether normal papers with other sizes, are present in the No. 1 tray 51 or the No. 2 tray 52. When other sized normal papers are disposed in either tray (S1380:YES), then a size error message is displayed in S1390. When no normal sheets are disposed in either tray (S1380:NO), then a no sheet error message is displayed in S1400 to urge the user to place sheets in the No. 1 tray 51 and the No. 2 tray 52. Once the user replaces sheets in the No. 1 tray 51 or No. 2 tray 52 (S1410:YES), then the program returns to S1210 and this routine is repeated over again.

In this way, when the fax print selection routine 1 is performed, the user can command the forced printing by operating the operation panel 83 when the normal sheets with normal sizes are present in one of the trays. On the other hand, when normal papers with other sizes or non-standard sheets, such as overhead projector sheets, thick sheets, or color sheets, are disposed in either of trays 51, 52, then forced printing will not be performed.

This is because the entire content of fax reception data can be printed out successfully without loss on normal papers with normal size. Therefore, even if the sheet size is not the optimum size, forced printing can be performed. By not enabling forced printing on other sized normal sheets, printing will not be performed on other sized normal sheets such as B5 normal sheets. Content of received data can be prevented from being lost during fax printing. Additionally, expensive sheets, such as overhead projection sheets, can be prevented from being wastefully used.

Figure 15:
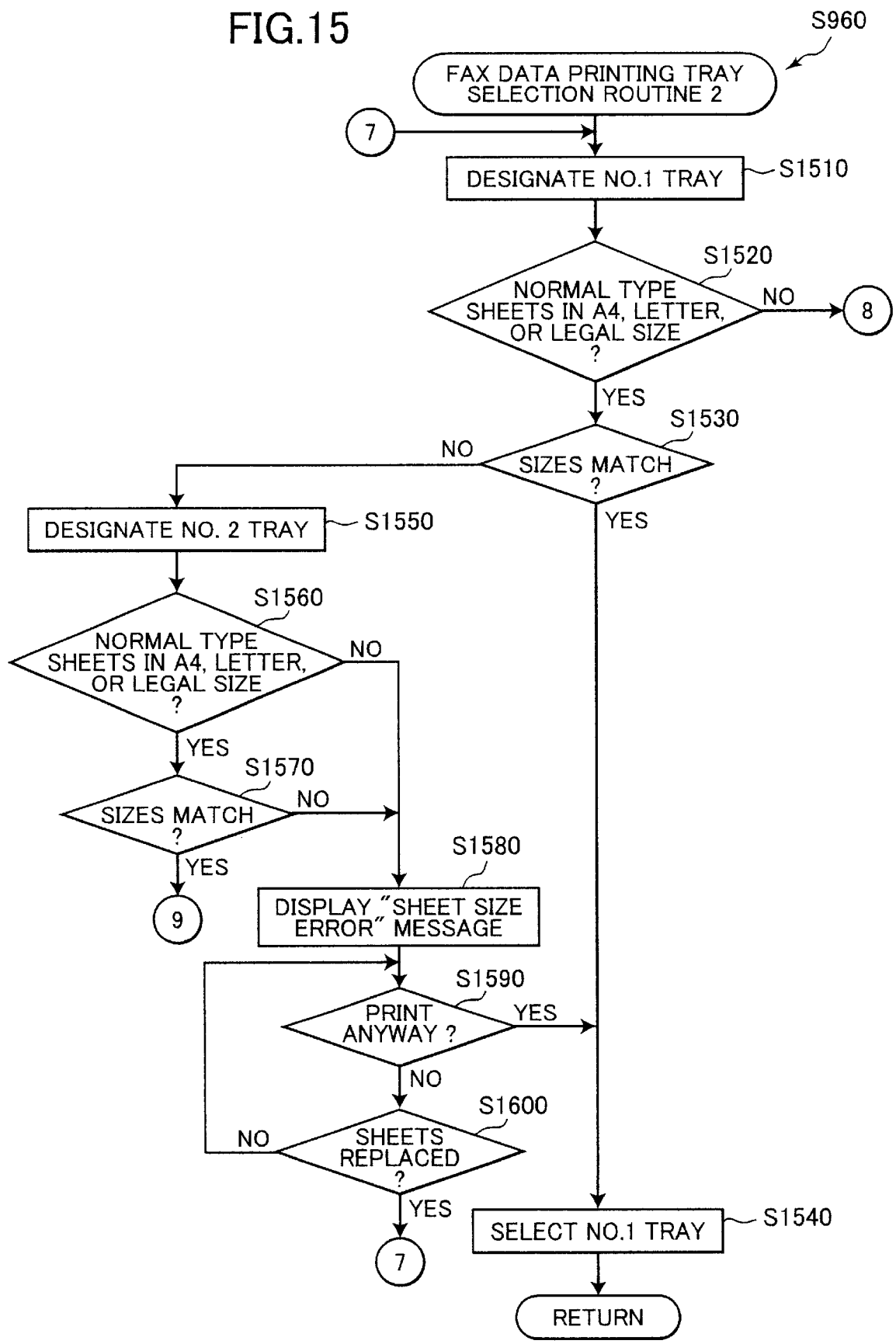
FIG. 15 is a flowchart showing a part of a process of S960, for selecting a sheet tray to be used for printing in a facsimile mode, during the routine of FIG. 10.
Figure 16:
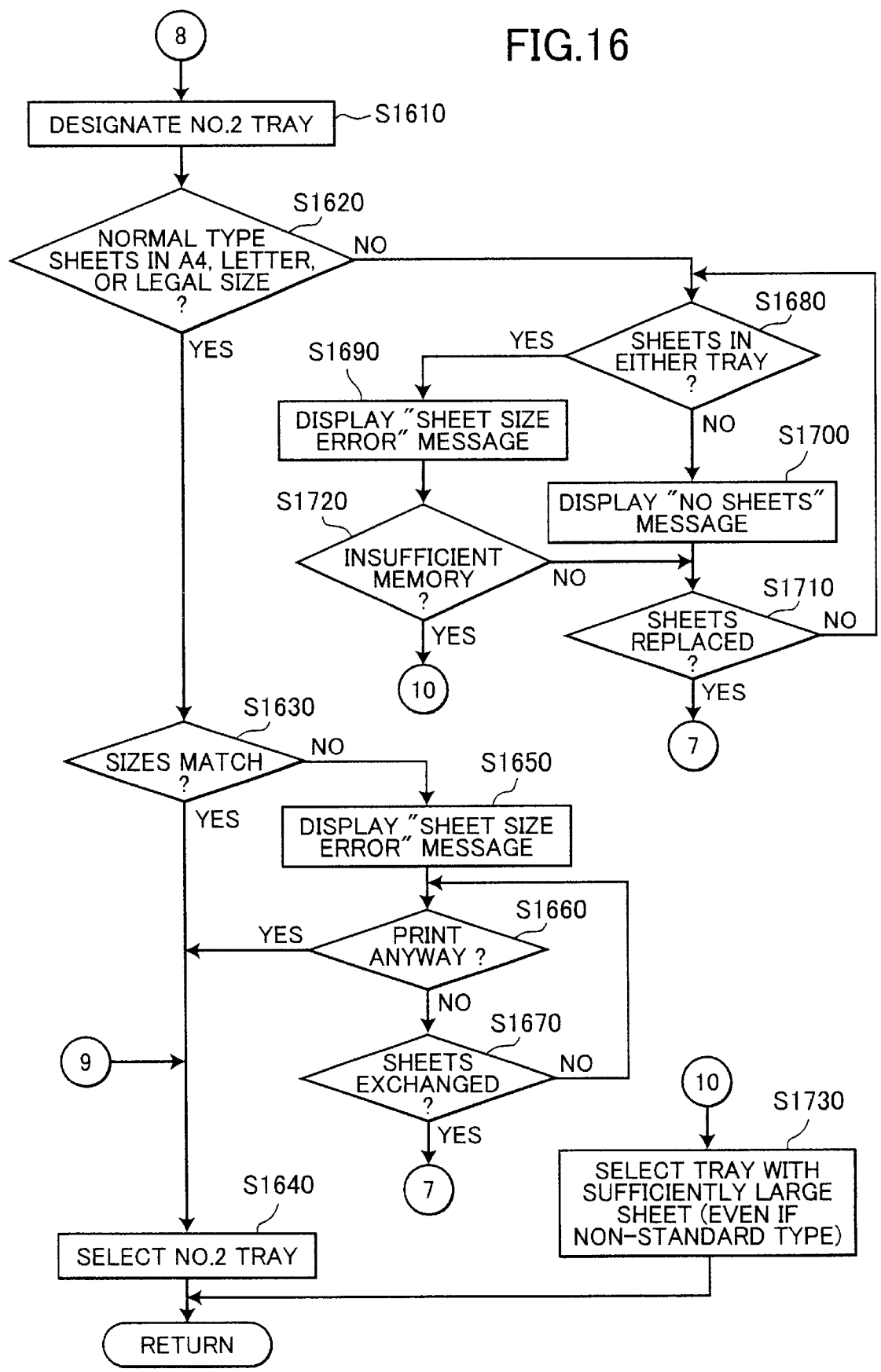
FIG. 16 is a flowchart showing a remaining part of the process of S960.

Next, an explanation will be provided for the fax print tray selection routine 2 while referring to the flowcharts shown in FIGS. 15 and 16. It should be noted that processes performed in S1510 to 1600 in FIG. 15 are exactly the same as the processes in S1210 to S1300 in the fax print tray selection routine 1 of FIG. 13. Also, processes of S1610 to S1710 of FIG. 16 are the same as the processes of S1310 to S1410 of the fax print tray selection routine 1 of FIG. 14.

The fax print tray selection routine 2 differs from the fax print tray selection routine 1 in that when no normal type sheets with normal size are disposed in either the No. 1 tray 51 or No. 2 tray 52, but some type of sheet is disposed in the No. 1 tray 51 or the No. 2 tray 52 (S1680:YES), after displaying a size error message in S1690, additional processes are performed in S1720 wherein it is judged whether or not an empty memory area in the fax reception region (shown in FIGS. 19b and 19c) is insufficient. If the memory is judged not to be insufficient (S1720:NO), then the routine proceeds to S1710 to wait that papers be replaced. When it is judged that the memory area is insufficient (S1720:YES), even if non-standard sheets, such as overhead projector sheets, thick sheets, or colored sheets, are present in one of the trays 51, 52, but if the size is sufficient for performing fax reception printing, then the tray having those sheets is selected in S1730, and printing will be performed with using that tray.

As described above, during the fax printing tray selection routine 2, the forced printing can be performed on normal sheets with such sizes that will not lose fax data when printing the fax data. Forced printing is prohibited on normal type papers in sizes that are too small such as B5 size. These two points are the same as in the fax printing tray selection routine 1. However, in contrast to the fax printing tray selection routine 1, during the fax printing tray selection routine 2, even when sheets other than the normal type sheets with the predetermined normal sizes are disposed in the No. 1 tray 51 or the No. 2 tray 52, then when the memory area is judged as being insufficient, forced printing will be compulsorily executed on available sheets which are not normal type sheets, such as overhead projector sheets, as long as the sheets have a sufficient size. This prevents reception of facsimile messages from being terminated by an insufficient memory area.

It is noted that according to the present embodiment, the No. 3 tray 53 housing A3 sized normal type sheets can be provided in addition to the No. 1 tray 51 and the No. 2 tray 52. Therefore, when memory area is judged to be insufficient (yes in S1720), the No. 3 tray 53 may be selected so that printing be executed on the A3 size normal type sheets housed therein. Even though the A3 size normal type sheets are excessively large, the entire image represented by the fax reception data can be entirely printed out without losing information. Further, the A3 size normal type sheets are less expensive than overhead projection type sheets. Furthermore, the A3 size normal type sheets can be cut down to a desired size using a paper cutter or the like.

The printer 30 repeatedly executes a fax print routine of FIG. 17(a) for printing facsimile messages received from remote devices and for printing print data received from the computers 11–14. The fax print routine is repeatedly executed as an interrupt routine with a predetermined time interval.

When the fax print routine of FIG. 17(a) is started, it is first judged in S1810 whether or not fax reception has been completed. Fax printing is started in S1820 only after fax reception has been completed (S1810:YES). Once fax printing has been started, fax printing is continued until fax printing has been performed for all the received fax data (S1830:NO, S1820). Once printing has been performed for all the received fax data (S1830:YES), then in S1840, the printer 30 can be used to print out based on print data.

If a request (printer command) is received to print out print data (S1840:YES) during the middle of fax reception (S1810:NO), then printing operations for printing out based on the print data are started in S1850 and are continued until printing is performed for all print data (S1860:NO, S1850). Once printing has been performed for all of the print data (S1860:YES), then the color laser printer 30 is once again brought into a condition wherein it can enter the fax print mode. It should be noted that while the color laser printer 30 is in the printer print mode, the fax reception can be executed using the different routine of FIG. 5(a).

By configuring the fax print routine in this manner as shown in FIG. 17(a), when two pages' worth of fax data are received, fax printing is executed only after the second page's worth of data has been received.

Figure 17B:
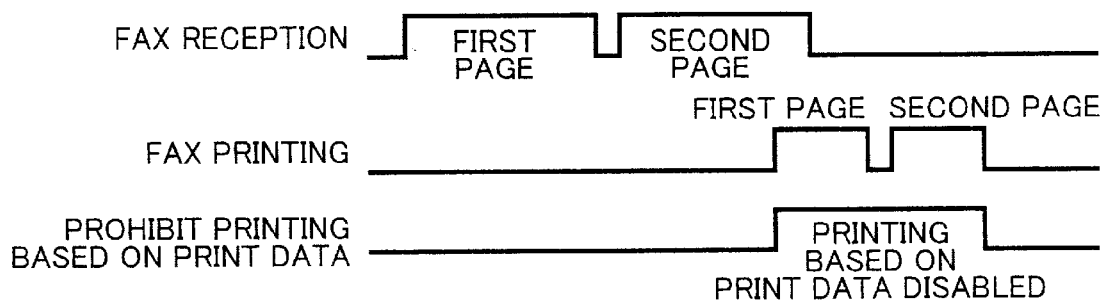
FIG. 17(b) is a timing chart for the flowchart of FIG. 17(a)

Printing based on print data is possible during reception of a facsimile message. Only when fax printing is being executed, printing can not be performed based on print data as shown in FIG. 17(b). In this way, fax print output is performed after an entire facsimile message has been completely received. Therefore, the printing engine portion 81 is driven for only a short period of time so that excessive wear on the transfer drum 35 and the like can be prevented.

Figure 17C:
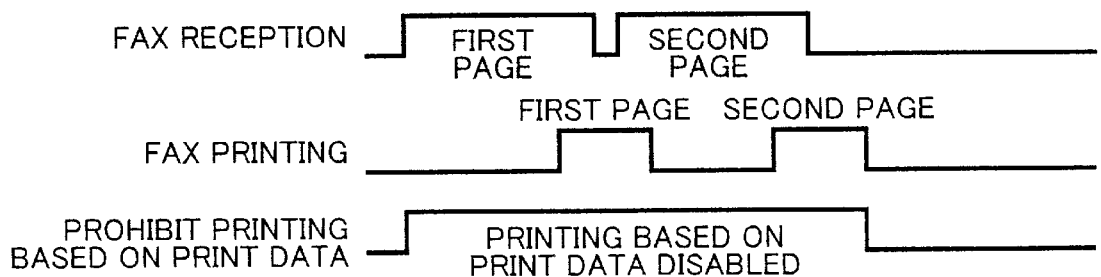
FIG. 17(c) is a comparative timing chart.

FIG. 17(c) is a comparative timing chart for showing purposes a comparative situation wherein fax print output is performed each time a single page's worth of fax data is received. When printing is performed each time a single page's worth of fax data is received, then during of time when the printer can not be used for printing based on print data is increased. Further, the time interval between when the printing engine portion 81 prints the first page and the second page increases. Therefore, the sheet supply operations for the second page can not be performed while the first page is being printed. In other words, a consecutive printing operation can not be performed. Therefore, drive time for sheet transport operations increases, and wear of the transfer drum 35 and the like increases. Depending on the amount of fax reception data and speed of fax reception, the time interval between printing of successive pages will possibly further increase. Operations for driving the transfer drum 35 have to be temporality stopped and then restarted repeatedly. This type of drive quickly wears down the sheet transport mechanism 82, the transfer drum 35, and the like.

Thus, according to the fax print process of FIG. 17(*a*), while facsimile data is being received, printing of the facsimile data is not started, and the facsimile data is merely stored in the facsimile data memory region shown in FIG. 19(*b*) or 19(*c*). While the facsimile data is thus being received, the print request for print data can be received until the facsimile data is completely received. When the facsimile data is completely received and when printing of print data is not yet started, the facsimile data now stored in the facsimile data memory region is started being printed. When printing of the facsimile data is being executed, interruption by a print request for print data is prohibited until printing of the facsimile data is completed. While interruption by a print request for print data is thus prohibited, print data is merely stored in the print data memory region. When printing of the facsimile data is completed and the interruption by the print request is enabled, print data is printed. Printing of facsimile data is prohibited until printing of the print data is completed.

Figure 18B:
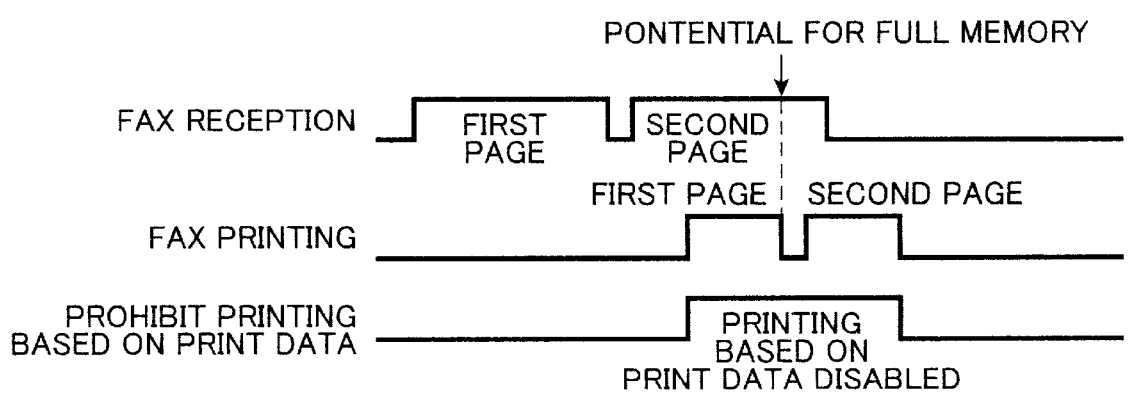
FIG. 18(b) is a timing chat for the flowchart of FIG. 18(a)

Next, an explanation will be provided for a modification of the fax print processes of FIG. 17(*a*) while referring to the flowchart in FIG. 18(*a*).

During the fax print processes of FIG. 18(*a*), it is first judged in S1910 whether or not fax reception is being performed. If fax reception is being performed, then in S1920, it is judged whether or not a memory full condition will occur based on confirmation of a residual amount of memory area in the fax data reception memory area (shown in FIG. 19*b* or 19*c*). It should be noted that judgement of whether the memory full condition will occur can be performed before fax reception is started. When the residual amount of the memory area is judged to be smaller than a predetermined amount and therefore it is speculated that the memory full condition might occur (S1920:YES), then in S1940, fax printing operations are started even while fax reception is still being performed. When it is judged that the memory full condition will not probably occur (S1920:NO), then it is judged in S1930 whether or not fax reception has been completed. The following processes in S1930 to S1980 are the same as the fax print processes of S1810–S1860 described above with reference to the flowchart of FIG. 17(*a*).

With this configuration, as shown in FIG. 18(*b*), when it is judged that a memory full condition might occur while receiving two pages' worth of fax data, for example, then fax printing is started at a timing so that the first page of the facsimile message can be completely printed before the memory full condition occurs and so that the fax reception memory can be quickly cleaned. Therefore, the memory full condition can be prevented from occurring during the reception so that fault fax reception can be prevented. In this modification also, once fax printing is started, fax printing is given priority and continued until fax printing has been performed for all received fax data. Accordingly, a command for printing based on print data will not be received during fax printing, and therefore sheets printed based on fax data will not be mixed up with sheets printed based on print data.

In other words, according to the process of FIG. 18(*a*), while facsimile data is being received, it is judged whether the amount of an empty area in the facsimile data memory region will become smaller than the predetermined amount and the facsimile data memory region will become a memory full condition. When the memory full condition is judged, the interruption by the print data printing request is prohibited, printing of the facsimile data now stored in the facsimile data memory region is started, and the interruption by the print data printing request is enabled when printing of the facsimile data is completed.

It should be noted that the fax print routine of FIGS. 17 and 18 is explained on the presumption that the fax priority is set to off in the option detection routine of FIG. 3. For this reason, as described above, duration of time wherein printing can not be performed based on print data is shortened.

If the fax priority is set to ON, even if the request for printing based on print data is received during fax reception, the print data will only be stored. However, even if the fax priority is set to ON, the fax printing is executed after all fax data has been received. Therefore, the period of time when the printing engine portion 81 has to be driven consecutively can still be shortened. Therefore, wear of the transfer drum 35 and the like can be suppressed sufficiently.

According to the present embodiment, a page protect mode can be set with respect to the memory management of the RAMs 63, 64 when printing print data. As shown in FIG. 19(*b*), the page protect mode is generally known as a mode for securing, in a free area of the memory, an image region for enabling development of a single page's worth of print data, received from the personal computer 11–14, for printing.

During fax printing, image data, corresponding to the upper left side of the image, is received first. Therefore, there is no need to perform processes of the page protect mode. In other words, there is no need to secure an image development region for a page's worth of data in the free area. Band processes are more appropriate for fax printing. During band processes, several regions, each for developing several lines worth of image data, are prepared, and the regions are repeatedly rewritten with fax data while printing is being performed.

If the page protect mode is kept valid also during fax printing, the amount of empty regions in the RAMs 63, 64 is restricted. Accordingly, a sufficient amount of area cannot be obtained as required for developing the received fax data (G3 compressed data) into intermediate compressed data to be used for printer output. Also, the amount of the data area for storing fax reception data has to be initially set to a small value.

Figure 19C:
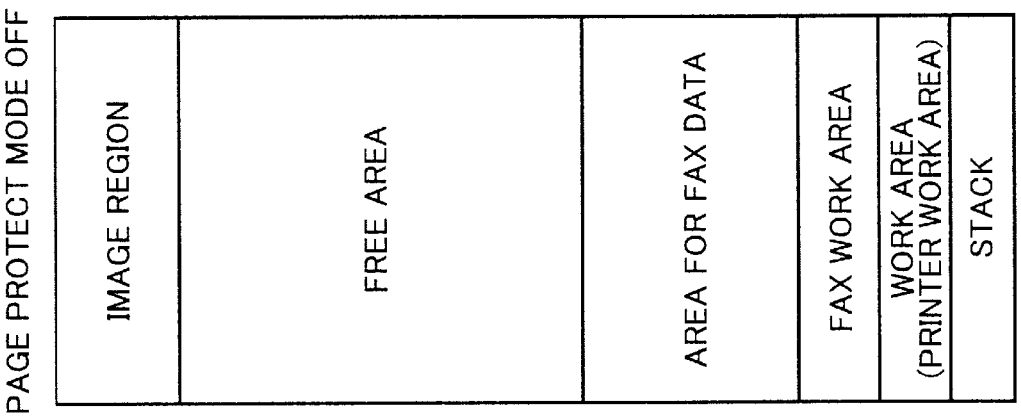
FIG. 19(c) is a schematic view showing a state of the memory region when the page protect mode is being OFF.
Figure 19B:
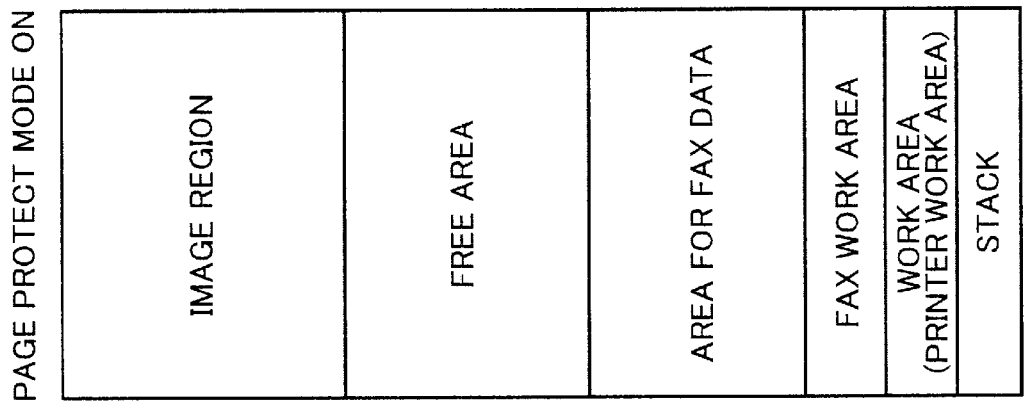
Figure 19A:
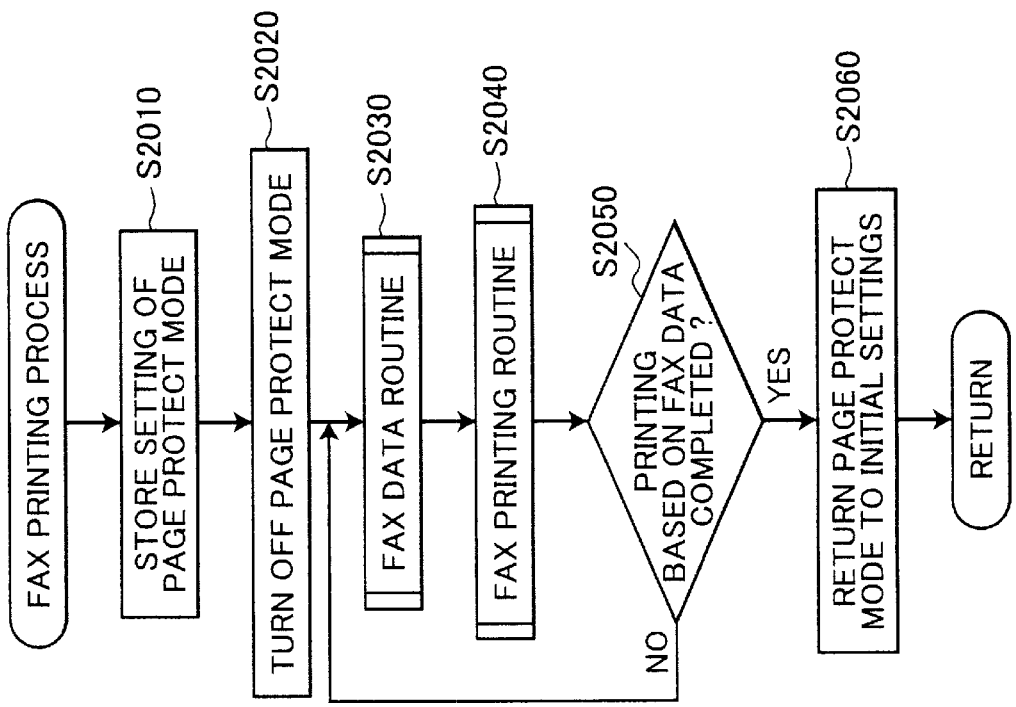
FIG. 19(a) is a flowchart showing a fax printing execution process in each of processes of FIGS. 17(a) and 18(a) for turning off a page protect mode.

Considering the above-described problems, the fax print process of S1820 or S1940 can be executed as shown in FIG. 19(*a*) when the color laser printer 30 is set to the page protect mode for printing based on print data. As shown in FIG. 19(*a*), first in S2010, the settings relating to the page protect mode are stored in the RAM 63 or 64. Then in S2020, the page protect mode is turned off. As a result, even if a large image region is secured as shown in FIG. 19(b) when the page protect mode is on, by turning the page protect mode off during fax printing, then as shown in FIG. 19(c), the image region can be reduced to a smaller amount that is sufficient as required for executing band processes. As a result, the amount of the free area, for developing fax data into compressed data for printing and for performing other operations, can be increased. By thus increasing the free area, the large-sized fax data area can be initially secured.

Thus, during the fax printing processes, the page protect mode is turned off, to enable using the enlarged free area. That is, fax data processes are performed in S2030, to convert with using the enlarged free area, fax data, such as G3 compressed data, into compressed data for printing. Next, fax printing operations are performed in S2040. The fax printing operations of S2040 are performed by executing band processes to consecutively develop an every predetermined number's lines worth of data, from the top of the page consecutively downward, into bitmap data for actual printing. The bit map data is used by the print engine portion 61 to be printed.

When fax printing is completed (S2050:YES), then in S2060, the setting conditions relating to the page protect mode stored in S2010 are returned to the original condition, and this routine is ended. That is, the page protect mode is turned ON according to the stored setting conditions.

As described above, the free area shown in FIG. 19(c) is used for processing both print data and fax data. Accordingly, it is preferable that processes of FIG. 20 be executed for setting a busy state to an interface, that is not being used for fax communication, so that a sufficient amount of empty capacity can be secured in the free area as required for developing fax data into data for printing.

Figure 20:
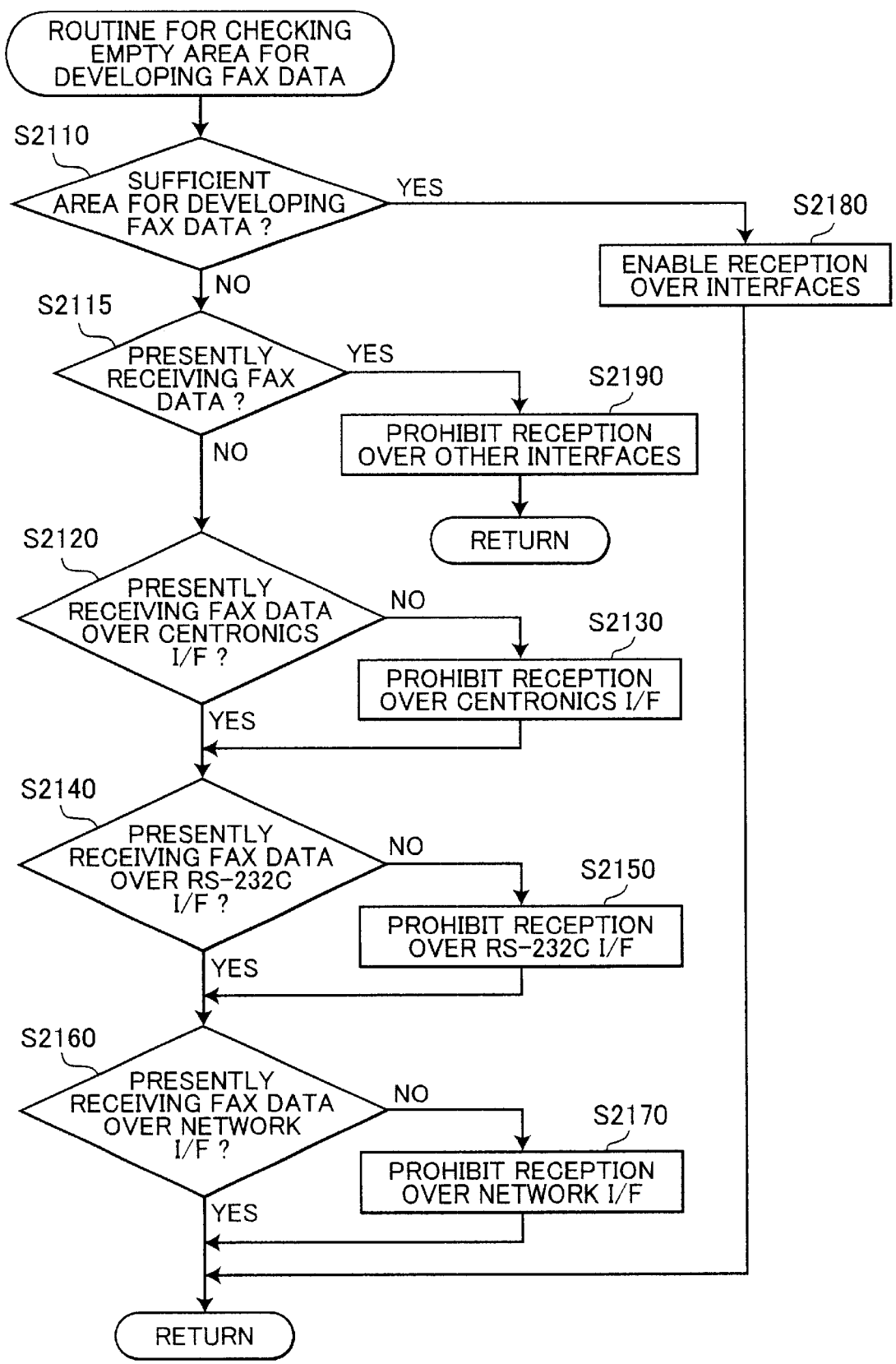
FIG. 20 is a flowchart showing a routine executed by the printer for checking empty area in a fax data memory.

This routine of FIG. 20 is repeatedly executed with a predetermined time interval.

First in S2110, it is judged whether or not a sufficient area is available in the free area (shown in FIG. 19(c)) for developing fax data into data for printing. If it is judged that the present empty area in the free area has an amount smaller than a predetermined amount and therefore it is judged that an insufficient area is available (S2110:NO), then in S2115, it is judged whether or not fax reception from any remote device is being performed. When it is judged that fax reception is being performed (S2115:YES), then in S2190, all the other interfaces are set to busy state (reception disabled state). When it is judged that fax reception is not being performed (S2115:NO), then in S2120, it is judged whether or not the Centronics interface 72 is presently receiving fax transmission data. If it is judged that Centronics interface 72 is not receiving fax transmission data (S2120:NO), then in S2130, the Centronics interface 72 is set to busy state (reception disabled state).

Next in S2140, it is judged whether or not the RS-232C interface 71 is presently receiving fax transmission data. If the RS-232C interface 71 is judged not be presently receiving fax transmission data (S2140:NO), then in S2150, the RS-232C interface 71 is set to busy state (reception disabled state).

Next in S2160, it is judged whether or not the network interface 73 is presently receiving fax transmission data. When it is judged that the network interface 73 is not presently receiving fax transmission data (S2160:NO), then in S2170, the network interface 73 is set to busy state (reception disabled state).

With this configuration, when the empty capacity in the free area (common area) to be used for developing fax data into data for printing is becoming insufficient, if fax reception is not being performed, all the interfaces, other than that presently receives fax transmission data from the computer 11–14, are set to the busy conditions. When the interface is presently receiving fax reception data from a remote device, all interfaces for receiving data from personal computers 11–14 are set in a busy condition. During the next interrupt routine of FIG. 20, when sufficient free area is available (S2110:YES), then in S2180, the busy condition for interfaces, that have been set as being busy when the area for fax data development was considered to be insufficient, are turned off in S2180. It should be noted that during S2180, turning off of the busy condition is performed only on those interfaces that have been set as being busy because the fax development area was determined to be insufficient during the already-executed interrupt routine of FIG. 20. Interfaces that have been set as being busy for other reasons than this are continued to be set as being in a busy condition. It is noted that the reasons why the interfaces are set as being in a busy condition can be known by setting a flag for indicating the busy condition in a memory of the color laser printer 30.

According to the above-described configuration, the empty area, for developing fax data into compressed data for printing, is checked so that before the empty capacity required for the fax data development in the free area can not be properly secured due to print data developed in the free area, the interfaces not being used for fax transmission or reception are set to a busy condition, thereby preventing the empty area from being decreased to an insufficiently small size.

With the above-described structure, the system of the present embodiment can perform a multiple-copy fax transmission processes for sending the same fax transmission data to a plurality of remote devices using the application software, such as a word processing software, installed in each personal computer 11–14.

Figure 21:
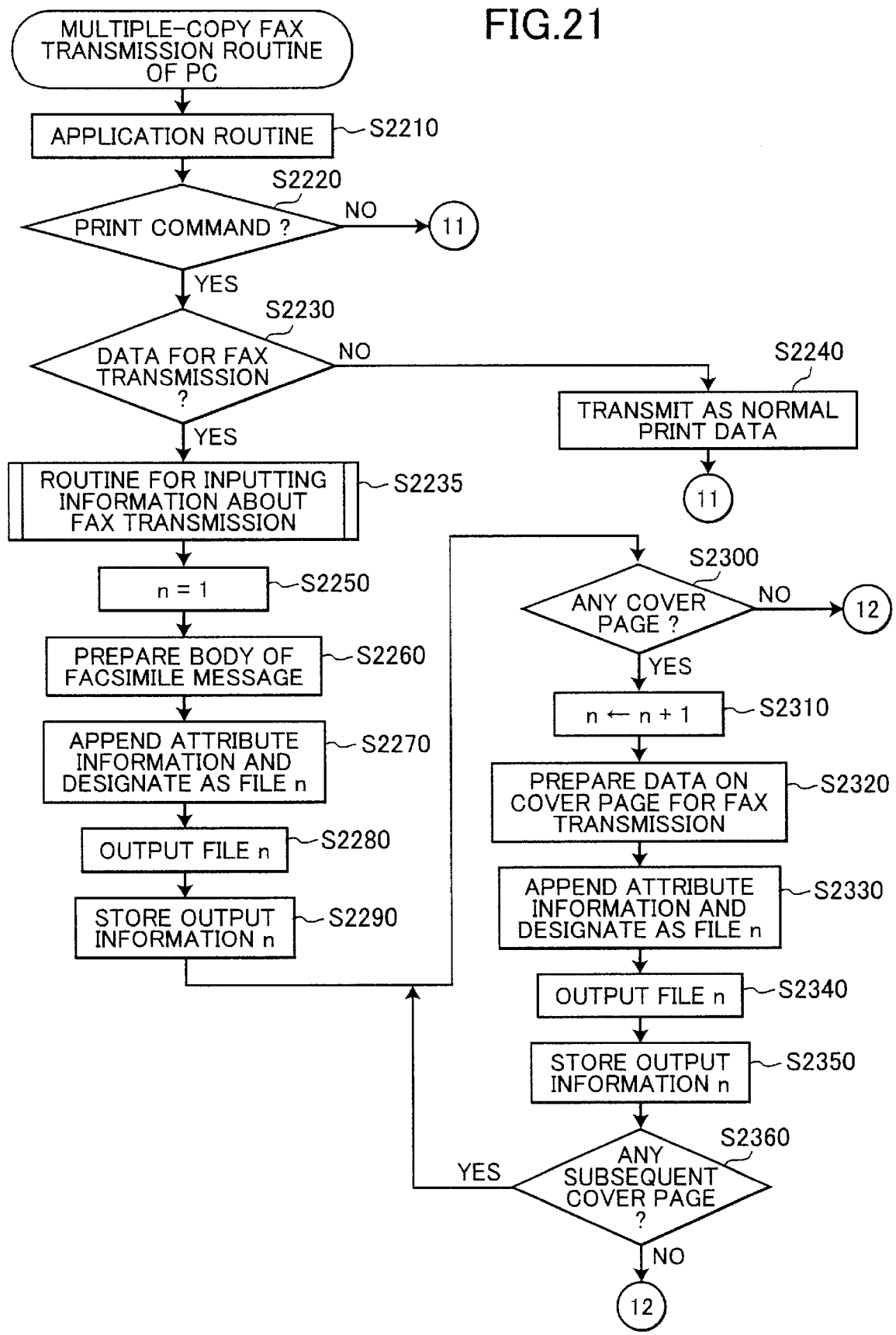
FIG. 21 is a flowchart showing a part of a routine executed by each personal computer for performing a multiple-copy fax transmission process.
Figure 22:
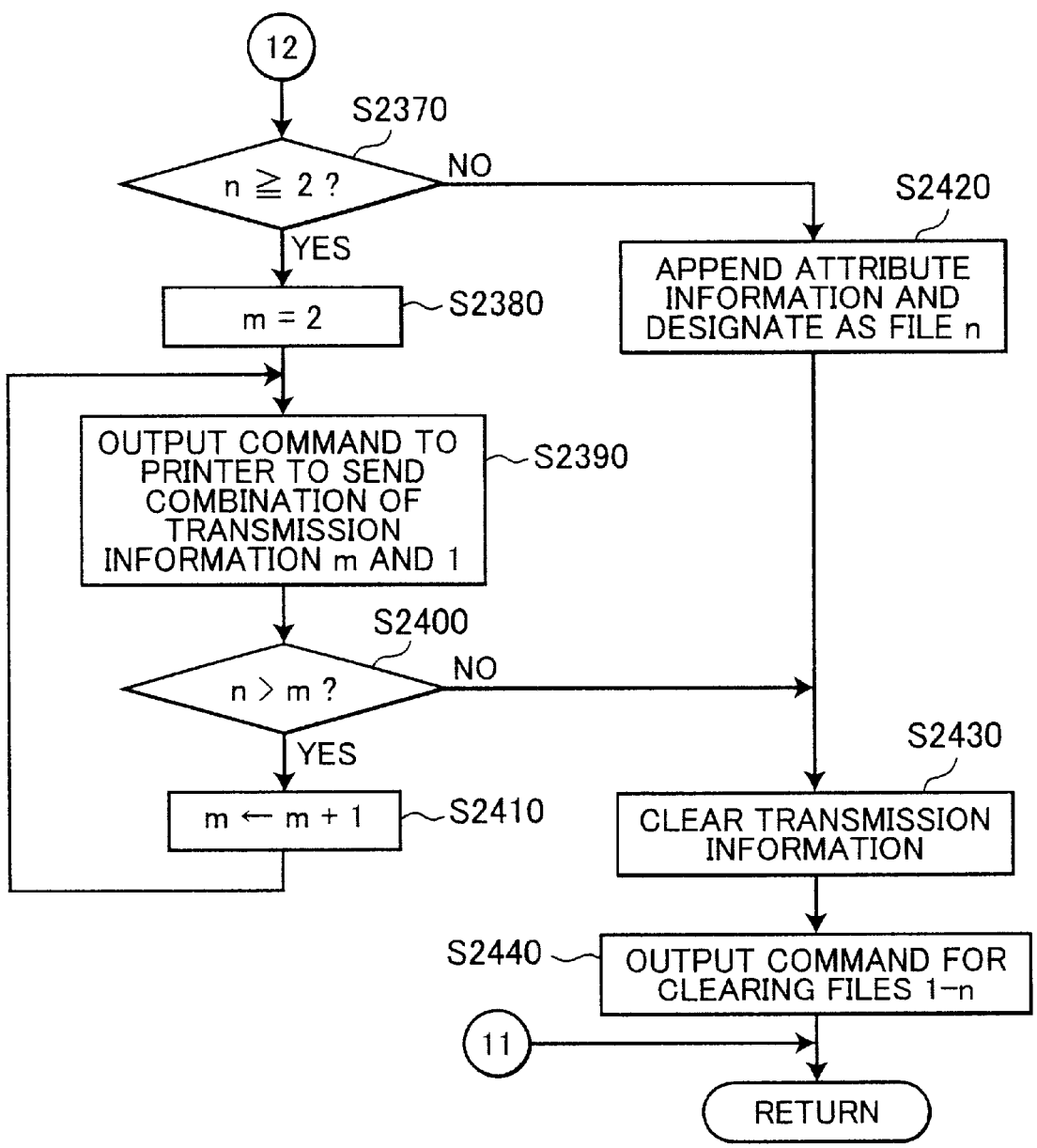
FIG. 22 is a flowchart showing a remaining part of the routine for performing the multiple-copy fax transmission process.

In order to attain the multiple-copy fax transmission processes, the main routine of FIG. 6(b) executed by each personal computer 11–14 may preferably be modified as shown in FIGS. 21 and 22.

First, the CPU 101 executes application processes in S2210 to prepare text data using the application software, such as a word processing software, installed in the ROM 102. The CPU 101 executes the application processes repeatedly until a print command is inputted by the operator (S2220:NO).

When a print command is inputted during the application processes (S2220:YES), then in S2230, the CPU 101 judges whether or not the print command is for fax transmission through judging whether or not the print command designates the printer 30 as a fax function-added printer. When the print command selects the printer 30 as a normal printer and therefore the subject of the print command is not for fax transmission (S2230:NO), then in S2240, a normal print data transmission routine is executed according to the presently-used application software.

When the print command designates the printer 30 as a fax function-added printer and therefore subject data is for fax transmission (S2230:YES), then the fax transmission information input routine is performed in S2235. During the fax transmission information input routine, an input screen is displayed on the CRT 111 for enabling the user to input: information (telephone number) of one or more remote parties where the subject fax transmission is to be transmitted; and data indicative of the sender (user). Another screen is also displayed for enabling the user to select whether or not a cover page is to be added. The user follows the instructions displayed on the screens and inputs: the telephone number(s) of the remote fax machine(s) where the message is to be sent; data of the user (sender); and information that needs to be shown on the cover page(s) to be sent. Then, when the user finally inputs a print OK command during the fax transmission information input routine of S2235, following processes are executed. The multiple-copy fax transmission will be performed when a plurality of fax numbers are inputted in S2235 as the telephone numbers of remote devices where the subject facsimile message is to be transmitted.

Thus, when the printer 30 is selected as a fax transmission unit (fax function-added printer) and the OK button is clicked after necessary information has been inputted in S2235, then in S2250, a counter "n" representing the number of transmission data is set to one (1). Next in S2260, fax text data is prepared by executing a fax transmission data preparation routine. More specifically, a routine for converting text data, prepared by the word processing software, into G3 compressed type fax data. Then in S2270, the G3 compressed type fax data, prepared in S2260, is appended to attribute information indicating that the present fax data is a main message to be combined with a cover page during a multiple-copy fax transmission, and is defined as file "n", that is, in the present example, file 1 because the counter "n" is now set to 1. Next in S2280, the file "n" is transmitted to the color laser printer 30, which is now selected as a fax transmission unit. In S2290, the RAM 103 is stored with transmission information "n" (in this case transmission information 1) indicating that main message data has been transmitted to the fax transmission printer 30 as file "n".

Next in S2300, the CPU 101 judges whether or not a cover page is designated to be transmitted for the fax transmission. When a cover page is to be transmitted (S2300:YES), then in S2310, the counter "n" representing the transmission data number is incremented by one (1). In S2320, the CPU 101 prepares cover page data in a format for fax transmission, that is, G3 compressed type fax data, in the same manner as the main facsimile message. Next in S2330, the cover page data is appended with attribute information indicating that the present cover page is a fax transmission cover page to be combined with a main message during the multiple-copy fax transmission operation, and the resultant information is defined as file "n". Afterward in S2340, file "n" is transmitted to the fax transmission printer 30. In S2350, the RAM 103 is stored with transmission information "n" representing that the cover page data has been transmitted to the fax transmission printer 30 as file "n".

Afterwards, it is judged in S2360 whether or not another cover page has to be prepared for attaining the user's designated multiple-copy fax transmission. When another cover page has to be prepared (S2360:YES), then the program returns to S2310 so that the transmission data number counter "n" is incremented by one (1) and the processes from S2320 and on are repeated. Once S2310 to S2350 have been completed for all necessary cover pages (S2360:NO), then in S2370, it is judged whether or not the present value in the transmission data number counter "n" is two or greater. It is noted that when it is judged in S2300 that a cover page is not designated (S2300:NO), then the program proceeds directly from S2300 to S2370 without performing processes from S2310 to S2360.

When it is judged that the present value of the transmission data number counter "n" is two or greater (S2370:YES), then a counter "m" indicating the start number of cover page transmission information is set to two (2) in S2380. Next in S2390, the CPU 101 sends to the fax transmission printer 30 a send command indicating that transmission information "m" ((m−1)-th cover page) be combined with transmission information "1" (main message) and that the combination information be fax transmitted to an address corresponding to the transmission information "m". Thus, a send command for sending a combination of the main message and the first cover page is outputted.

After a fax send command to a single address is thus outputted, then in S2400, it is judged whether or not the value of "n" is greater than the value of "m". When "n" is greater than "m" (S2400:YES), the counter "m" is incremented by one (1) in S2410. Afterward, the program returns to S2390, whereupon the CPU 101 outputs the send command for instructing that the cover page and the main facsimile message be combined and that the combination be fax transmitted to the address corresponding to the cover page. Thus, a send command for sending a combination of the main message and the second cover page is outputted.

S2390 to S2410 are repeated until S2400 results in negative determination. Once send commands have been completely outputted to transmit all cover page/main facsimile message combinations to all addresses, then in S2430, the CPU 101 clears the transmission information stored in the RAM 103. Further in S2440, the CPU 101 transmits to the printer 30 a delete command for clearing files "1" to "n" which have been prepared in S2270 and S2330.

When the value of the counter "n" is less than 2 (S2370:NO), then this means that the user has designated to transmit a facsimile message, without a cover page, to only one address. Therefore, in S2420, the CPU 101 transmits to the printer 30 a send command instructing that transmission information "1" (main facsimile message) be fax transmitted to the designated address. Then the processes from S2430 and on are executed.

When receiving the main message and the cover pages, the printer 30 will store the main message and the cover page in the memory region in S450 (FIG. 6(b)). When receiving a send command for each combination of the main message and all the cover pages, the printer 30 will store in S550 (FIG. 6(b)) the send designation (S) data in correspondence with the main message and the cover pages. When receiving the delete (clear) command, the printer 30 will store in S570 (FIG. 6(b)) delete designation (D) data in correspondence with the main message and the cover page.

Figure 23:
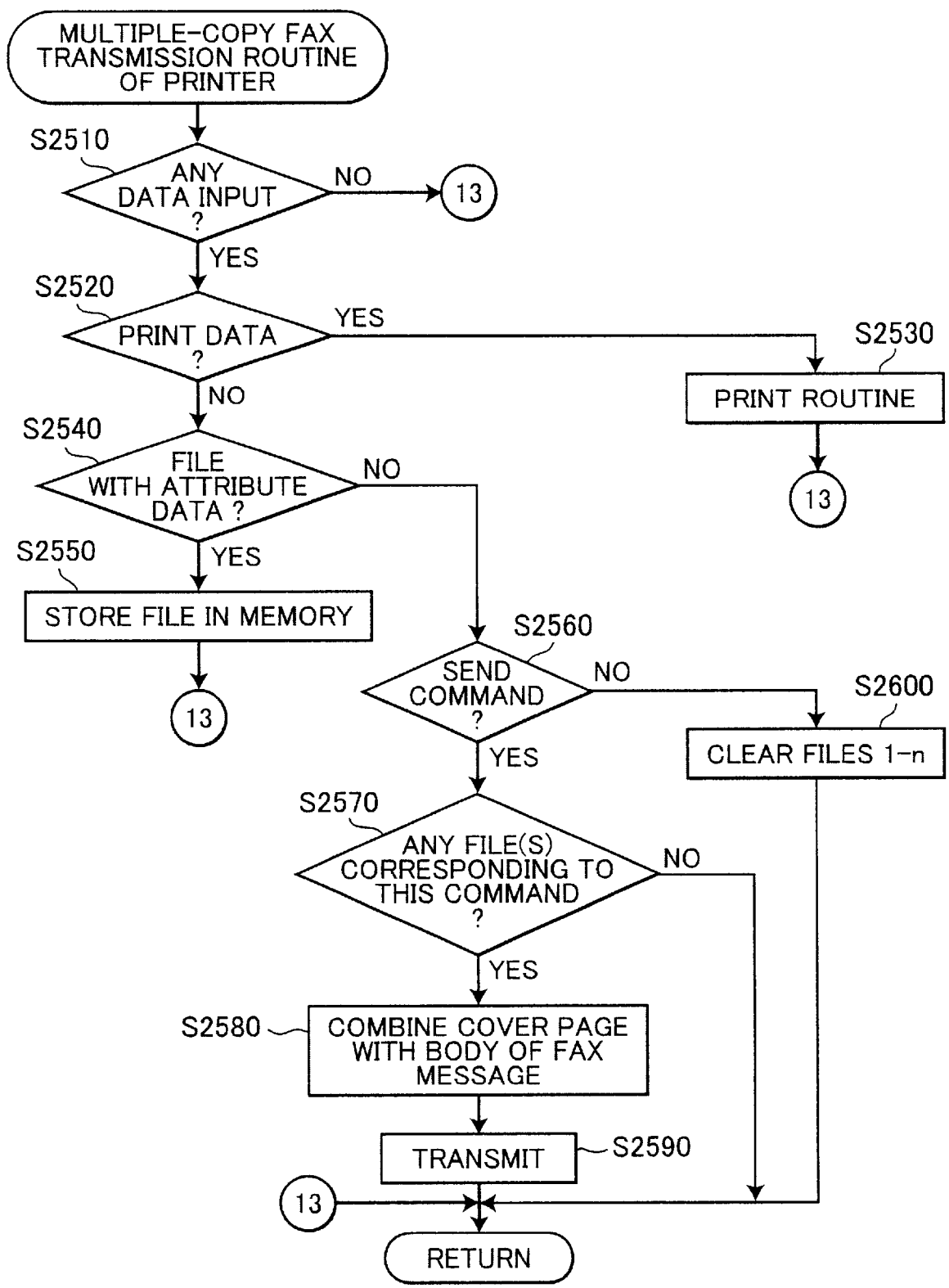
FIG. 23 is a flowchart showing a routine executed by the printer for performing the multiple-copy fax transmission process.

In order to attain the multiple-copy fax transmission operation, the printer 30 additionally executes a multiple-copy fax monitoring process shown in FIG. 23. This monitoring process is repeatedly executed as an interrupt routine at a predetermined time interval.

During the monitoring process of FIG. 23, the CPU 61 first judges in S2510 whether or not data interpreted in the main routine of FIG. 6(b) has been registered in the fax data memory region of the RAM 63 and 64. When some data has been registered (S2510:YES), then in S2520, it is judged in S530 whether or not the data is for a printing designation (P). When the data is the printing designation (P) (S2520:YES), then in S2530, a print process is executed to set a printing flag to fax transmission data designated by the printing designation data (P). As a result, the judging process of S270 (FIG. 4) will result in an affirmative, and printing processes of FIG. 5(c) will be executed.

When the data is registered not for printing (S2530:NO), then in S2540, it is judged whether or not the data is appended to the attribute information indicating that the subject data is a main message to be combined with a cover page or a cover page to be combined with a main message. It is noted that when data has been prepared in the personal computer 11–14 for the multiple-copy fax transmission, then as described above for the processes in S2270 and S2280, each main message file is produced as appended with attribute information indicating that the file is a main facsimile message to be combined with a cover page. Also, as described above for the processes in S2330 and S2340, each cover page file is produced as appended with attribute information indicating that the file is a cover page to be combined with a main message. Accordingly, the printer 30 can judge in S2540 whether or not the data is a fax main message to be combined with a cover page or a fax cover page to be combined with a main message based on presence or absence of the attribute information. When it is judged that the file includes attribute data for main message or cover page (S2540:YES), then in S2550, the data is registered with the file number in another area, for fax transmission, in the fax data memory region.

During the multiple-copy fax transmission process, as described above, after the personal computer 11 (12, 13, or 14) transmits the main facsimile message data, the personal computer transmits one or more cover pages for one or more address to be transmitted. Therefore, through repeatedly executing the routine from S2510 to S2550, the main facsimile message data is registered as file "1" and the cover page data is registered as files "2" to "n" in the fax transmission memory area.

When it is judged that data registered in the fax data memory region is not a file including attribute information (S2540:NO), then in S2560, it is judged whether the data is data for "send" designation (S).

When it is judged that the data is for "send" designation (S) (S2560:YES), in S2570, it is judged whether any file having attribute information designated by the send designation (S) is present. When a file designated by the send designation (S) is present (S2570:YES), then in S2580, the designated cover page and main facsimile message are combined and set with a "send" flag in S2590. As a result, the judging process of S220 (FIG. 4) will result in an affirmative, and sending processes of FIG. 5(b) will be executed.

When the registered data is not a "send" designation (S) (S2560:NO), then this means that the data is "delete" designation (D) for clearing files "1" to "n". Accordingly, in S2600, files "1" to "n" stored in S2550 are set to a delete flag. As a result, all the files will be cleared in the delete routine (not shown).

During the above-described multiple-copy fax transmission routine, the personal computer transmits to the printer 30 the main facsimile message data only once, and then afterward, transmits cover page data in a required number of sets. Therefore, when performing multiple-copy fax transmission, only a small amount of data need be transmitted from the personal computer 11–14. Because the small amount of data is thus transmitted from the personal computer 11–14 to the printer 30, only a small amount of burden is placed on the memory of the printer 30. Because the main facsimile message data and the cover page data can be distinguished from each other by file number, multiple-copy fax transmission can be performed, according to "send" commands transmitted from the personal computer, by merely combining the same main facsimile message data with one or more different cover pages and by transmitting those combinations.

In the above description, the "send" command is outputted in S2390 after all the files are outputted to the printers 30. It is noted, however, that the main facsimile message data is transmitted as file 1 to the printer 30 in S2280 before the cover page data is transmitted in S2340. Accordingly, the "send" command can be outputted immediately after each set of cover page data is transmitted in S2340 as file "n" to the printer 30.

When only a small amount of the fax data memory region is available, when a large number of cover pages need to be transmitted, or when each cover page includes a large amount of data, if all cover pate data is transmitted and stored in the printer 30 before the main facsimile message data is transmitted to the printer 30, the main facsimile message data may possibly not be stored in the fax data memory region of the printer 30. However, since the main facsimile message data is transmitted before cover page data, the main facsimile message data can be reliably stored in the memory region. Afterwards the required number of cover pages may be consecutively transmitted. Especially, according to the present modification, after each set of cover page is transmitted, a "send" command may be outputted. In this case, a delete command can be outputted immediately after the send command is outputted so that only the cover page data that has just been sent will be deleted. That is, a command for clearing only a cover page that has just been transmitted may be outputted in S2440 so that the already-transmitted single cover page be deleted from the memory region in S2600. By following this order of processes, the operations required to attain the multiple-copy fax transmissions can be suppressed to a minimum amount without generating an insufficient memory condition.

That is, when operations are performed in the above-described order, it is advantageous that the main facsimile messages be transmitted to the printer 30 first, and then later, the cover page data be transmitted to the printer 30.

Also, in order to transmit the main facsimile message data and the cover page data in a combination, the main facsimile message data may be transmitted in a plurality of files to the printer 30 before cover page data. The plurality of main facsimile message data may be combined with a single cover page, and may be transmitted in the same way as described above.

As described above, according to the present embodiment, a user who uses a fax transmission application to transmit data of a facsimile message, prepared using a word processing software in a personal computer, is enabled to print the facsimile message on a print out sheet using simple operations. The fax transmission routine is started in S410 when a fax entering command is transmitted from the personal computer. The fax transmission data is stored in S440 to S490. Once a data operation command, such as a print command, a send command, and a deletion command, are inputted, then corresponding operations are executed in S500 to S570. The print command is included in the data operation commands. Also the fax transmission data is deleted only after a deletion command is received. Therefore, whether or not the fax transmission data has been properly converted into a fax format can be confirmed before the fax transmission data is transmitted to a remote device. Also, a printed copy of the facsimile message can be obtained based on the fax transmission data. There is no need to retransmit the data to the printer 30 in order to obtain the fax copy.

Second Embodiment

A local area network system according to a second embodiment will be described with reference to FIGS.

24–29. The system according to the present embodiment is similar to the system according to the first embodiment, but further includes a fax option function that is capable of automatically executing printing, transmission, and deletion of fax transmission data in series according to a user's performed single operation.

Figure 26:
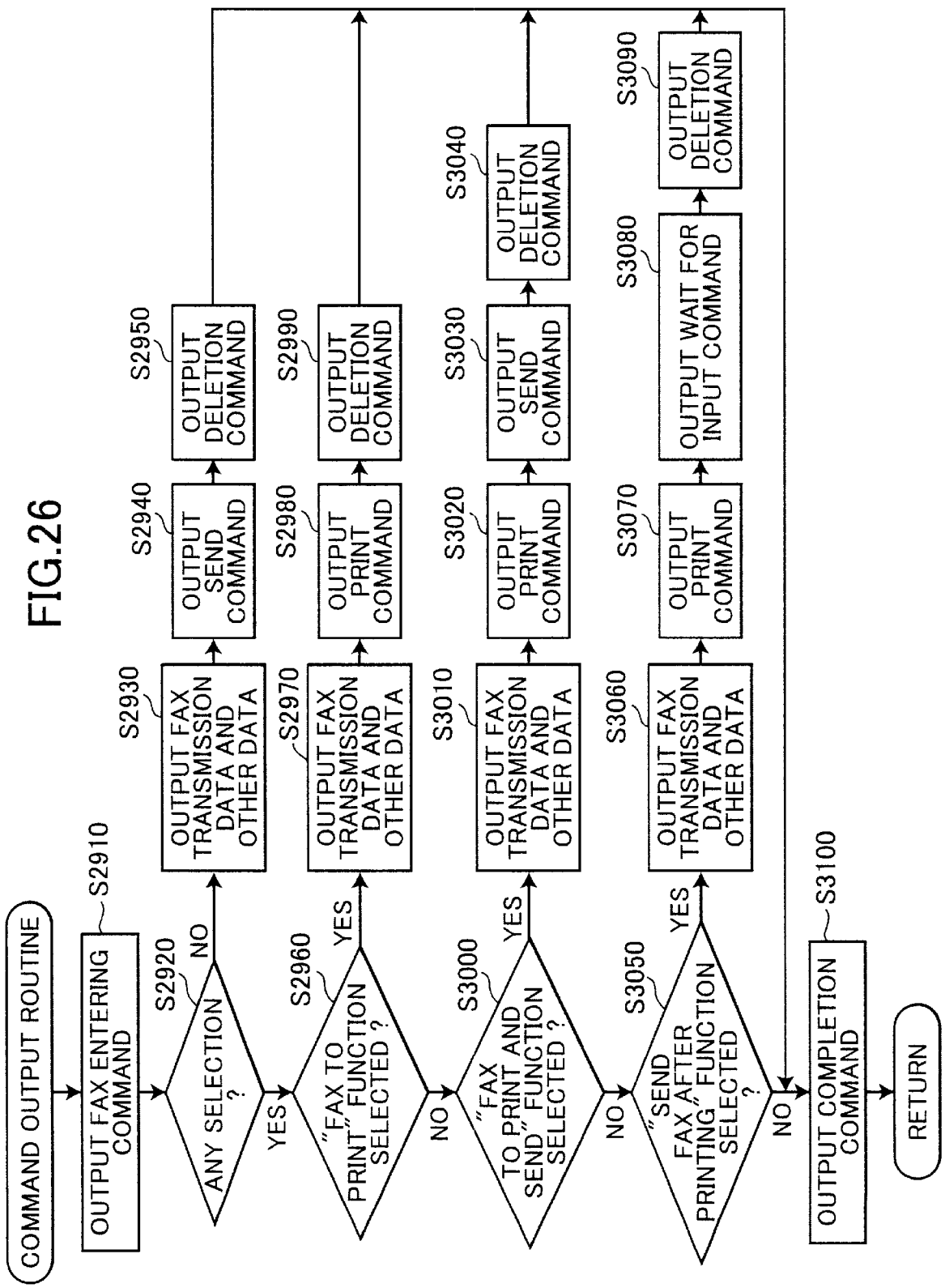
FIG. 26 is a flowchart showing a command output routine executed by each personal computer for using the fax option function.

The system according to the second embodiment includes all components of the system according to the first embodiment. Also, the system of the second embodiment executes control operations the same as those of the first embodiment except that the personal computer 11–14 performs a command output routine as shown in FIG. 26 in place of the command output processes of S182–S198 in the processes of FIG. 6(*a*), that the personal computer 11–14 performs a driver setting routine of FIG. 24, that the printer 30 executes the main routine as shown in FIG. 27(*a*) in place of that of FIG. 6(*b*), and that the printer 30 executes the wait for input routine of FIG. 27(*b*). The system of the present embodiment will be explained only for portions that differ from the system of the first embodiment. Description of similar components and control operations will be omitted.

The fax option function according to the second embodiment includes: a fax to print function, a fax to print and send function, a send fax after printing function. The fax to print function is executed when a corresponding command is outputted from some personal computer 11 to 14, whereupon fax transmission data is printed out by the printer 30 and then the fax transmission data is deleted.

The fax to print and send function is a function performed according to a corresponding command from some personal computer 11 to 14 whereupon the printer 30 prints out based on the fax transmission data, transmits the fax transmission data, and then deletes the fax transmission data. The send fax after printing function is performed according to a corresponding command outputted from some personal computer 11 to 14. During the send fax after printing function, the printer 30 prints out according to the fax transmission data and then displays a message saying "send fax now?" on the display portion 84. When a predetermined key is pressed on the operation portion 83 in response to the message, then the fax transmission data is immediately transmitted and then afterward is deleted from the memory. On the other hand, when a key other than the predetermined key is pressed, the fax transmission data is immediately deleted.

Next, operations for executing the fax option function will be described.

First, a fax driver setting routine will be explained while referring to the flowchart shown in FIG. 24. The fax driver setting routine is for enabling a user to select one of the fax option functions to be set as valid. During this explanation, the fax to print function will be referred to as a fax function 1, the fax to print and send function will to be referred to as a fax function 2, and the send fax after printing function will be referred to as the fax function 3, hereinafter.

The fax driver setting routine can be executed by each personal computer 11 to 14 according to a user's input of a fax driver setting command to the personal computer 11 to 14.

Figure 25:
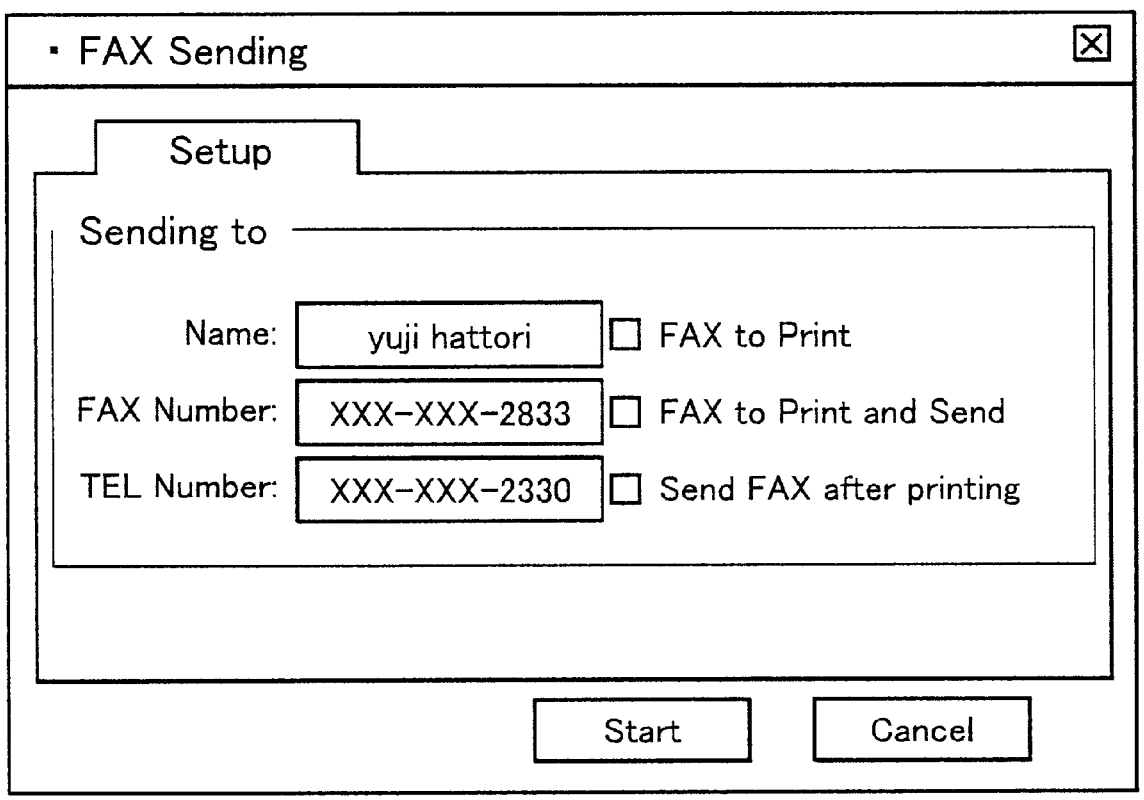
FIG. 25 illustrates a drive setting screen when the driver setting routine is executed.

First in S2710, a driver screen shown in FIG. 25 is displayed on the display device 111, such as a monitor, of the personal computer.

The setting screen shown in FIG. 25 includes a field for enabling the user to input name of a remote party to whom a facsimile message is desired to be transmitted, and a fax number and a telephone number of the remote party. Also, check boxes for indicating which function is to be used, that is, whether or not the fax to print function, the send fax after printing function, or the fax to print and send function is to be used, are also provided. A start button for completing the inputted settings and a cancel button for canceling the inputted settings are also provided. The user can input his/her desired settings on the setting screen.

Then, in S2720, it is judged whether or not the check box for the fax to print function has been checked. If so (S2720:YES), then in S2730, all the check boxes are temporarily removed from the display and then in S2740, the fax to print check box is checked. Next, the routine proceeds to S2810.

If it is judged in S2720 that the fax to print check box has not been designated (S2729:NO), then whether or not the fax to print and send check box has been designated is judged in S2750. If so (S2750:YES), then all the other check boxes are temporarily removed from the screen in S2760 and then the fax to print and send check box is checked in S2770. Afterwards the program proceeds to S2810.

If it is judged in S2750 that the fax to print and send check box has not been checked (S2750:NO), then in S2780 it is judged whether or not the send fax after printing check box has been designated. If so (S2780:YES), then in S2790 all the check boxes are temporarily removed from the display and in S2800 the send fax after printing check box is checked in the same manner as described above.

If it is judged that the send fax after printing check box has not been checked (NO in S2780), then in S2810, it is judged whether the start button has been clicked. If so (S2810:YES), in S2820, it is judged whether the name, fax number, and telephone number of the remote party to which the fax massage is to be transmitted have been filled out. Once these lines have been filled out (S2820:YES), then the settings are stored in a fax driver setting area which is secured in the memory such as the RAM 102 of the personal computer. Then this routine is ended.

When at least the fax number line has not been filled out (S2820:NO), then an error message is displayed in S2830 on the monitor 111 to indicate that the input is incomplete. Afterwards the program returns to S2720. On the other hand, when the start button has not been depressed (S2810:NO), then in S2850, it is judged whether or not the cancel button has been designated. If the cancel button has been depressed (S2850:YES), then this program is ended. When the cancel button has not been depressed (S2850:NO), then the routine returns to S2720.

During the above-described driver setting routine, fax option functions are set separately for each name of the remote party where a facsimile message is to be transmitted. However, the fax option functions need not be set separately for each party, but the same fax option function could be set as valid for all fax transmissions to be attained.

When any fax option functions are not set for some remote party, normal fax transmission will be performed to the remote party.

It is noted that when the fax to print check box is checked, fax transmission will not be immediately performed after printing, and therefore there is no need to display the error message in S2830 even if the input is incomplete.

When the user inputs a fax transmission instruction (OK command) in S180 (FIG. 6*a*) to some personal computer 11 to 14 in order to allow the printer 30 to transmit, to his/her desired remote party, a message (text data) which has been prepared using an application software program in the personal computer, the personal computer automatically produces corresponding facsimile transmission data (main facsimile message data) and outputs the facsimile transmission data and a variety of commands to the printer 30 based on the set fax driver settings so that the fax option functions be executed in the printer 30. That is, after executing the process of S180 in FIG. 6(a), the CPU 101 in the computer executes a command output routine of FIG. 26 for outputting those commands.

During the command output routine, first in S2910, a fax entering command is outputted to the printer 30 before transmitting the fax transmission data. Next in S2920, it is judged whether or not one of the check boxes for fax option functions has been checked in the fax driver setting area of the RAM 103 for the user's designated remote party. If one of the options has been checked (S2920:YES), then the program proceeds to S2960. One the other hand, when none of the options has been checked (S2920:NO), then in S2930, a fax transmission data preparation routine is executed to prepare fax transmission data, that is, G3 compressed type fax data, based on the message data (text data). The fax transmission data is outputted together with file (distinction data) to the printer 30. It is noted that data of the telephone number of the remote party, to which the fax transmission data is to be transmitted, and data of the user (sender) are also transmitted to the printer 30. Next, a send command is outputted in S2940. The send command has the same file (distinction data) as the transmitted fax transmission data. Hereinafter, it will be assumed that each command is provided with a file (distinction data) corresponding to the already-transmitted fax transmission data. Next in S2950, a deletion command is outputted. Afterwards the program proceeds to S3100.

On the other hand, when a function has been checked (S2920:YES), then in S2960 it is judged whether or not the fax to print function (fax function 1) has been checked. If the fax to print function has been checked (S2960:YES), then in S2970, fax transmission data is prepared and outputted to the printer 30 in the same manner as in S2930. Next, a print command and a deletion command are outputted in this order in S2980 and in S2990, respectively. Then the routine proceeds to S3100.

When the fax to print function has not been checked (S2960:NO), then whether or not the fax to print and send function (fax function 2) has been checked is checked in S3000. If so (S3000:YES), then fax transmission data is prepared and outputted to the printer 30 in S3010 in the same manner as in S2930. Afterwards a print command, a send command, and a deletion command are outputted in this order in S3020, in S3030, and in S3040, respectively. Afterward the program proceeds to S3100.

When the fax to print and send function has not been checked (S3000:NO), it is judged in S3050 whether or not the send fax after printing function (fax function 3) has been checked. If so (S3050:YES), then fax transmission data is prepared and outputted to the printer 30 in S3060 in the same manner as described above. Afterwards a print command and a wait for input command, and a deletion command are outputted in this order in S3070, in S3080, and in S3090, respectively. The wait for input command is for executing an input wait routine, to be described later. Afterwards the program proceeds to S3100. In S3100, a completion command is transmitted to the printer 30 and this routine is ended.

Figure 24:
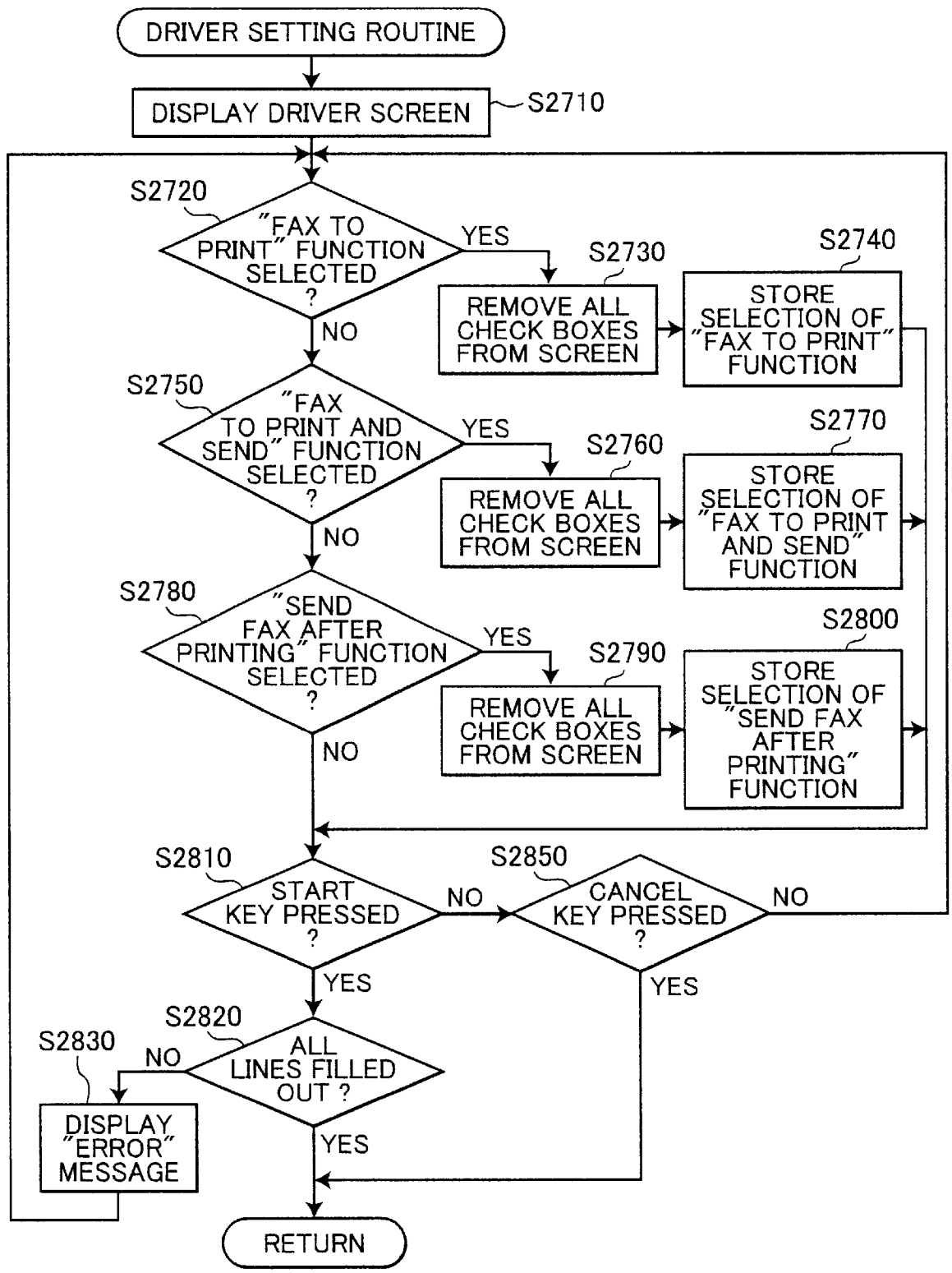
FIG. 24 is a flowchart showing a driver setting routine executed by each personal computer for using a fax option function according to a second embodiment.

According to the driver setting routine of FIG. 24 and the command output routine of FIG. 26, after one of the fax option functions is selected in the driver setting routine, when a transmission instruction (OK command) is inputted to transmit main facsimile message data prepared by the application program, then in the command output routine of FIG. 26, a variety of commands are outputted to the printer 30 so as to execute the desired fax option function. Accordingly, when fax transmission is to be performed, all that needs to be inputted by the user is inputting a transmit instruction (OK command). Therefore, operability is simple.

Next, the main routine 2, which is executed to realize the fax transmission function and the printer function in the printer 30 of the system according to the second embodiment, will be explained with reference to FIG. 27(a). The main routine 2 has steps the same as those in the main routine shown in FIG. 6(b) of the first embodiment except that an input wait routine of S515 for executing in response to the wait for input command is added. The process of S515 is added between S520 and S540. Therefore, explanation for the same steps and operations will be omitted.

Figure 27A:
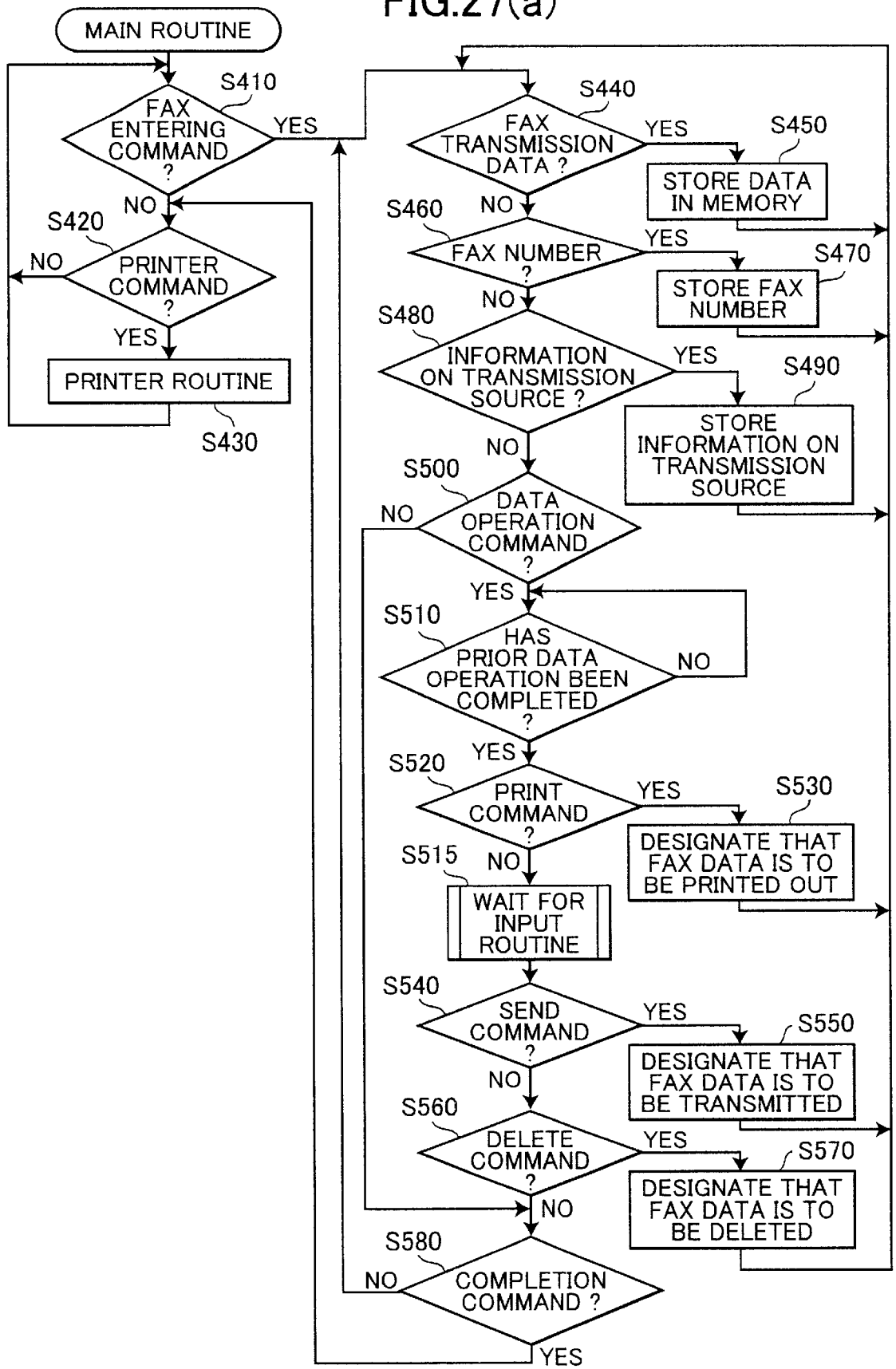
FIG. 27(a) is a flowchart of a main routine executed by the printer according to the second embodiment.
Figure 27B:
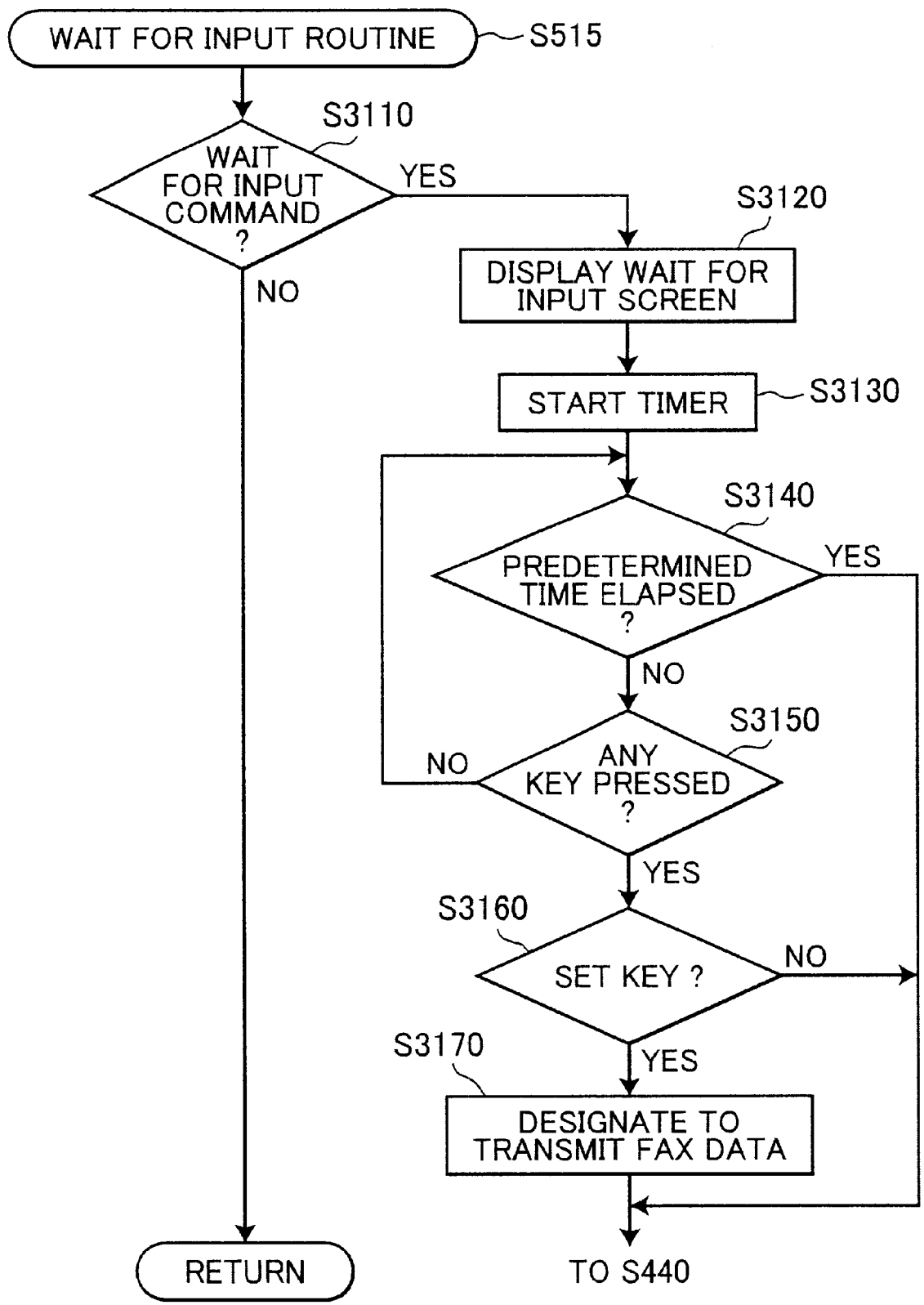
FIG. 27(b) is a flowchart of a wait for input routine executed by the printer during the main routine of FIG. 27(a)

The input waiting routine performed in S515 of the main routine 2 is represented by the flowchart shown in FIG. 27(b). During the input waiting routine, first in S3110, it is judged whether or not a received data operation command is a wait for input command. If the data operation command is a wait for input command (S3110:YES), then the program proceeds to S3120. If the data operation command is not a wait for input command (S3110:NO), then this routine is ended and the program proceeds to S540 (FIG. 27a).

On the other hand, when the received data operation command is a wait for input command (YES in S3110), a message, such as "send fax now?", is displayed on the display portion 84 of the printer 30 to inquire the user whether or not the printed fax transmission data should be immediately transmitted. Thus, the input wait input routine of S515 is executed upon receipt of a wait for input command that is received after a print command. In S3120 of this routine, a display inquiring whether the fax transmission data upon which printing has been performed according to the print command, should be immediately transmitted or not.

Next, the timer 68 is started in S3130. According to the input waiting routine, if input operation to the printer 30, to be described later, is not performed until a predetermined time elapses, the input waiting routine is immediately terminated after executing processes such as returning the display of the display portion 84 to its original condition. The timer 68, started in S3130, is used to judge whether the predetermined time has elapsed or not.

Next in S3140, it is judged based on the timer whether the predetermined time (five minutes, for example) has elapsed. When the predetermined time has elapsed (S4140:YES), then this routine is ended and the program returns to S440. On the other hand, when the predetermined time has not elapsed (S3140:NO), then in S3150, it is judged whether or not a key on the panel 83 of the printer 30 has been manipulated. When no key has been pressed (S3150:NO), then the routine returns to S3140.

On the other hand, when a key has been pressed (S3150:YES), then in S3160, it is judged whether or not the pressed key is a predetermined key for immediately transmitting the fax transmission data. An example of the predetermined key for immediately transmitting the fax transmission data is a "SET" key provided on the operation portion 83. When the pressed key is the "SET" key (S3160:YES), then in S3170, "transmission (S)" designation data is set as a data operation command to the fax transmission data stored in the fax data storage region of the RAMs 63, 64. Then, this routine is ended and the routine returns to S440. When "transmission (S)" is thus designated for the fax transmission data, then S250 of the fax control interrupt routine (FIG. 4) will result in a positive determination.

When some other key besides the "SET" key is depressed (S3160:NO), then this routine is ended, and the routine returns to S440.

Thus, during the main routine 2, when the command output routine of FIG. 26 is performed at some personal computer 11 to 14, and commands corresponding to fax option function are outputted to the printer 30, then corresponding processes are performed at the printer 30 on the fax transmission data based on the received commands. Examples of the processes performed at the printer 30 on the fax transmission data include printing, transmission, waiting of input of command, and deletion.

Operations are executed, as described below, according to the fax region function of the second embodiment.

When the user inputs a fax driver setting command to some personal computer 11 to 14, then the driver setting operations of FIG. 24 are executed and the user fills in the input lines on the driver setting screen of FIG. 25. The user checks appropriate ones of the fax option check boxes. Here, an example will be explained when the send fax after printing check box is checked. This setting is stored in the fax driver setting area in the RAM 103 of the personal computer.

Next, when the user inputs in S180 (FIG. 6a) a transmission instruction (OK command) with respect to message data prepared during an application process, the command output routine of FIG. 26 is executed. During the command output routine, it is determined that the send fax after printing is checked for the user's designated address in the fax drive setting area in the RAM 103. The fax transmission data is outputted. Then, a print command, a wait for input command, and a delete command are outputted in this order, each being appended with distinction data for showing relationship with the fax transmission data.

Thus, fax transmission data, a print command, a wait for input command, and a deletion command are outputted in this order to the printer 30 from the personal computer. The printer 30 stores in S450 the received fax transmission data in a memory region of the RAM 63 or 64 during the main routine 2 of FIG. 27a. Further, according to the print command (print designation P) stored in S530 in the RAM 63 or 64 in correspondence with the fax transmission data, the fax transmission data will be printed in S380. Then, according to the wait for input command, it is judged in S515 whether or not the fax transmission data is to be transmitted. That is, when the "SET" key is pressed (YES in S3160), the fax transmission data will be transmitted to the user's designated remote device in S3170 and S350. Afterward, the transmission data is deleted in S570 according to the deletion command. Then, when the completion command is received, this routine is ended. When a key other than the "SET" key is pressed or no key at all is pressed, the fax transmission data is deleted based on the deletion command, and this routine is ended.

According to the fax option function described above in the second embodiment, the following effects can be attained by merely performing the simple operation for inputting the transmission instruction only once from the personal computer.

According to the fax to the print function, fax transmission data is automatically deleted after the fax transmission data is printed. After the user obtains a test print before transmitting the fax transmission data, troublesome operations, such as outputting a deletion command to delete the fax transmission data each time after the fax transmission data is printed need not be performed. Also, because the printed fax transmission data is deleted, the fax transmission data occupies the memory region of the RAM 63 or 64 of the printer 30 for only a short period of time so that the memory region can be effectively used.

During the fax to print and send function, the fax transmission data is deleted after the fax transmission data is printed and transmitted. The user can reliably obtain a printed copy of the fax transmission data. Because the fax transmission data is deleted after it has been transmitted, the memory region of the RAM 63 or 64, which stores the fax transmission data, can be effectively used.

Also, during the send fax after printing function, the fax transmission data is first printed. Then, the printer waits until the "SET" key is pressed down. Once the "SET" key is pressed down, the fax transmission data is transmitted and afterward, the fax transmission data is deleted regardless of whether the "SET" key is pressed or not. Accordingly, after inputting the transmission instruction (OK command) at the personal computer, the user confirms the fax transmission data outputted by the printer 30. If there is no problem with the data content, the user instructs the printer to transmit the fax transmission data. There is no need for the user to go back to the personal computer to instruct fax transmission. Also, during the send fax after printing function, regardless of whether the fax transmission is performed or not, the fax transmission data is deleted, so there is no need for the user to perform troublesome operations of outputting a delete command. During the wait for input condition for waiting instruction for transmission, once the predetermined duration of time has elapsed, the fax transmission data will be automatically deleted. Therefore, even when no instruction of any kind is inputted, the fax transmission data will occupy the memory regions in the RAM 63 or 64 within only a short period of time.

The command output routine of FIG. 26 has been described above wherein the variety of commands such as the print command, send command, wait for input command, delete command are serially outputted in correspondence with fax transmission data based on settings of fax option function 1, 2, or 3. However, the present invention is not limited to the above-described processes.

For example, a command indicating a designated function itself (function 1, 2, or 3) could be outputted in correspondence with each fax transmission data. More specifically, the command output routine of FIG. 26 may be modified so that the processes of S2980, S2990, S3020, S3030, S3040, S3070, S3080, and S3090 be omitted. In S2970, a command function 1 indicative of the fax to print function is outputted. In S3010, a command function 2 indicative of the fax to print and send function is outputted. In S3060, a command function 3 indicative of send fax after printing function is outputted. Then, the printer 30 that receives those function-indicating commands then automatically produces several commands such as a print command, a send command, and the like based on the function-indicating command. In this case, details of the processes in the main routine 2, that is executed by the printer 30 in correspondence with the successively-received various commands, should be slightly changed as described below.

Details of the processes, performed at the printer 30 when a command indicating each fax option function is received from the personal computer 11 to 14, will be explained below.

Figure 28:
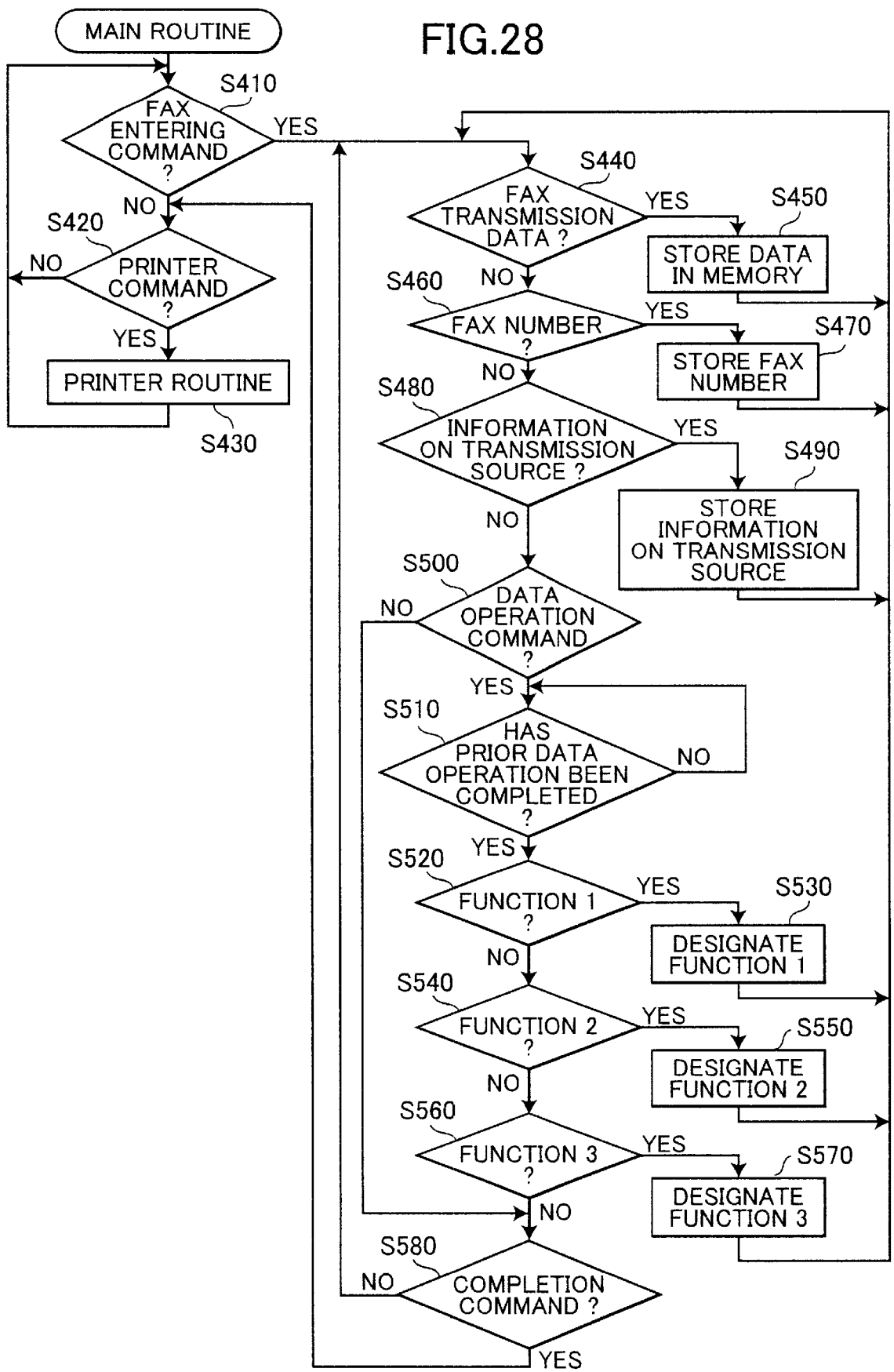
FIG. 28 is a flowchart of a modification of the main routine executed by the printer according to the second embodiment.

In this case, the main routine of FIG. 27a is modified as shown in FIG. 28. In this case, the printer 30 will receive command function 1, command function 2, and command function 3. Processes for judging which of the functions 1 to 3 is indicated by the received command are executed serially in the judgement processes in S520, S540, S560 of FIG. 28. When any one of the judgement processes S520, S540, or S560 results in a positive judgement, then in the same manner as described in the first embodiment for the process of S530, S550, and S570, the corresponding function (1, 2 or 3) is designated for the corresponding fax transmission data. Further, print designation (print P) is set on the fax transmission data in each of S530, S550, and S570, in order to designate a print routine to be initially executed during each of these functions.

When such a print designation P is set, then the process in S270 of the fax control interrupt routine of FIG. 4 will result in a positive determination. Further, during the print interrupt routine represented by the flowchart shown in FIG. 5(c), fax transmission data designated with "print P" is specified so that it will be judged in S370 that a print start request is present. Therefore, printing is executed in S380. In S380, it is further judged whether or not any of the functions 1 to 3 is designated on the data. When function 1 is designated in the data, then a data operation command is set as "deletion D" for the data. When function 2 is designated, then a data operation command is set as "transmission S" for the data. When function 3 is designated in the input, then the data operation command is set as "wait input" for the data. Then, the process proceeds to S390.

Afterward when the program returns from the print interrupt routine of FIG. 5(c), the program proceeds to a routine for automatically processing the fax transmission data according to the designated data operation command. That is, fax transmission data can be subjected to the transmission routine of FIG. 5(b) according to the command "transmission S", to a waiting interrupt routine of FIG. 29 according to the command "wait for input", or to a deletion interrupt routine (not shown in the drawings) according to the command "delete D".

It is noted that during the transmission routine of FIG. 5(b), when the transmission mode is turned in S360, it is further judged whether or not at least the function 2 or the function 3 is designated for the present fax transmission data. When either function 2 or function 3 is designated for the fax transmission data, then "deletion D" is set as the data operation command for the present data and then the program returns.

Figure 29:
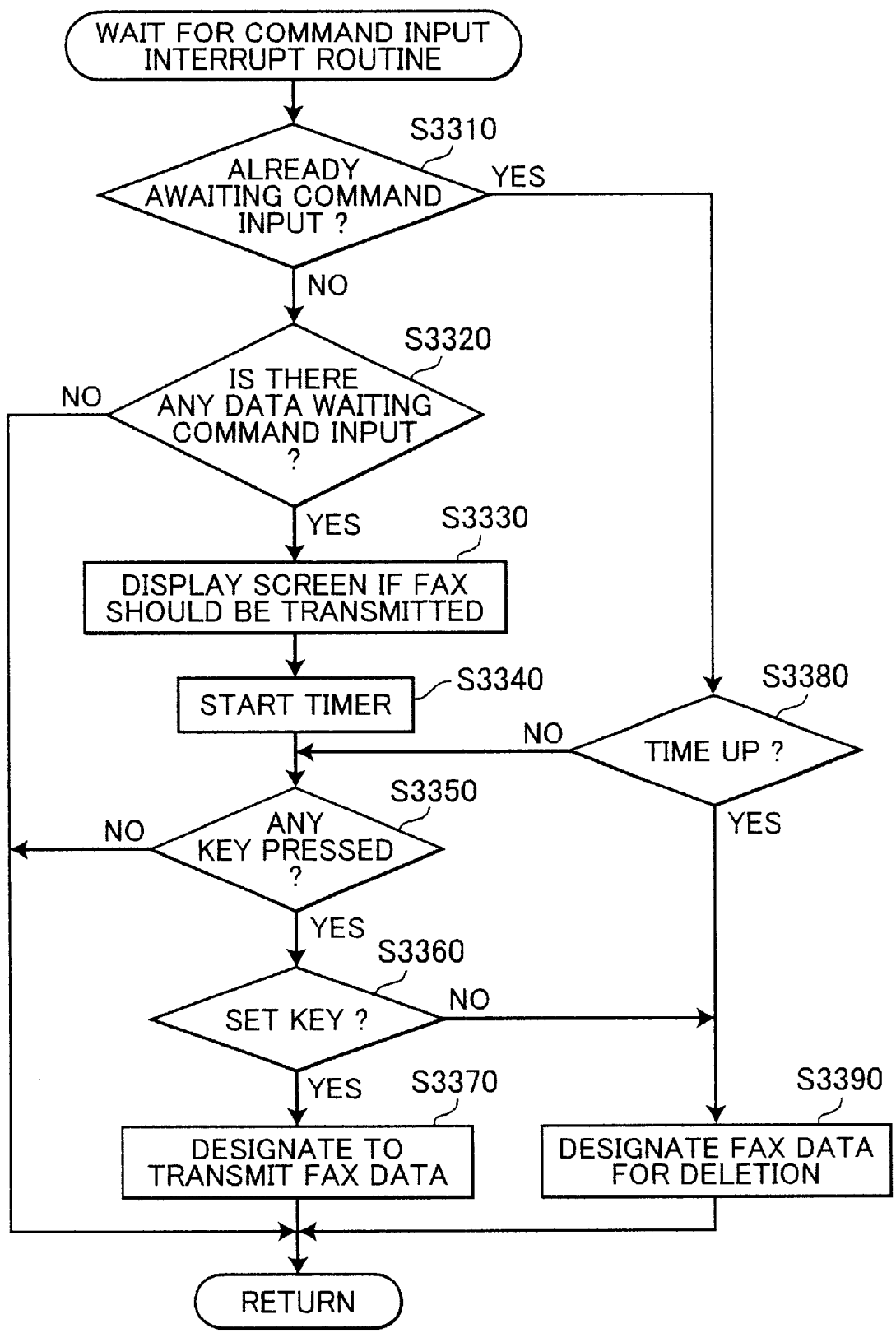
FIG. 29 is a flowchart of a wait for input routine executed by the printer during the main routine of FIG. 28.

When the "wait for input" is designated in S380 for the function 3, then the input waiting interrupt shown in FIG. 29 is started up, and the following operations are performed. First in S3310, it is judged whether or not the printer 30 is already in the input waiting condition. If not (S3310:NO), then in S3320, it is judged whether or not any data is designated as a "wait for input" command. If not, the routine returns. On the other hand, if some fax transmission data is designated as "wait for input" command (S3320:YES), then in S3330, a display inquiring the user whether the subject fax transmission data should be immediately transmitted is displayed and a waiting condition is set. In S3340, the timer 68 for determining a maximum input waiting time is set. In S3350 and S3360, it is judged whether keys have been depressed on the operation portion 83. If it is judged that the "SET" key has been operated to instruct transmission (S3360:YES), then the screen display is returned to its initial condition, and in S3370, "transmission S" is designated for the fax transmission data, and the routine returns. If some key other than the "SET" key is operated (S3360:NO), then this means that the transmission should not be performed, and therefore the screen display returns to its initial condition and in S3390, "deletion D" is designated for this data, then the program returns to the main routine.

The input waiting interrupt routine of FIG. 29 is periodically repeated at a predetermined time interval. When it is judged that the waiting condition is already being set (S3310:YES), then in S2280, it is judged whether or not the predetermined duration of time has elapsed since the waiting condition is initiated. If the predetermined duration of time has not elapsed (S3380:NO), the program proceeds to S3350. If the predetermined duration of time has elapsed (S3380:YES), then in S3390, "deletion D" is set for the data and the program returns to the main routine.

As described above, even when fax transmission data is designated by a command for indicating an option function itself, various commands such as the print command and the like can be successively executed according to the option function.

While the invention has been described in detail with reference to the specific embodiments thereof, it would be apparent to those skilled in the art that various changes and modifications may be made therein without departing from the spirit of the invention, the scope of which is defined by the attached claims.

For example, the system of the second embodiment can be modified so that the user can designate his/her desired fax option function at the printer 30. That is, with respect to fax transmission data already transmitted to the printer 30, when a user inputs a command for performing the fax to print function at the operation portion 83 of the printer 30, then a fax entering command, a print command, a deletion command, and a completion command may be produced in this order. In response to the thus produced various commands, the fax transmission data will be subjected to the fax to print function according to the process of FIG. 27(a). When the user inputs a command for performing the fax to print and send function at the operation portion 83, a fax entering command, a print command, a send command, a delete command, and a completion command are produced in this order. In response to the thus produced various commands, the fax transmission data will be subjected to the fax to print and send function according to the process of FIG. 27(a). When the user inputs a command for performing the send fax after printing function at the operation panel 83, a fax entering command, a print command, a wait for input command, a deletion command, and a completion command are produced in this order. In response to the thus produced various commands, the fax transmission data will be subjected to the send fax after printing function according to the process of FIG. 27(a). The printer 30 can be configured to execute this type of process. At this time, in the same manner as in the above-described modification, the user can designate a command indicating the user's selected function itself to a corresponding a fax transmission data.

According to the second embodiment, the order, in which the respective data operation commands for the fax transmission data are outputted and processed is such that a print command is transmitted first, and a send command is transmitted subsequently. However, the present invention is not limited to this order. When the user wishes to obtain a copy of a transmitted facsimile message, then the print command can be processed after the send command.

Further, in the first and the second embodiments, in order to let the printer 30 process fax transmission data, a fax entering command is transmitted before fax transmission data and a corresponding data operation command. However, the present invention is not limited to this configuration. Instead, general judgement technology for automatically judging types of data for printing may be used in the printer 30 to judge distinction data appended to fax transmission data or to judge a characteristic of the fax transmission data itself that can be distinguished from those of other print data. With this characteristic, the printer 30 distinguishes the type of received data, and automatically switches the mode between the fax process mode and the printer mode appropriate to be used for processing the determined type of data.

According to the above-described modification of the second embodiment, the fax option function can be executed at the printer 30 so that the system becomes more convenient.

It is noted that when the fax modem 3 is mounted in the PCMCIA slot 75 or 76, the printer 30 functions as a printer with a fax function. Accordingly, in order to let the printer 30 appropriately operate as a printer with a fax function, the fax modem card 3 has to be mounted properly in the PCMCIA slot 75 or 76. However, because the fax modem card 3 is merely mounted in the PCMCIA slot 75 or 76, the modem 3 can be pulled out of the slots 75, 76 for some reason, and can be improperly mounted.

The system can therefore be configured to additionally confirm whether or not the fax modem card 3 is presently being mounted properly in the printer 30.

That is, a card mounted state confirmation routine can be executed as a process of S545. This process of S545 may be added between S520 and S540 in the main routine of FIG. 6(*b*) or between S520 and S515 in the main routine 2 of FIG. 27(*a*).

Figure 30:
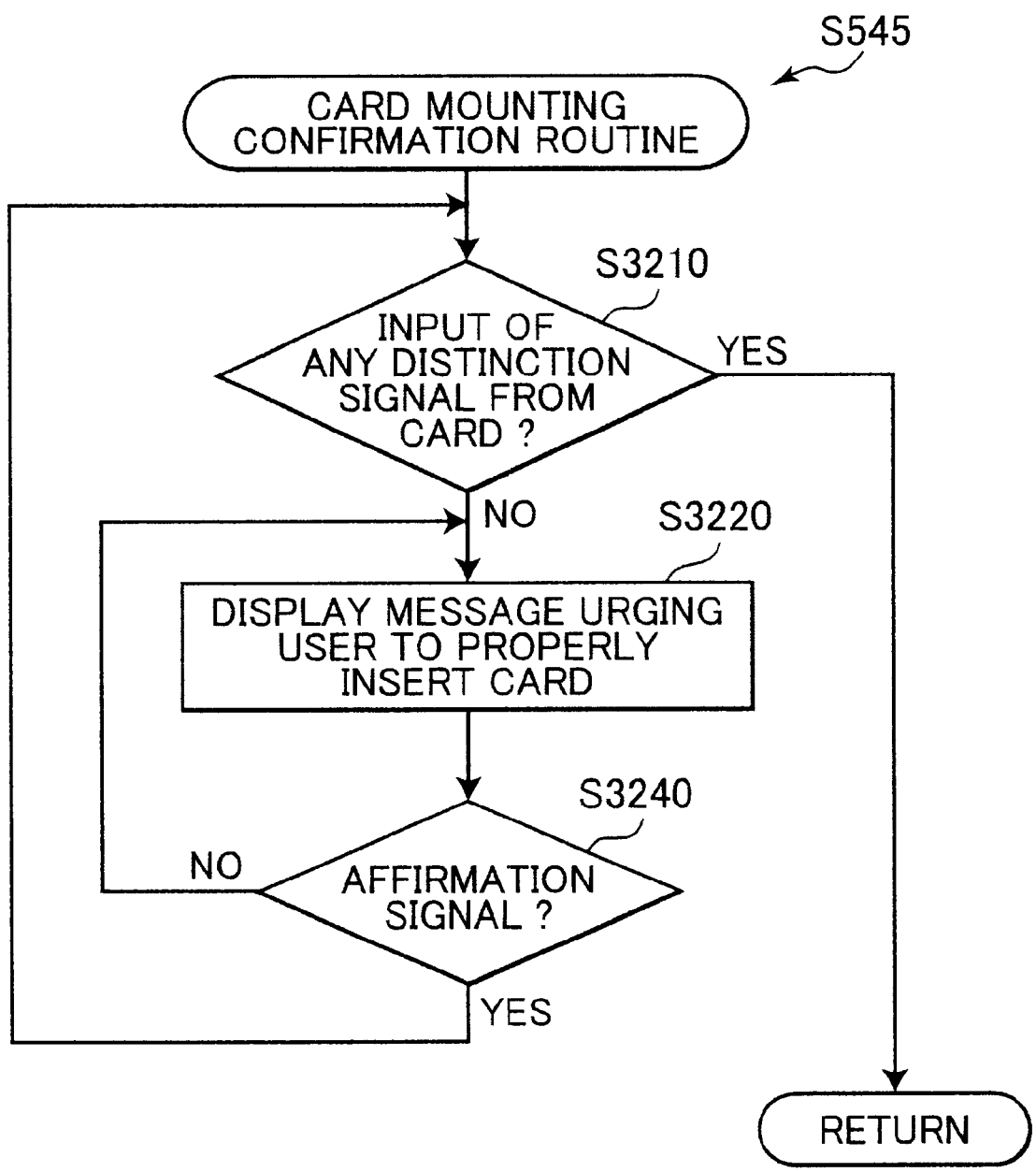
FIG. 30 is a flowchart showing a routine executed by the printer for confirming a card mounting condition according to a modification.

As shown in FIG. 30, during the process of S545, first in S3210, it is judged whether or not input of a distinction signal has been received from the fax modem card 3 at the PCMCIA slot 75 or 76. If so (S3210:YES), then this routine is executed. On the other hand, when no distinction signal has been inputted (S3210:NO), then in S3220, a message such as "fax card removal" urging the user to properly mount the fax modem card 3 in the PCMCIA slot 75 or 76 is displayed on the monitor of the personal computer 11 to 14 and the display portion 84 of the printer 30. Viewing the message, the user can properly mount the modem card 3 into the slot 75 or 76, and input an affirmative command to the printer 30 or to his/her own computer 11 to 14.

Next in S3240, it is judged whether or not an affirmation command is received from the operation portion 83 of the printer 30 or from the personal computer 11 to 14. If an affirmative command is entered (S3240:YES), then S3210 is repeated. If no affirmative command is inputted (S3240:NO), then S3320 is repeated.

According to the card mounting confirmation routine of S545, even if the fax modem card 3 is not properly mounted before fax transmission is executed, the operations of the main routine 1 or the main routine 2 are temporarily stopped until the fax modem card 3 is properly mounted. Accordingly, the system that executes the card mounting confirmation process of S545 can prevent fax transmission errors caused by improper mounting of the fax modem card 3. Therefore, fax transmission can be properly performed.

It should be noted that during the above-described card mounting confirmation routine of S545, execution of fax transmission is stopped until the fax modem card 3 is properly mounted. However, instead, whether or not the fax modem card 3 is properly mounted can be monitored periodically by a timer interrupt routine and the like. Once the fax modem card 3 is properly mounted, the fax transmission can be again executed. Alternatively, a message can be simply displayed indicating that the fax modem card 3 is not properly mounted.

What is claimed is:

1. A facsimile transmission system, comprising:
   a personal computer including:
      means for outputting facsimile data as transmission data;
      means for outputting a function command indicative of a plurality of functions, and a facsimile transmission terminal including:
         means for receiving the transmission data transferred from the personal computer and for storing the transmission data in a transmission data storage area; and
         means, in response to the function command, for performing the plurality of functions onto the transmission data,
      wherein the function command output means outputs, in succession, a plurality of function commands indicative of the plurality of functions, and wherein the function performing means performs the plurality of functions in succession in response to the successively-received plural function commands.

2. A facsimile transmission system as claimed in claim 1, wherein the personal computer further includes:
   means for outputting a send command to transmit the transmission data to a designated address; and
   means for outputting a print command to print out the transmission data, and
   wherein the facsimile transmission terminal further includes:
      means, in response to the send command, for transmitting the transmission data to the designated address; and
      means, in response to the print command, for converting the transmission data into data for printing, and for printing out the data for printing.

3. A facsimile transmission system as claimed in claim 2, wherein the facsimile transmission terminal further includes means for receiving a user's inputted send command, and wherein the transmission means transmitting the transmission data to the designated address also in response to the user's inputted send command.

4. A facsimile transmission system as claimed in claim 3, wherein the user's inputted send command receiving means includes an operation portion for enabling the user to input the user's send command.

5. A facsimile transmission system as claimed in claim 2, wherein the personal computer further includes means for outputting a first command to print the transmission data and to transmit the transmission data to the designated address, and
   wherein the facsimile transmission terminal further includes first control means for controlling, in response to the first command, the print means to convert the transmission data into data for printing and then to print the data for printing and the transmission means to transmit the transmission data to the designated address.

6. A facsimile transmission system as claimed in claim 5, wherein the first control means includes means for deleting the transmission data from the transmission data storage area after the transmission data is transmitted to the designated address.

7. A facsimile transmission system as claimed in claim 6, wherein the facsimile transmission terminal further includes means for receiving a user's inputted first command.

8. A facsimile transmission system as claimed in claim 7, wherein the user's inputted first command receiving means includes an operation portion for enabling the user to input the user's first command.

9. A facsimile transmission system as claimed in claim 2, wherein the personal computer further includes means for outputting a second command to print the transmission data, to display a message asking a user whether or not the transmission data is to be transmitted to the designated address and to transmit the transmission data to the designated address when a transmission instruction is inputted in response to the message, and
wherein the facsimile transmission terminal further includes:
means for receiving an instruction inputted by the user;
second control means for controlling, in response to the second command, the print means to convert the transmission data into data for printing and then to print the data for printing, the display means to display the message, and the transmission means to transmit the transmission data to the designated address when the transmission instruction is received by the instruction receiving means.

10. A facsimile transmission system as claimed in claim 9, wherein the second control means includes means for deleting the transmission data from the transmission data storage area after the transmission data is transmitted to the designated address or after the instruction receiving means receives another instruction not to transmit the transmission data to the designated address.

11. A facsimile transmission system as claimed in claim 10, wherein the facsimile transmission terminal further includes means for receiving a user's inputted second command.

12. A facsimile transmission system as claimed in claim 11, wherein the user's inputted second command receiving means includes an operation portion for enabling the user to input the user's second command.

13. A facsimile transmission system as claimed in claim 9, wherein the second control means further includes means for deleting the transmission data when the instruction indicating whether the transmission data is to be transmitted or not is not inputted to the instruction inputting means within a predetermined period of time.

14. A facsimile transmission system as claimed in claim 2, wherein the personal computer includes means for outputting a deletion command to delete the transmission data from the data storage area, wherein the facsimile transmission terminal includes means, in response to the deletion command, for deleting the transmission data from the transmission data storage area.

15. A facsimile transmission system as claimed in claim 14, wherein the facsimile transmission terminal further includes means for receiving a user's inputted deletion command, and wherein the deleting means deletes the transmission data also in responses to the user's inputted deletion command.

16. A facsimile transmission system as claimed in claim 15, wherein the user's inputted deletion command receiving means includes an operation portion for enabling the user to input the user's deletion command.

17. A facsimile transmission system as claimed in claim 15, wherein the user's inputted deletion command receiving means includes an operation portion for enabling the user to input the user's deletion command.

18. A facsimile transmission system as claimed in claim 1, wherein:
the personal computer further includes means for setting the plurality of functions to be conducted on the transmission data,
when the setting means sets, as one of the plurality of functions, a function to transmit the transmission data, the function command output means controls the send command output means to output the send command, and the function performing means controls, upon receipt of the send command, the transmission means to perform the transmission operation, and
when the setting means sets, as one of the plurality of functions, a function to print out the transmission data, the function command output means controls the print command output means to output the print command, and the function performing means controls, upon receipt of the print command, the print means to perform the printing operation.

19. A facsimile transmission system as claimed in claim 18, wherein
the personal computer further includes means for outputting a deletion command to delete the transmission data from the transmission data storage area,
the facsimile transmission terminal further includes means, in response to the deletion command, for deleting the transmission data from the transmission data storage area, and
when the setting means sets, as one of the plurality of functions, a function to delete the transmission data, the function command output means controls the deletion command output means to output the deletion command, and the function performing means controls, upon receipt of the deletion command, the deleting means to perform the deleting operation.

20. A facsimile transmission system as claimed in claim 19, wherein the facsimile transmission terminal further includes means for receiving a user's inputted send command, the transmission means transmitting the transmission data to the designated address in response to the user's inputted send command, and
when the setting means sets, as one of the plurality of functions, a wait for input function, the function command output means outputs a wait for input command, and the function performing means, upon receipt of the wait for input command, judges whether the user inputs the user's send command to the user's send command receiving means within a predetermined period of time.

21. A facsimile transmission system, comprising:
a personal computer including:
means for outputting facsimile data as transmission data;
means for outputting a send command to transmit the transmission data to a designated address; and
means for outputting a print command to print out the transmission data; and
a facsimile transmission terminal including:
means for receiving the transmission data transferred from the personal computer and for storing the transmission data in a transmission data storage area;
means, in response to the send command, for transmitting the transmission data to the designated address; and
means, in response to the print command, for converting the transmission data into data for printing, and for printing out the data for printing, wherein the personal computer further includes means for outputting a second command to print the transmission data, to display a message asking a user whether or not the transmission data is to be transmitted to the designated address, and to transmit the transmission data to the designated address when a transmission instruction is inputted in response to the message, and the facsimile transmission terminal further includes:
means for receiving an instruction inputted by the user;
means for displaying the message; and
second control means for controlling, in response to the second command, the print means to convert the transmission data into data for printing and then to print the data for printing, the display means to display the message, and the transmission means to transmit the transmission data to the designated address when the transmission instruction is received by the instruction receiving means.

22. A facsimile transmission system as claimed in claim 21, wherein the second control means includes means for deleting the transmission data from the transmission data storage area after the transmission data is transmitted to the designated address or after the instruction receiving means receives another instruction not to transmit the transmission data to the designated address.

23. A facsimile transmission system as claimed in claim 22, wherein the facsimile transmission terminal further includes means for receiving a user's inputted second command.

24. A facsimile transmission system as claimed in claim 23, wherein the user's inputted second command receiving means includes an operation portion for enabling the user to input the user's second command.

25. A facsimile transmission system as claimed in claim 21, wherein the second control means further includes means for deleting the transmission data when the instruction indicating whether the transmission data is to be transmitted or not is not inputted to the instruction inputting means within a predetermined period of time.

* * * * *